(12) United States Patent
Johnson

(10) Patent No.: US 6,453,073 B2
(45) Date of Patent: *Sep. 17, 2002

(54) METHOD FOR TRANSFERRING AND DISPLAYING COMPRESSED IMAGES

(75) Inventor: Stephen G. Johnson, Newport Beach, CA (US)

(73) Assignee: America Online, Inc., Dulles, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/283,017

(22) Filed: Mar. 31, 1999

Related U.S. Application Data

(62) Division of application No. 08/636,170, filed on Apr. 22, 1996, now Pat. No. 5,892,847, which is a continuation of application No. 08/276,161, filed on Jul. 14, 1994, now abandoned.

(51) Int. Cl.[7] .................................................. G06K 9/36
(52) U.S. Cl. ....................... 382/239; 382/240; 358/426; 369/124.06
(58) Field of Search .................................. 382/234, 239, 382/240, 300, 232; 358/426, 261.2, 436, 467, 430; 348/390, 396, 397, 399; 369/124, 124.06, 124.08

(56) References Cited

U.S. PATENT DOCUMENTS

| | | | |
|---|---|---|---|
| 4,122,440 A | | 10/1978 | Langdon, Jr. et al. ....... 340/347 |
| 4,222,076 A | * | 9/1980 | Knowlton ................... 358/263 |
| 4,414,580 A | | 11/1983 | Johnsen et al. ............. 358/260 |
| 4,467,317 A | | 8/1984 | Langdon, Jr. et al. ....... 340/347 |
| 4,654,484 A | * | 3/1987 | Reiffel et al. ................. 379/53 |
| 4,764,805 A | * | 8/1988 | Rabbani et al. ................ 358/13 |

(List continued on next page.)

FOREIGN PATENT DOCUMENTS

| | | | |
|---|---|---|---|
| EP | 402016 | 12/1990 | .......... H04N/1/417 |

OTHER PUBLICATIONS

Ratakonda; "Flexible Image Compression: A Transformative Interpolative Approach"; Proceedings of the 5th International Conference on Signal Processing Applications and Technology; Dallas, TX, Oct. 18–21, 1994; 1994 Waltham, MA, DSP Associates; pp. 880–885, vol. 2.

Chou, et al; "Data Reduction Using Cubic Rational B–Splines"; IEEE Computer Graphics and Applications, vol. 12, No. 3, May 1, 1992, pp. 60–68.

DeNatale, Francesco G.B. et al.,"A Spline–like Scheme for Least Squares Bilinear Interpolation of Images", 1993.*

M.A. Bassiouni et al., *Image Compression Using Integrated Lossless/Lossy Methods*, 1991, ICASSP '91: Acoustics, Speech, & Signal Processing Conference, pp. 2817–2820.

(List continued on next page.)

*Primary Examiner*—Matthew C. Bella
(74) *Attorney, Agent, or Firm*—Fish & Richardson P.C.

(57) ABSTRACT

An image of certain resolution higher than possible in a single transmission over a finite bandwidth channel is obtained by transferring a progressively-rendered, compressed image. Initially, a low quality image is compressed and transmitted over a finite bandwidth channel. Then, a successively higher resolution image information is compressed at a source and is transmitted. The successively higher resolution image information received at the destination end is used to display a higher resolution image at the destination end.

26 Claims, 62 Drawing Sheets

NOTE: TRANSMISSION TIMES ASSUME A COMPRESSED FILE SIZE OF 13KB

U.S. PATENT DOCUMENTS

| | | | |
|---|---|---|---|
| 4,774,562 A | * 9/1988 | Chen et al. | 358/13 |
| 4,847,677 A | * 7/1989 | Music et al. | 358/13 |
| 4,849,810 A | * 7/1989 | Ericsson | 358/133 |
| 4,891,643 A | 1/1990 | Mitchell et al. | 341/107 |
| 4,897,717 A | 1/1990 | Hamilton et al. | 358/133 |
| 4,903,317 A | * 2/1990 | Nishihara | 382/56 |
| 4,905,297 A | 2/1990 | Langdon, Jr. et al. | 382/56 |
| 4,922,508 A | 5/1990 | Moriya | 375/34 |
| 5,070,532 A | 12/1991 | Faul et al. | 382/56 |
| 5,111,292 A | * 5/1992 | Kuriarose et al. | 348/469 |
| 5,148,272 A | * 9/1992 | Acampora et al. | 348/397 |
| 5,150,209 A | * 9/1992 | Baker et al. | 348/407 |
| 5,157,488 A | 10/1992 | Pennebaker | 358/133 |
| 5,168,375 A | 12/1992 | Reisch et al. | 358/432 |
| 5,187,755 A | 2/1993 | Aragaki | 382/56 |
| 5,189,526 A | 2/1993 | Sasson | 358/432 |
| 5,196,946 A | 3/1993 | Balkanski et al. | 358/433 |
| 5,249,053 A | * 9/1993 | Jain | 358/709 |
| 5,262,878 A | 11/1993 | Esserman | 358/453 |
| 5,270,832 A | 12/1993 | Balkanski et al. | 358/432 |
| 5,299,025 A | 3/1994 | Shirasawa | 358/400 |
| 5,313,296 A | * 5/1994 | Ohki | 348/416 |
| 5,317,411 A | 5/1994 | Yoshida | 358/361.2 |
| 5,325,125 A | 6/1994 | Naimpally et al. | 348/402 |
| 5,335,088 A | * 8/1994 | Fan | 382/237 |
| 5,353,132 A | 10/1994 | Katsuma | 358/539 |
| 5,490,130 A | * 2/1996 | Akagiri | 369/124 |
| 5,524,067 A | * 6/1996 | Miyake et al. | 382/234 |
| 5,586,200 A | * 12/1996 | Devaney et al. | 382/232 |

OTHER PUBLICATIONS

Peter J. Burt et al., *The Laplacian Pyramid as a Compact Image Code*, Apr. 1983, IEEE Transactions on Communications, vol. COM–31, No. 4, pp. 532–540.

Stefan Carlsson, *Sketch Based Coding of Grey Level Images*, 8242 Signal Processing, Jul. 15, 1988, No. 1, Amsterdam, The Netherlands, pp. 57–83.

Johnson K. Yan et al.. *Encoding of Images Based on a Two Component Source Model*, Nov. 1977, IEEE Transactions on Communications, vol. COM–25, No. 11, pp. 1315–1322.

Steven L. Eddins, *Three–Component Image Compression with Frequency–Weighted Texture Coding and Edge Modeling*, IEEE Transactions on Communications, 1993, pp. 369–372.

* cited by examiner

FIG. 22a

| HEADER | [PALETTE] | TABLES [CS, VQCB, HUFFMAN] | DCT | VQ1 | URCA | XRCQ | VQ3 | VQ4 | VQ2 |
|---|---|---|---|---|---|---|---|---|---|

| HEADER | [PALETTE] | TABLES [CS, VQCB, HUFFMAN] | PANEL 1<br>DCT<br>VQ1<br>URCA<br>XRCA<br>VQ3<br>VQ4<br>VQ2 | PANEL 2<br>DCT<br>VQ1<br>URCA<br>XRCA<br>VQ3<br>VQ4<br>VQ2 | PANEL 3<br>DCT<br>VQ1<br>URCA<br>XRCA<br>VQ3<br>VQ4<br>VQ2 | PANEL 4<br>DCT<br>VQ1<br>URCA<br>XRCA<br>VQ3<br>VQ4<br>VQ2 | PANEL 5<br>DCT<br>VQ1<br>URCA<br>XRCA<br>VQ3<br>VQ4<br>VQ2 | ... | PANEL N<br>DCT<br>VQ1<br>URCA<br>XRCA<br>VQ3<br>VQ4<br>VQ2 |
|---|---|---|---|---|---|---|---|---|---|

| HEADER | [PALETTE] | TABLES [CS, VQCB,] | THUMBNAIL<br>DCT: AC, $AC_1$<br>$AC_2$, $AC_3$, $AC_4$,<br>$AC_5$<br>UCRA<br>XRCA | IMAGE<br>PANEL 1<br>DCT: $AC_6,AC_7$<br>$AC_8$.... $AC_{63}$.<br>VQ1<br>VQ3<br>VQ4<br>VQ2 | IMAGE<br>PANEL 2<br>DCT: $AC_6,AC_7$<br>$AC_8$.... $AC_{63}$.<br>VQ1<br>VQ3<br>VQ4<br>VQ2 | IMAGE<br>PANEL 3<br>DCT: $AC_6,AC_7$<br>$AC_8$.... $AC_{63}$.<br>VQ1<br>VQ3<br>VQ4<br>VQ2 | IMAGE<br>PANEL 4<br>DCT: $DC_6,AC_7$<br>$AC_8$.... $AC_{63}$.<br>VQ1<br>VQ3<br>VQ4<br>VQ2 | ... | IMAGE<br>PANEL N<br>DCT: $AC_6,AC_7$<br>$AC_8$.... $AC_{63}$.<br>VQ1<br>VQ3<br>VQ4<br>VQ2 |
|---|---|---|---|---|---|---|---|---|---|

| HEADER | [PALETTE] | TABLES [CS, VQCB,] | THUMBNAIL<br>DCT: DC, $AC_1$<br>$AC_2$, $AC_3$, $AC_4$,<br>$AC_5$<br>UCRA<br>XRCA | SKETCH<br>PANEL 1<br>DCT: $AC_6,AC_7$<br>$AC_8$.... $AC_{63}$.<br>VQ1<br>VQ3<br>VQ4 | SKETCH<br>PANEL 2<br>DCT: $AC_6,AC_7$<br>$AC_8$.... $AC_{63}$.<br>VQ1<br>VQ3<br>VQ4 | ... | SKETCH<br>PANEL 3<br>DCT: $AC_6,AC_7$<br>$AC_8$.... $AC_{63}$.<br>VQ1<br>VQ3<br>VQ4 | ENHANCE<br>PANEL 1<br>VQ2 | ENHANCE<br>PANEL 2<br>VQ2 |
|---|---|---|---|---|---|---|---|---|---|

432

● INPUT  ▨ OUPUT

| INPUT MEASURE | INPUT SET | OUTPUT SET |
|---|---|---|
| U AND X COMPONENTS ALL ZERO (OR BELOW NOMINAL THRESHOLD) | GRAYSCALE | 1. DON'T ENCODE U AND X.<br>2. INCREASE Q.<br>3. INCREASE VQ1. |
| 1. U AND X HISTOGRAM HAS GAPS (DEFINED BY PERCENTAGE OF HISTOGRAM CELLS NOT OCCUPIED)<br><OR><br>2. Y HISTOGRAM HAS GAPS<br><AND><br>3. f(AVERAGE OF AC TERMS 40-63) | GRAPHICS | 1. IF STRONG GRAPHICS, USE Q TABLE 5.<br>2. IF MEDIUM GRAPHICS, USE Q TABLE 4.<br>3. IF WEAK GRAPHICS, USE Q TABLE 3. |
| Y HISTOGRAM HAS GAPS<br><AND><br>f(AVERAGE OF AC TERMS 40-63) | PALETIZED:<br>WIDE GAPS => 4-BITS<br>SMALL GAPS => 8-BITS | COMBINE VQ3 AND VQ4 |
| f(AVERAGE OF AC TERMS 40-63) | TEXT | BREADTH OF GAPS DETERMINES EITHER Q TABLE 1, 2, OR 6. |
| AVERAGE CONVOLUTION A | HIGH ACTIVITY | 1. USE Q TABLE 5<br>2. INCREASE Q |
| 1. U AND X HISTOGRAM DOES NOT HAVE GAPS (DEFINED BY PERCENTAGE OF HISTOGRAM CELLS NOT OCCUPIED).<br><AND><br>2. Y HISTOGRAM DOES NOT HAVE GAPS<br><AND><br>3. f(AVERAGE OF AC TERMS 40-63) | PHOTOGRAPHIC | 1. USE Q TABLE 5<br>2. INCREASE Q |
| f(VARIANCE OF Y) | SMALL SCALE | STANDARD COMPRESSION MODEL |
| AVERAGE CONVOLUTION B | LOW ACTIVITY | 1. USE Q TABLE 8<br>2. DROP RSF |
| | | 1. DROP VQ1<br>2. USE Q TABLE 3 |

FIG. 33

FIG.41a
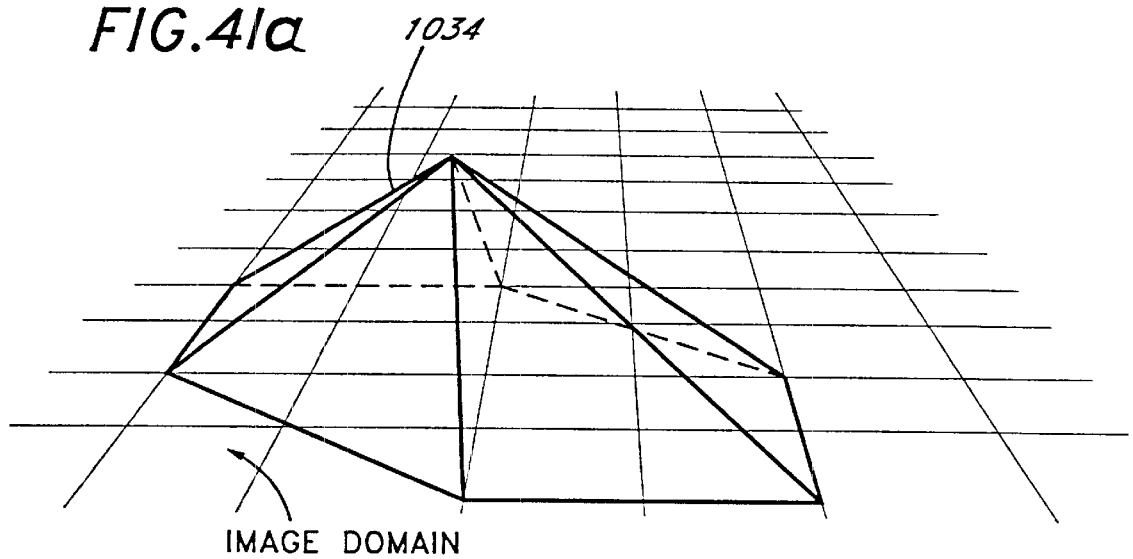
IMAGE DOMAIN
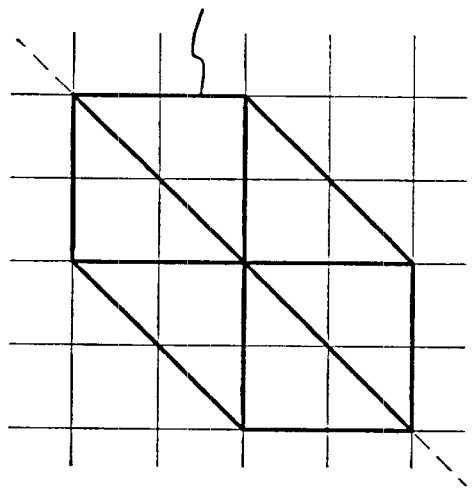
FIG.41b
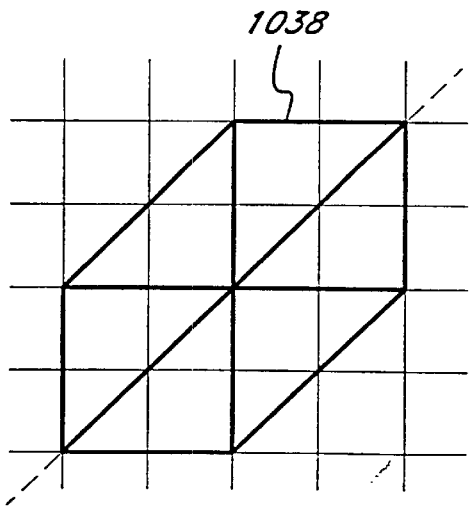
FIG.41c

3x3 FILTER KERNEL

5x5 FILTER KERNEL

7x7 FILTER KERNEL

OPTIMIZED WEIGHTS

OPTIMIZED WEIGHTS

METHOD FOR TRANSFERRING AND DISPLAYING COMPRESSED IMAGES

This is a divisional of U.S. application Ser. No. 08/636,170, filed Apr. 22, 1996, now U.S. Pat. No. 5,892,847 which is a continuation of U.S. application Ser. No. 08/276,161, filed Jul. 14, 1994, now abandoned.

BACKGROUND OF THE INVENTION

1. Field of the Invention

This invention relates to the compression and decompression of digital data and, more particularly, to the reduction in the amount of digital data necessary to store and transmit images.

2. Background of the Invention

Image compression systems are commonly used in computers to reduce the storage space and transmittal times associated with storing, transferring and retrieving images. Due to increased use of images in computer applications, and the increase in the transfer of images, a variety of image compression techniques have attempted to solve the problems associated with the large amounts of storage space (i.e., hard disks, tapes or other devices) needed to store images.

Conventional devices store an image as a two-dimensional array of picture elements, or pixels. The number of pixels determines the resolution of an image. Typically the resolution is measured by stating the number of horizontal and vertical pixels contained in the two dimensional image array. For example, a 640 by 480 image has 640 pixels across and 480 from top to bottom to total 307,200 pixels.

While the number of pixels represents the image resolution, the number of bits assigned to each pixel represents the number of available intensity levels of each pixel. For example, if a pixel is only assigned one bit, the pixel can represent a maximum of two values. Thus the range of colors which can be assigned to that pixel is limited to two (typically black and white). In color images, the bits assigned to each pixel represent the intensity values of the three primary colors of red, green and blue. In present "true color" applications, each pixel is normally represented by 24 bits where 8 bits are assigned to each primary color allowing the encoding of 16.8 million ($2^8 \times 2^8 \times 2^8$) different colors.

Consequently, color images require large amounts of storage capacity. For example, a typical color (24 bits per pixel) image with a resolution of 640 by 480 requires approximately 922,000 bytes of storage. A larger 24-bit color image with a 2000 by 2000 pixel resolution requires approximately twelve million bytes of storage. As a result, image-based applications such as interactive shopping, multimedia products, electronic games and other image-based presentations require large amounts of storage space to display high quality color images.

In order to reduce storage requirements, an image is compressed (encoded) and stored as a smaller file which requires less storage space. In order to retrieve and view the compressed image, the compressed image file is expanded (decoded) to its original size. The decoded (or "reconstructed") image is usually an imperfect or "lossy" representation of the original image because some information may be lost in the compression process. Normally, the greater the amount of compression the greater the divergence between the original image and the reconstructed image. The amount of compression is often referred to as the compression ratio. The compression ratio is the amount of storage space needed to store the original (uncompressed) digitized image file divided by the amount of storage space needed to store the corresponding compressed image file.

By reducing the amount of storage space needed to store an image, compression is also used to reduce the time needed to transfer and communicate images to other locations. In order to transfer an image, the data bits that represent the image are sent via a data channel to another location. The sequence of transmitted bytes is called the data stream. Generally, the image data is encoded and the compressed image data stream is sent over a data channel and when received, the compressed image data is decoded to recreate the original image. Thus, compression speeds the transmission of image files by reducing their size.

Several processes have been developed for compressing the data required to represent an image. Generally, the processes rely on two methods: 1) spatial or time domain compression, and 2) frequency domain compression. In frequency domain compression, the binary data representing each pixel in the space or time domain are mapped into a new coordinate system in the frequency domain.

In general, the mathematical transforms, such as the discrete cosine transform (DCT), are chosen so that the signal energy of the original image is preserved, but the energy is concentrated in a relatively few transform coefficients. Once transformed, the data is compressed by quantization and encoding of the transform coefficients.

Optimization of the process of compressing an image includes increasing the compression ratio while maintaining the quality of the original image, reducing the time to encode an image, and reducing the time to decode a compressed image. In general, a process that increases the compression ratio or decreases the time to compress an image results in a loss of image quality. A process that increases the compression ratio and maintains a high quality image often results in longer encoding and decoding times. Accordingly, it would be advantageous to increase the compression ratio and reduce the time needed to encode and decode an image while maintaining a high quality image.

It is well known that image encoders can be optimized for specific image types. For example, different types of images may include graphical, photographic, or typographic information or combinations thereof. As discussed in more detail below, the encoding of an image can be viewed as a multi-step process that uses a variety of compression methods which include filters, mathematical transformations, quantization techniques, etc. In general each compression method will compress different image types with varying comparative efficiency. These compression methods can be selectively applied to optimize an encoder with respect to a certain type of image. In addition to selectively applying various compression methods, it is also possible to optimize an encoder by varying the parameters (e.g., quantization tables) of a particular compression method.

Broadly speaking, however, the prior art does not provide an adaptive encoder that automatically decomposes a source image, classifies its parts, and selects the optimal compression methods and the optimal parameters of the selected compression methods resulting in an optimized encoder that increases relative compression rates.

Once an image is optimally compressed with an encoder, the set of compressed data are stored in a file. The structure of the compressed file is referred to as the file format. The file format can be fairly simple and common, or the format can be quite complex and include a particular sequence of compressed data or various types of control instructions and codes.

The file format (the structure of the data in the file) is especially important when compressed data in the file will be read and processed sequentially and when the user desires to view or transmit only part of a compressed image file. Accordingly, it would be advantageous to provide a file format that "layers" the compressed image components, arranging those of greatest visual importance first, those of secondary visual importance second, and so on. Layering the compressed file format in such a way allows the first segment of the compressed image file to be decoded prior to the remainder of the file being received or read by the decoder. The decoder can display the first segment (layer) as a miniature version of the entire image or can enlarge the miniature to display a coarse or "splash" quality rendition of the original image. As each successive file segment or layer is received, the decoder enhances the quality of the displayed picture by selectively adding detail and correcting pixel values.

Like the encoding process, the decoding of an image can be viewed as a multi-step process that uses a variety of decoding methods which include inverse mathematical transformations, inverse quantization techniques, etc. Conventional decoders are designed to have an inverse function relative to the encoding system. These inverse decoding methods must match the encoding process used to encode the image. In addition, where an encoder makes content-sensitive adaptations to the compression algorithm, the decoder must apply a matching content-sensitive decoding process.

Generally, a decoder is designed to match a specific encoding process. Prior art compression systems exist that allow the decoder to adjust particular parameters, but the prior art encoders must also transmit accompanying tables and other information. In addition, many conventional decoders are limited to specific decoding methods that do not accommodate content-sensitive adaptations.

SUMMARY OF THE INVENTION

The problems outlined above are solved by the method and apparatus of the present invention. That is, the computer-based image compression system of the present invention includes a unique encoder which compresses images and a unique decoder which decompresses images. The unique compression system obtains high compression ratios at all image quality levels while achieving relatively quick encoding and decoding times.

A high compression ratio enables faster image transmission and reduces the amount of storage space required to store an image. When compared with conventional compression techniques, such as the Joint Photographic Experts Group (JPEG), the present invention significantly increases the compression ratio for color images which, when decompressed, are of comparable quality to the JPEG images. The exact improvement over JPEG will depend on image content, resolution, and other factors.

Smaller image files translate into direct storage and transmission time savings. In addition, the present invention reduces the number of operations to encode and decode an image when compared to JPEG and other compression methods of a similar nature. Reducing the number of operations reduces the amount of time and computing resources needed to encode and decode an image, and thus improves computer system response times.

Furthermore, the image compression system of the present invention optimizes the encoding process to accommodate different image types. As explained below, the present invention uses fuzzy logic techniques to automatically analyze and decompose a source image, classify its components, select the optimal compression method for each component, and determine the optimal content-sensitive parameters of the selected compression methods. The encoder does not need prior information regarding the type of image or information regarding which compression methods to apply. Thus, a user does not need to provide compression system customization or need to set the parameters of the compression methods.

The present invention is designed with the goal of providing an image compression system that reliably compresses any type of image with the highest achievable efficiency, while maintaining a consistent range of viewing qualities. Automating the system's adaptivity to varied image types allows for a minimum of human intervention in the encoding process and results in a system where the compression and decompression process are virtually transparent to the users.

The encoder and decoder of the present invention contain a library of encoding methods that are treated as a "toolbox." The toolbox allows the encoder to selectively apply particular encoding methods or tools that optimize the compression ratio for a particular image component. The toolbox approach allows the encoder to support many different encoding methods in one program, and accommodates the invention of new encoding methods without invalidating existing decoders. The toolbox approach thus allows upgradeability for future improvements in compression methods and adaptation to new technologies.

A further feature of the present invention is that the encoder creates a file format that segments or "layers" the compressed image. The layering of the compressed image allows the decoder to display image file segments, beginning with the data at the front of the file, in a coherent sequence which begins with the decoding and display of the information that constitutes the core of the image as defined by human perception. This core information can appear as a good quality miniature of the image and/or as a full sized "splash" or coarse quality version of the image. Both the miniature and splash image enable the user to view the essence of an image from a relatively small amount of encoded data. In applications where the image file is being transmitted over a data channel, such as a telephone line or limited bandwidth wireless channel, display of the miniature and/or splash image occurs as soon as the first segment or layer of the file is received. This allows users to view the image quickly and to see detail being added to the image as subsequent layers are received, decoded, and added to the core image.

The decoder decompresses the miniature and the full sized splash quality image from the same information. User specified preferences and the application determine whether the miniature and/or the full sized splash quality image are displayed for any given image.

Whether the first layer is displayed as a miniature or a splash quality full size image, the receipt of each successive layer allows the decoder to add additional image detail and sharpness. Information from the previous layer is supplemented, not discarded, so that the image is built layer by layer. Thus a single compressed file with a layered file format can store both a thumbnail and a full size version of the image and can store the full size version at various quality levels without storing any redundant information.

The layered approach of the present invention allows the transmission or decoding of only the part of the compressed file which is necessary to display a desired image quality. Thus, a single compressed file can generate a thumbnail and different quality full size images without the need to recompress the file to a smaller size and lesser quality, or store multiple files compressed to different file sizes and quality levels.

This feature is particularly advantageous for on line service applications, such as shopping or other applications where the user or the application developer may want several thumbnail images downloaded and presented before the user chooses to receive the entire full size, high quality image. In addition to conserving the time and transmission costs associated with viewing a variety of high quality images that may not be of interest, the user need only subsequently download the remainder of each image file to view the higher detail versions of the image.

The layered format also allows the storage of different layers of the compressed data file separate from one another. Thus, the core image data (miniature) can be stored locally (e.g., in fast RAM memory for fast access), and the higher quality "enhancement" layers can be stored remotely in lower cost bulk storage.

A further feature of the layered file format of the present invention allows the addition of other compressed data information. The layered and segmented file format is extendable so that new layers of compressed information such as sound, text and video can be added to the compressed image data file. The extendable file format allows the compression system to adapt to new image types and to combine compressed image data with sound, text and video.

Like the encoder, the decoder of the present invention includes a toolbox of decoding methods. The decoding process can begin with the decoder first determining the encoding methods used to encode each data segment. The decoder determines the encoding methods from instructions the encoder inserts into the compressed data file.

Adding decoder instructions to the compressed image data provides several advantages. A decoder that recognizes the instructions can decode files from a variety of different encoders, accommodate content-sensitive encoding methods, and adjust to user specific needs. The decoder of the present invention also skips parts of the data stream that contain data that are unnecessary for a given rendition of the image, or ignore parts of the data stream that are in an unknown format. The ability to ignore unknown formats allows future file layers to be added while maintaining compatibility with older decoders.

In a preferred embodiment of the present invention, the encoder compresses an image using a first Reed Spline Filter, an image classifier, a discrete cosine transform, a second and third Reed Spline Filter, a differential pulse code modulator, an enhancement analyzer, and an adaptive vector quantizer to generate a plurality of data segments that contain the compressed image. The plurality of data segments are further compressed with a channel encoder.

The Reed Spline Filter includes a color space conversion transform, a decimation step and a least mean squared error (LMSE) spline fitting step. The output of the first Reed Spline Filter is then analyzed to determine an image type for optimal compression. The first Reed Spline Filter outputs three components which are analyzed by the image classifier. The image classifier uses fuzzy logic techniques to classify the image type. Once the image type is determined, the first component is separated from the second and third components and further compressed with an optimized discrete cosine transform and an adaptive vector quantizer.

The second and third components are further compressed with a second and third Reed Spline Filter, the adaptive vector quantizer, and a differential pulse code modulator.

The enhancement analyzer enhances areas of an image determined to be the most visually important, such as text or edges. The enhancement analyzer determines the visual priority of pixel blocks. The pixel block dimensions typically correspond to 16×16 pixel blocks in the source image. In addition, the enhancement analyzer prioritizes each pixel block so that the most important enhancement information is placed in the earliest enhancement layers so that it can be decoded first. The output of the enhancement analyzer is compressed with the adaptive vector quantizer.

A user may set the encoder to compute a color palette optimized to the color image. The color palette is combined with the output of the discrete cosine transform, the adaptive vector quantizer, the differential pulse code modulator, and the enhancement analyzer to create a plurality of data segments. The channel encoder then interleaves and compresses the plurality of data segments.

BRIEF DESCRIPTION OF THE DRAWINGS

These and other aspects, advantages, and novel features of the invention will become apparent upon reading the following detailed description and upon reference to accompanying drawings in which:

FIGS. 22a, 22b, 22c and 22d illustrate the layering and interleaving of the plurality of data segments;

FIG. 33 illustrates a table of several examples showing the mapping from input measurements to input sets to output sets;

FIGS. 41a, 41b and 41c are perspective and plan views of a two-dimensional planar spline basis;

DETAILED DESCRIPTION OF THE INVENTION

Figure 1:
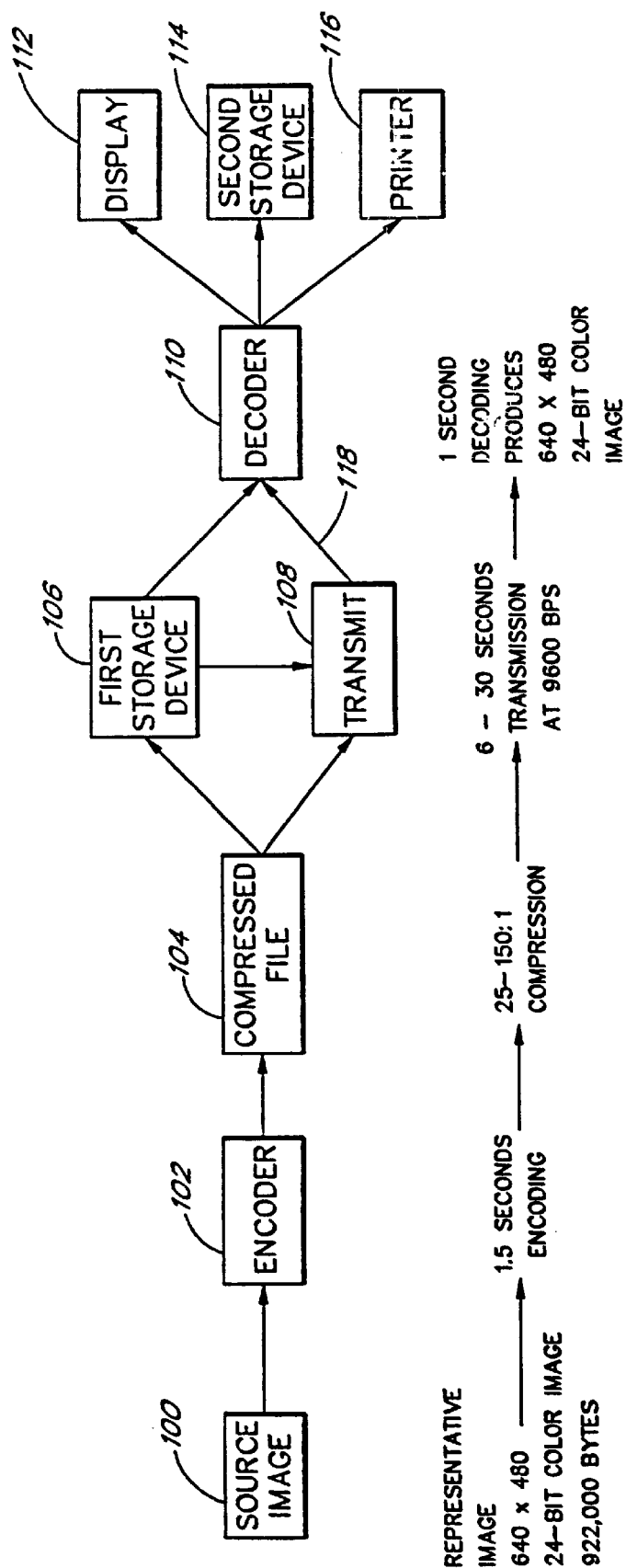
FIG. 1 is a block diagram of an image compression system that encodes, transfers and decodes an image and includes a source image, an encoder, a compressed file, a first storage device, a data channel, a data stream, a decoder, a display, a second storage device, and a printer.

FIG. 1 illustrates a block diagram of an image compression system that includes a source image 100, an encoder 102, a compressed file 104, a first storage device 106, a communication data channel 108, a decoder 110, a display 112, a second storage device 114, and a printer 116. The source image 100 is represented as a two-dimensional image array of picture elements, or pixels. The number of pixels determines the resolution of the source image 100, which is typically measured by the number of horizontal and vertical pixels contained in the two-dimensional image array.

Each pixel is assigned a number of bits that represent the intensity level of the three primary colors: red, green, and blue. In the preferred embodiment, the full-color source image 100 is represented with 24 bits;, where 8 bits are assigned to each primary color. Thus, the total storage required for an uncompressed image is computed as the number of pixels in the image times the number of bits used to represent each pixel (referred to as bits per pixel).

As discussed in more detail below, the encoder 102 uses decimation, filtering, mathematical transforms, and quantization techniques to concentrate the image into fewer data samples representing the image with fewer bits per pixel than the original format. Once the source image 100 is compressed with the encoder 102, the set of compressed data are assembled in the compressed file 104. The compressed file 104 is stored in the first storage device 106 or transmitted to another location via the data channel 108. If the compressed file 104 is transmitted to another location, the data stored in the compressed file 104 is transmitted sequentially via the data channel 108. The sequence of bits in the compressed file 104 that are transmitted via the data channel 108 is referred to as a data stream 118.

The decoder 110 expands the compressed file 104 to the original source image size. During the process of decoding the compressed file 104, the decoder 110 displays the expanded source image 100 on the display 112. In addition, the decoder 110 may store the expanded compressed file 104 in the second storage device 114 or print the expanded compressed file 104 on the printer 116.

For example, if the source image 100 comprises a 640× 480, 24-bit color image, the amount of memory needed to store and display the source image 100 is approximately 922,000 bytes. In the preferred embodiment, the encoder 102 computes the highest compression ratio for a given decoding quality and playback model. The playback model allows a user to select the decoding mode as is discussed in more detail below. The compressed data are then assembled in the compressed file 104 for transmittal via the data channel 108 or stored in the first storage device 106. For example, at a 92-to-1 compression ratio, the 922,000 bytes that represent the source image 100 are compressed into approximately 10,000 bytes. In addition, the encoder 102 arranges the compressed data into layers in the compressed file 104.

Figure 2:
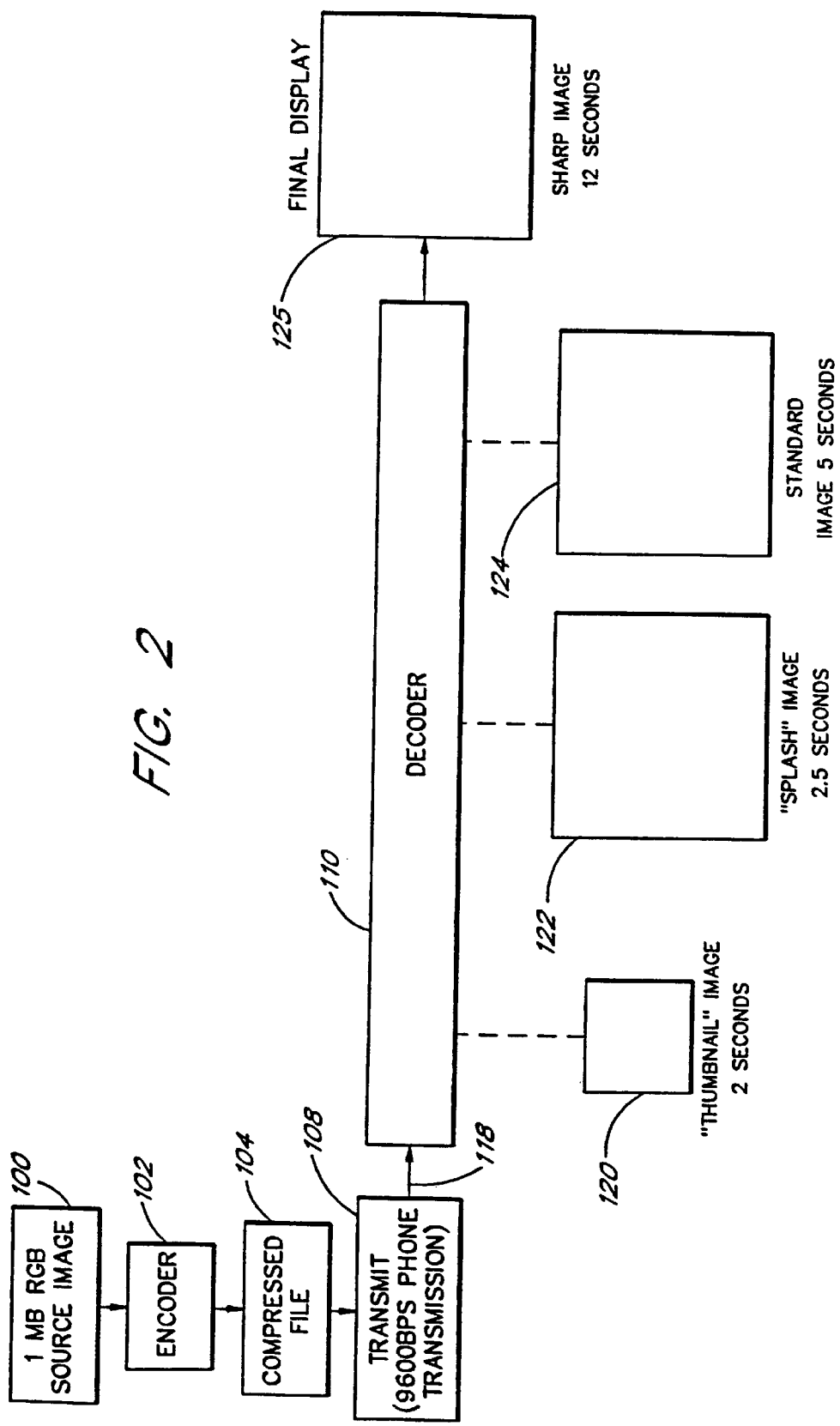
FIG. 2 illustrates the multi-step decoding process and includes the source image, the encoder, the compressed file, the data channel, the data stream, the decoder, a thumbnail image, a splash image, a panellized standard image, and the final representation of the source image.

Referring to FIG. 2, it can be seen that the layering of the compressed file 104 allows the decoder 110 to display a thumbnail image and progressively improving quality versions of the source image 100 before the decoder 110 receives the entire compressed file 104. The first data expanded by the decoder 110 can be viewed as a thumbnail miniature 120 of the original image or as a coarse quality "splash" image 122 with the same dimensions as the original image. The splash image 122 is a result of interpolating the thumbnail miniature to the dimensions of the original image. As the decoder 110 continues to receive data from the data stream 118, the decoder 110 creates a standard image 124 by decoding the second layer of information and adding it to the splash image 122 data to create a higher quality image. The encoder 102 can create a user-specified number of layers in which each layer is decoded and added to the displayed image as data is received. Upon receiving the entire compressed file 104 via the data stream 118, the decoder 110 displays an enhanced image 105 that is the highest quality reconstructed image that can be obtained from the compressed data stream 118.

Figure 3:
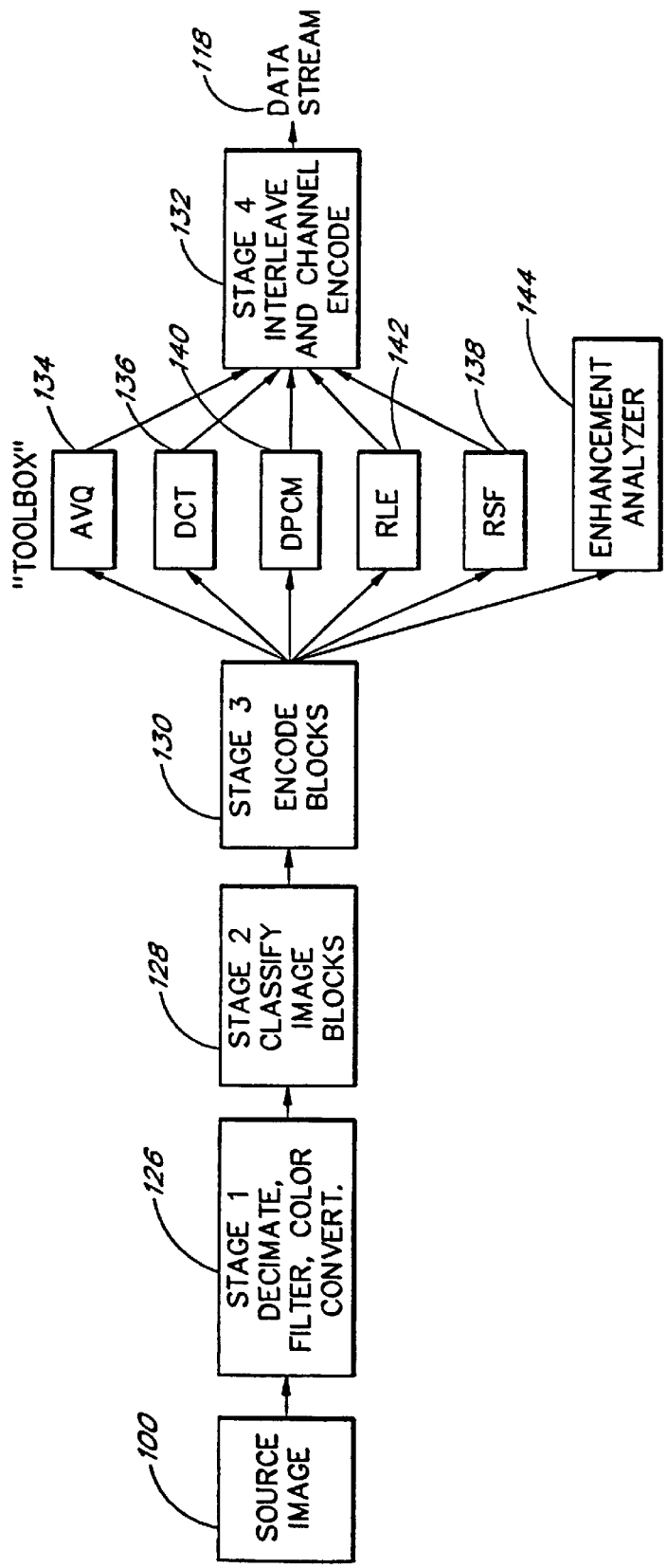
FIG. 3 is a block diagram of the encoder showing the four stages of the encoding process.

FIG. 3 illustrates a block diagram of the encoder 102 constructed in accordance with the present invention. The encoder 102 compresses the source image 100 in four main stages. In a first stage 126, the source image 100 is formatted, processed by a Reed Spline Filter and color converted. In a second stage 128, the encoder 102 classifies the source image 100 in blocks. In a third stage 130, the encoder 102 selectively applies particular encoding methods that optimize the compression ratio. Finally, the compressed data are interleaved and channel encoded in a fourth stage 132.

The encoder 102 contains a library of encoding methods that are treated as a toolbox. The toolbox allows the encoder 102 to selectively apply particular encoding methods that optimize the compression ratio for a particular image type. In the preferred embodiment, the encoder 102 includes at least one of the following: an adaptive vector quantizer (AVQ 134), an optimized discrete cosine transform (optimized DCT 136), a Reed Spline Filter 138 (RSF), a differential pulse code modulator (DPCM 140), a run length encoder (RLE 142), and an enhancement analyzer 144.

Figure 4:
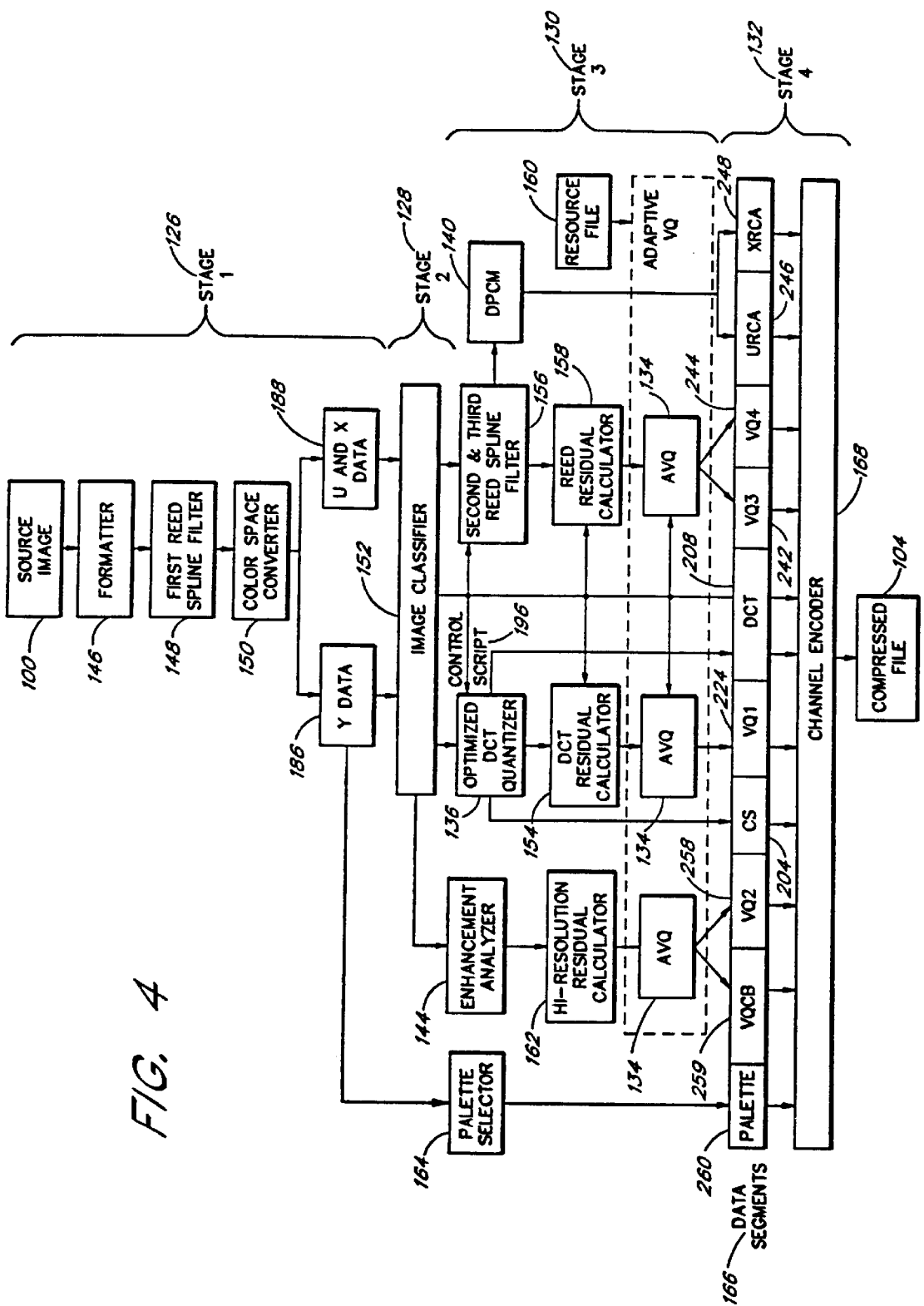
FIG. 4 is a block diagram of the encoder showing a first Reed Spline Filter, a color space conversion transform, a Y miniature, a U miniature, an X miniature, an image classifier, an optimized discrete cosine transform, a discrete cosine transform residual calculator, an adaptive vector quantizer, a second and third Reed Spline Filter, a Reed Spline residual calculator, a differential pulse coder modulator, an enhancement analyzer, a high resolution residual calculator, a palette selector, a plurality of data segments and a channel encoder.

FIG. 4 illustrates a more detailed block diagram of the encoder 102. The first stage 126 of the encoder 102 includes a formatter 146, a first Reed Spline Filter 148 and a color space converter 150 which produces Y data 186, and U and X data 188. The second stage 128 includes an image classifier 152. The third stage includes an optimized discrete cosine transform and adaptive DCT quantization (optimized DCT 136), a DCT residual calculator 154, the adaptive vector quantizer (AVQ 134), a second and a third Reed Spline Filter 156, a Reed Spline residual calculator 158, the differential pulse code modulator (DPCM 140), a resource file 160, the enhancement analyzer 144, a high resolution residual calculator 162, and a palette selector 1654. The fourth stage includes a plurality of data segments 166 and a channel encoder 168. The output of the channel encoder 168 is stored in the compressed file 104.

Figure 5:
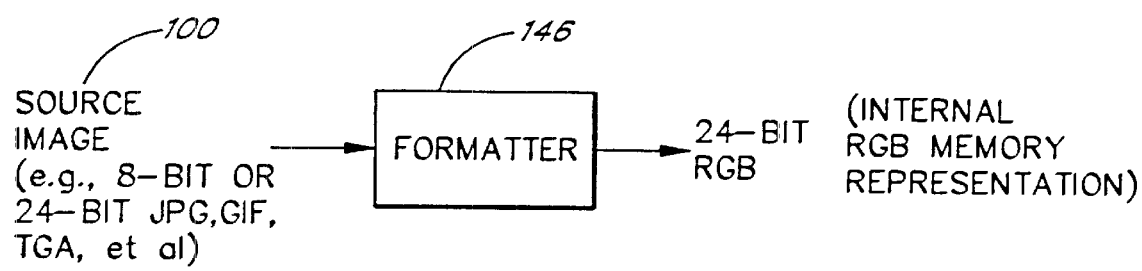
FIG. 5 is a block diagram of the image formatter.

The formatter 146, as shown in more detail in FIG. 5, converts the source image 100 from its native format to a 24-bit red, green and blue pixel array. For example, if the source image 100 is an 8-bit palletized image, the formatter converts the 8-bit palletized image to a 24-bit red, green, and blue equivalent.

Figure 6:
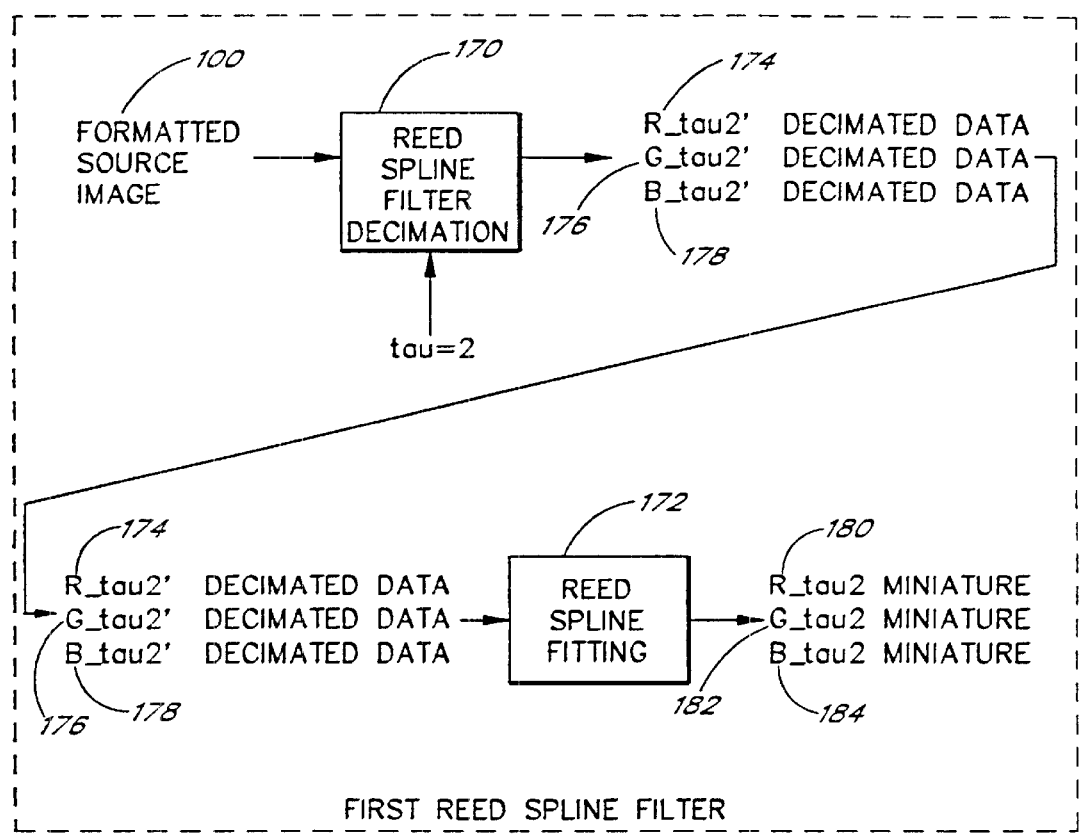
FIG. 6 is a block diagram of the Reed Spline Filter.

The first Reed Spline Filter 148, illustrated in more detail in FIG. 6, uses a two-step process to compress the formatted source image 100. The two-step process comprises a decimation step performed in block 170 and a spline fitting step performed in a block 172. As explained in more detail below, the decimation step in the block 170 decimates each color component of red, green, and blue by a factor of two along the vertical and horizontal dimensions using a Reed Spline decimation kernal. The decimation factor is called "tau." The R_tau2' decimated data 174 corresponds to the red component decimated by a factor of 2. The G_tau2' decimated data 176 corresponds to the green component decimated by a factor of 2. The B_tau2' decimated data 178 corresponds to the blue component decimated by a factor of 2.

In the spline fitting step in block 172, the first Reed Spline Filter 148 partially restores the source image detail lost by the decimation in block 170. The spline fitting step in block 172 processes the R_tau2' decimated data 172, the G_tau2' decimated data, and the B_tau2' decimated data to calculate optimal reconstruction weights.

As explained in more detail below, the decoder 110 will interpolate the decimated data into a full sized image. In this interpolation, the decoder 110 uses the reconstruction weights which have been calculated by the Reed Spline Filter in such a way as to minimize the mean squared error between the original image components and the interpolated image components. Accordingly the Reed Spline Filter 148 causes the interpolated image to match the original image more closely and increases the overall sharpness of the interpolated picture. In addition, reducing the error arising from the decimation step in block 170 reduces the amount of data needed to represent the residual image. The residual image is the difference between the reconstructed image and the original image.

The reconstruction weights output from the Reed Spline Filter 148 form a "miniature" of the original source image 100 for each primary color of red, green, and blue, wherein each red, green, and blue miniature is one-quarter the resolution of the original source image 100 when a tau of 2 is used.

More specifically, the preferred color space converter 150 transforms the R_tau2 miniature 180, the G_tau2 miniature 182 and the B_tau2 miniature 184 output by the first Reed Spline Filter 148 into a different color coordinate system in which one component is the luminance Y data 186 and the other two components are related to the chrominance U and X data 188. The color space converter 150 transforms the RGB to the YUX color space according to the following formulas:

$$Y = 0.29900R + 0.58700G + 0.11400B$$

$$U = 0.16870R + 0.33120G + 0.50000B$$

$$X = 0.50000R - 1.08216G + 0.91869B$$

Referring to FIG. 6, it can be seen that a R_tau2 miniature 180 corresponds to a miniature that is decimated and spline fitted by a factor of 2. A G_tau2 miniature 182 corresponds to a green miniature that is decimated and spline fitted by a factor of 2. A B_tau2 miniature 184 corresponds to a blue miniature that is decimated and spline fitted by a factor of 2.

Figure 7:
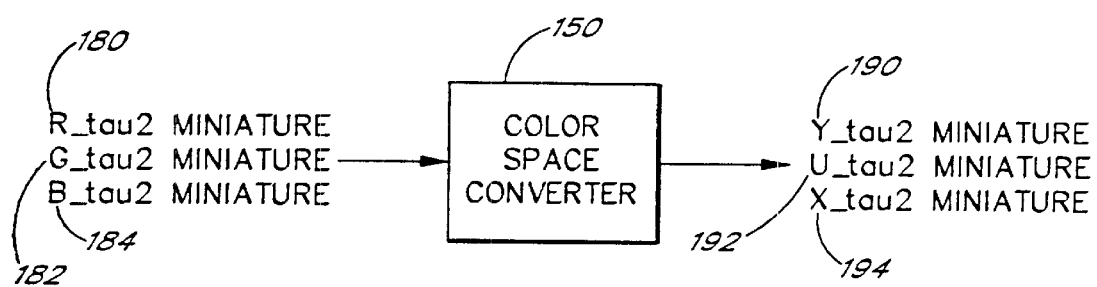
FIG. 7 is a block diagram of the color space conversion transform.

FIG. 7 illustrates the color space converter 150 of FIG. 4. The color space converter 150 transforms the R_tau2 miniature 180, the G_tau2 miniature 182 and the B_tau2 miniature 184 output by the first Reed Spline Filter 148 into a different color coordinate system in which one component is the luminance Y data 186 and the other two components are related to the chrominance U and X data 188 as shown in FIG. 4. Thus the color space converter 150 transforms the R_tau2 miniature 180, the G_tau2 miniature 182 and the B_tau2 miniature 184 into a Y_tau2 miniature 190, a U_tau2 miniature 192 and an X_tau2 miniature 194.

Figure 8:
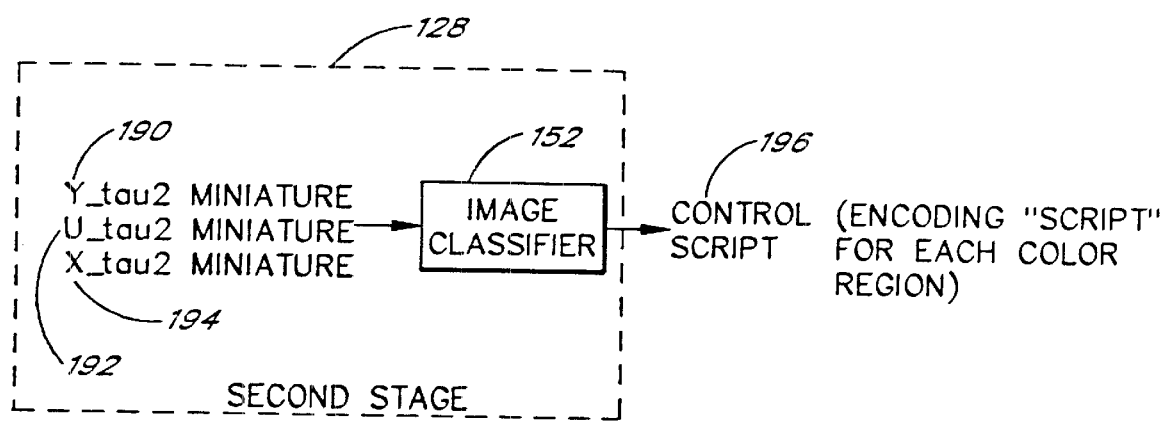
FIG. 8 is a block diagram of the image classifier.

Referring to FIG. 8, it can be seen that the second stage 128 of the encoder 102 includes an image classifier 152 that determines the image type by analyzing the Y_tau2 miniature 190, the U_tau2 miniature 192 and the X_tau2 miniature 194. The image classifier 152 uses a fuzzy logic rule base to classify an image into one or more of its known classes. In the preferred embodiment, these classes include gray scale, graphics, text, photographs, high activity and low activity images. The image classifier 152 also decomposes the source image 100 into block units and classifies each block. Since the source image 100 includes a combination of different image types, the image classifier 152 sub-divides the source image 100 into distinct regions. The image classifier 152 then outputs the control script 196 that specifies the correct compression methods for each region. The control script 196 specifies which compression methods to apply in the third stage 130, and specifies the channel encoding methods to apply in the fourth stage 132.

As shown in FIG. 4, during the third stage 130, the encoder 102 uses the control script 196 to select the optimal compression methods from its compression toolbox. The encoder 102 separates the Y data 186 from the U and X data 188. Thus, the encoder 102 separates the Y_tau2 miniature 190 from the U_tau2 miniature 192 and the X_tau2 miniature 194, and passes the Y_tau2 miniature 190 to the optimized DCT 136, and passes the U_tau2 miniature 192 and the X_tau2 miniature 194 to a second and third Reed Spline Filter 156.

Figure 9:
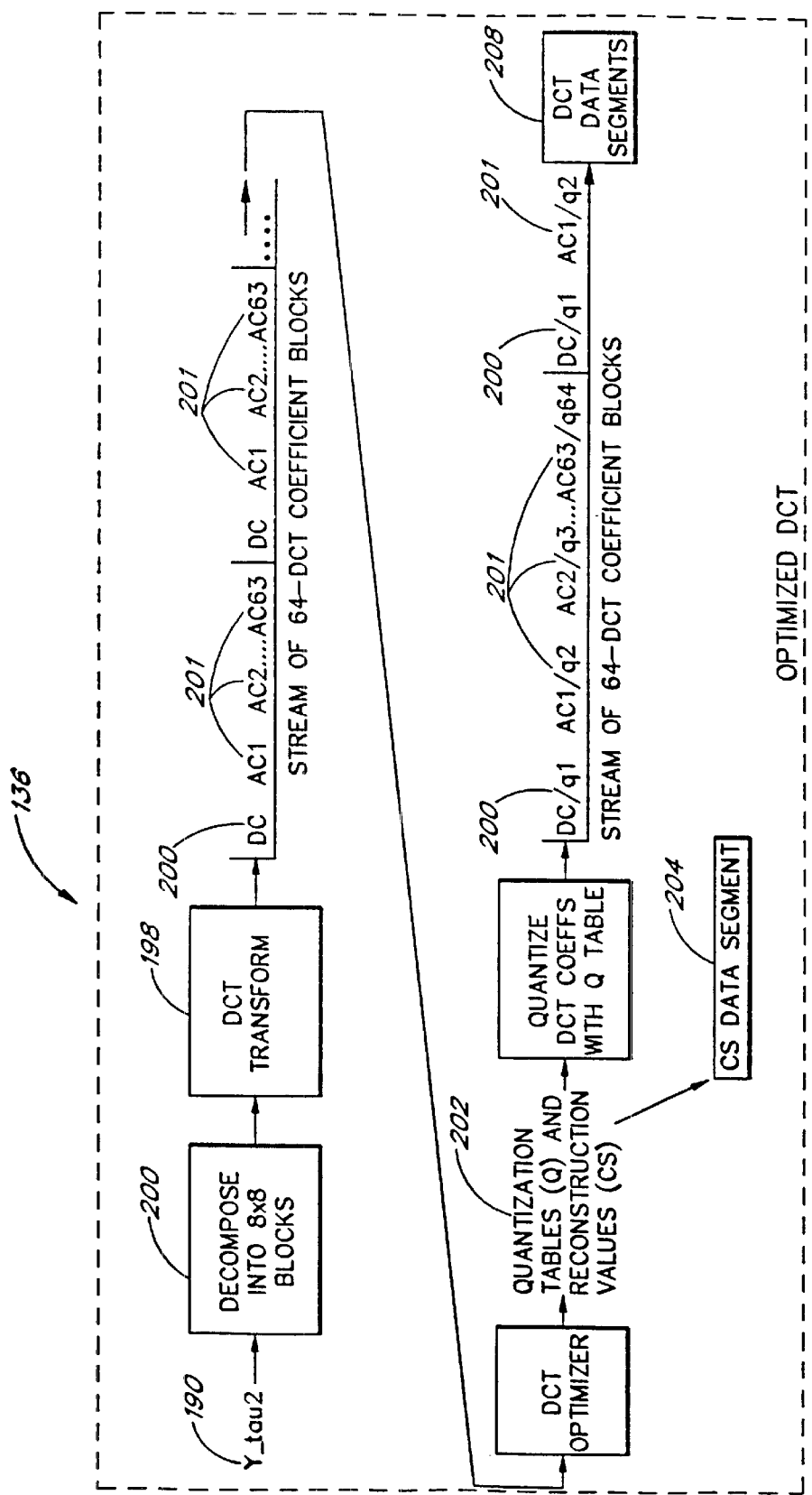
FIG. 9 is a block diagram of the optimized discrete cosine transform.

As illustrated in FIG. 9, the optimized DCT 136 subdivides the Y_tau2 miniature 190 into a set of 8×8 pixel blocks and transforms each 8×8 pixel block into sixty-four DCT coefficients 198. The DCT coefficients include the AC terms 200 and the DC terms 201. The DCT coefficients 198 are analyzed by the optimized DCT 136 to determine optimal quantization step sizes and reconstruction values. The optimized DCT 136 stores the optimal quantization step sizes (uniform or non-uniform) in a quantization table Q 202 and outputs the reconstruction values to the CS data segment 204. The optimized DCT 136 then quantizes the DCT coefficients 198 according to the quantization table Q 202. Once quantized, the optimized DCT 136 outputs the DCT quantized values 206 to the DCT data segment 208.

Figure 10:
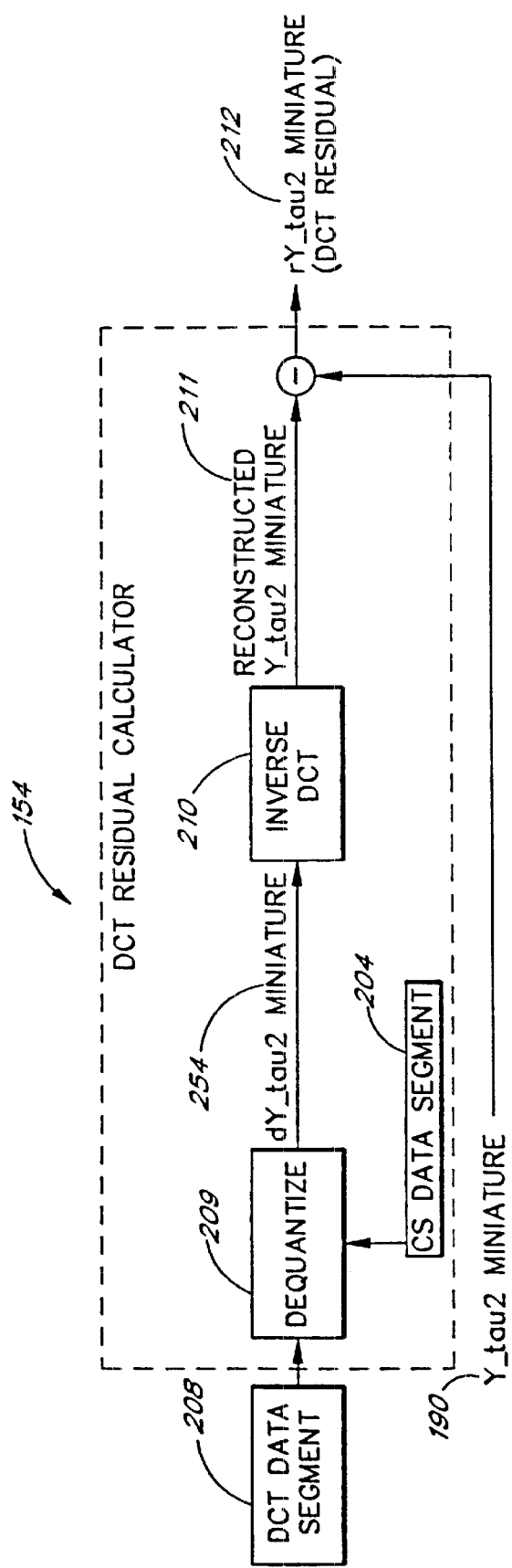
FIG. 10 is a block diagram of the DCT residual calculator.

In order to preserve the image information lost by the optimized DCT 136, the DCT residual calculator 154 (shown in FIG. 10) computes and compresses the DCT residual. The DCT residual calculator 154 dequantizes in a dequantizer 209 the DCT quantized values 206 stored in the DCT data segment 208 by multiplying the reconstruction values in the CS data segment 204 with the DCT quantized values 206. The DCT residual calculator 154 then reconstructs the dequantized DCT components with an inverse DCT 210 to generate a reconstructed dY_tau2 miniature 211. The reconstructed dY_tau2 miniature 211 is subtracted from the original Y_tau2 miniature 190 to create an rY_tau2 residual 212.

Figure 11:
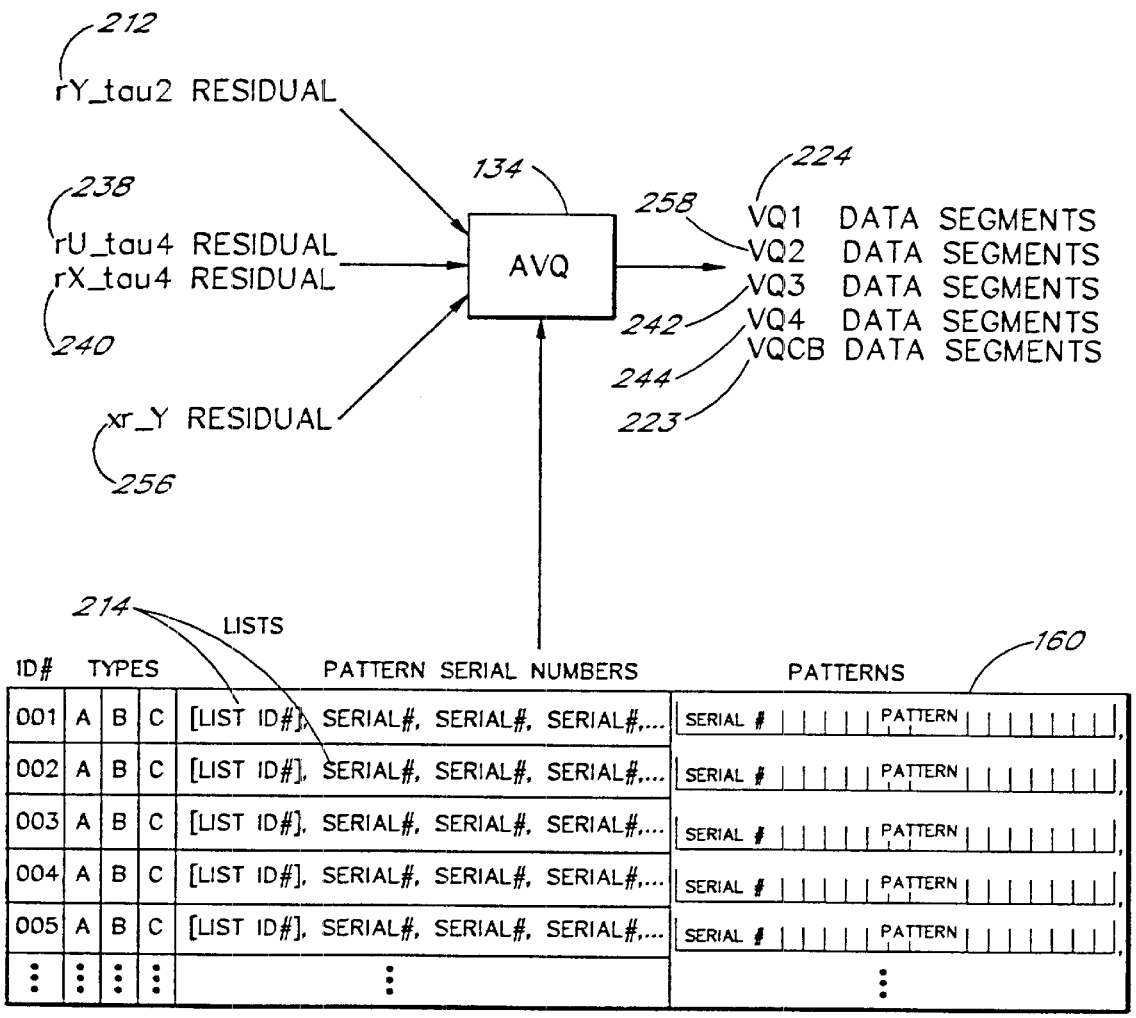
FIG. 11 is a block diagram of the adaptive vector quantizer.

Referring to FIG. 11, it can be seen that the rY_tau2 residual 212 is further compressed with the AVQ 134. The technique of vector quantization is used to represent a block of information as a single index that requires fewer bits of storage. As explained in more detail below, the AVQ 134 maintains a group of commonly occurring block patterns in a set of codebooks 214 stored in the resource file 160. The index references a particular block pattern within a particular codebook 214. The AVQ 134 compares the input block with the block patterns in the set of codebooks 214. If a block pattern in the set of codebooks 214 matches or closely approximates the input block, the AVQ 134 replaces the input block pattern with the index.

Thus, the AVQ 134 compresses the input block information into a list of indexes. The indexes are decompressed by replacing each index with the block pattern each index references in the set of codebooks 214. The decoder 110, as explained in more detail below, also has a set of the codebooks 214. During the decoding process the decoder 110 uses the list of indexes to reference block patterns stored in a particular codebook 214. The original source cannot be precisely recovered from the compressed representation since the indexed patterns in the codebook will not match the input block exactly. The degree of loss will depend on how well the codebook matches the input block.

As shown in FIG. 11, the AVQ 134 compresses the rY_tau2 residual 212, by sub-dividing the rY_tau2 residual 212 into 4×4 residual blocks and comparing the residual blocks with codebook patterns as explained above. The AVQ 134 replaces the residual blocks with the codebook indexes that minimize the squared error. The AVQ 134 outputs the list of codebook indexes to the VQ1 data segment 224. Thus, the VQ1 data segment 224 is a list of codebook indexes that identify block patterns in the codebook. As explained in more detail below, the AVQ 134 of the preferred embodiment also generates new codebook patterns that the AVQ 134 outputs to the set of codebooks 214. The added codebook patterns are stored in the VQCB data segment 223.

Figure 12:
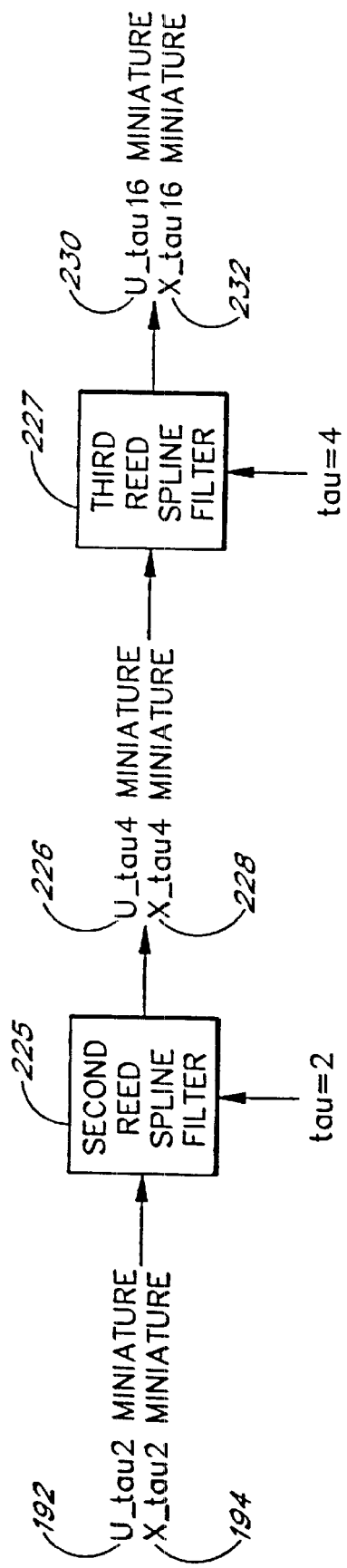
FIG. 12 is a block diagram of the second and third Reed Spline Filters.

FIG. 12 illustrates a block diagram of the second Reed Spline Filter 225 and third Reed Spline Filter 227. Once the image classifier 152 determines the particular image type, the U_tau2 miniature 192 and the X_tau2 miniature 194 are further decimated and filtered by the second Reed Spline Filter 225. Like the first Reed Spline Filter 148 shown in FIG. 6, the second Reed Spline Filter 225 compresses the U_tau2 miniature 192 and the X_tau2 miniature 194 in a two-step process. First, the U_tau2 miniature 192 and the X_tau2 miniature 194 are vertically and horizontally decimated by a factor of two. The decimated data are then spline fitted to determine optimal reconstruction weights that will minimize the mean square error of the reconstructed decimated miniatures. Once complete, the second Reed Spline Filter 225 outputs the optimal reconstruction values to create a U_tau4 miniature 226 and an X_tau4 miniature 228.

The third Reed Spline Filter 227 decimates the U_tau4 miniature 226 and the X_tau4 miniature 228 vertically and horizontally by a factor of four. The decimated image data are again spline fitted to create a U_tau16 miniature 230 and an X_tau16 miniature 232.

Figure 13:
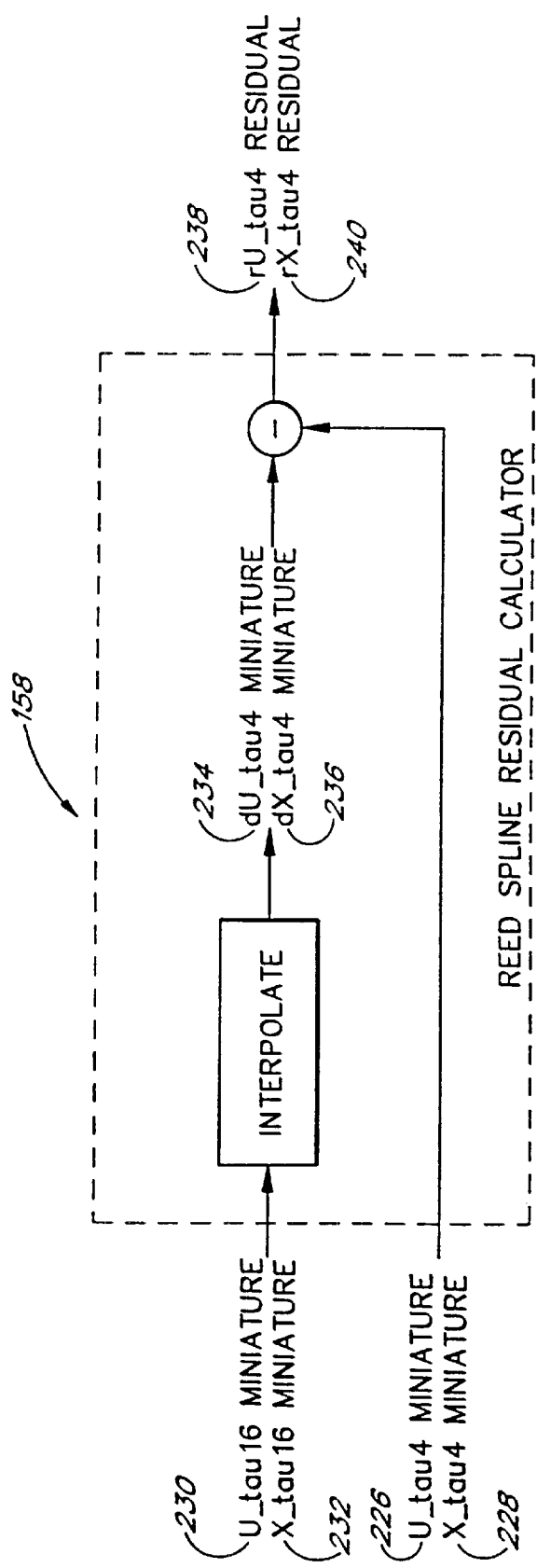
FIG. 13 is a block diagram of the Reed Spline residual calculator.

In FIG. 13 the Reed Spline residual calculator 158 preserves the image information lost by the second Reed Spline Filter 225 and the third Reed Spline Filter 227 by computing and compressing the Reed Spline Filter residual. The Reed Spline residual calculator 158 reconstructs the U_tau4 miniature 226 and X_tau4 miniature 228 by interpolating the U_tau16 miniature 230 and the X_tau16 miniature 232. The interpolated U_tau16 miniature 230 is referred to as a dU_tau4 miniature 234. The interpolated X_tau16 miniature 232 is referred to as a dX_tau4 miniature 236. The dU_tau4 miniature 234 and dX_tau4 miniature 236 are subtracted from the actual U_tau4 miniature 226 and X_tau4 miniature 228 to create an rU_tau4 residual 238 and an rX_tau4 residual 240.

As illustrated in FIG. 11, the rU_tau4 residual 238 and the rX_tau4 residual 240 are further compressed with the AVQ 134. The AVQ 134 subdivides the rU_tau4 residual 238 and the rX_tau4 residual 240 into 4×4 residual blocks. The residual blocks are compared with blocks in the set of codebooks 214 to find the codebook patterns that minimize the squared error. The AVQ 134 compresses the residual block by assigning an index that identifies the corresponding block pattern in the set of codebooks 214. Once complete, the AVQ 134 outputs the compressed residual as the VQ3 data segment 242 and the VQ4 data segment 244.

Figure 14:
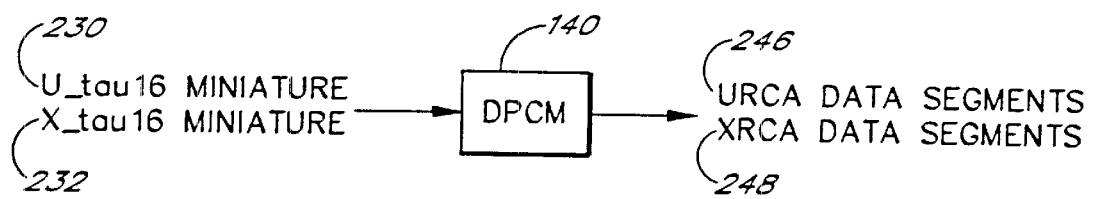
FIG. 14 is a block diagram of the differential pulse code modulator.

The U_tau16 miniature 230 and the X_tau16 miniature 232 are also compressed with the DPCM 140 as shown in FIG. 14. The DPCM 140 outputs the low-detail color components as the URCA data segment 246 and the XRCA data segment 248. The URCA data segment 246 and the XRCA data segment 248 form the low-detail color components that the decoder 110 uses to create the color thumbnail miniature 120 if this is included as a playback option in the compressed data stream 118.

Figure 15:
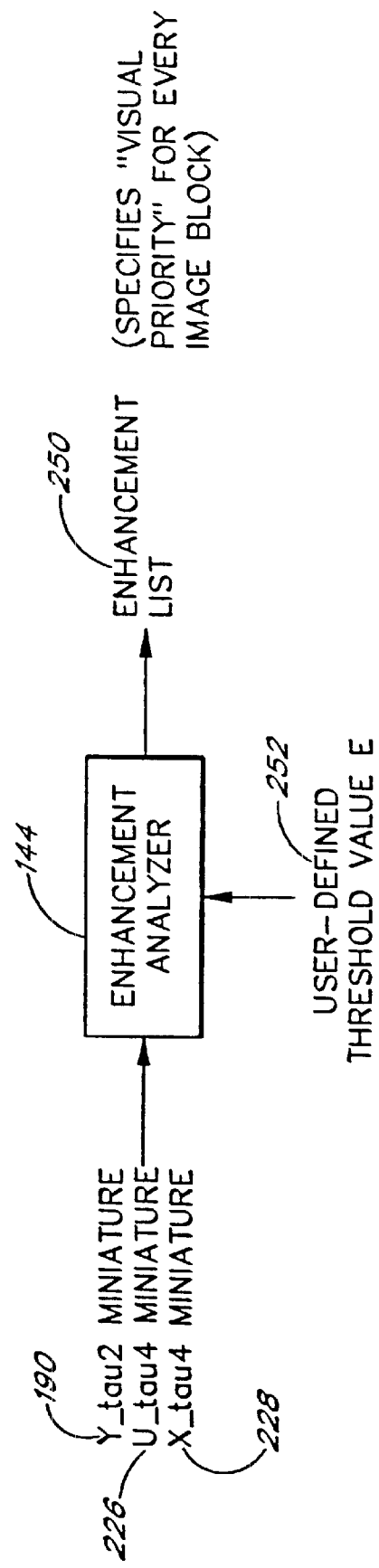
FIG. 15 is a block diagram of the enhancement analyzer.

FIG. 15 illustrates the enhancement analyzer 144 of the preferred embodiment. The Y_tau2 miniature 190, the U_tau4 miniature 226, and the X_tau4 miniature 228 are analyzed to determine an enhancement list 250 that specifies the visual priority of every 16×16 image block. The enhancement analyzer 144 determines the visual priority of each 16×16 image block by convolving the Y_tau2 miniature 190, the U_tau4 miniature 226, and the X_tau4 miniature 228 and comparing the result of the convolution to a threshold value E 252. The threshold value E 252 is user defined. The user can set the threshold value E 252 from zero to 200. The threshold value E 252 determines how much enhancement information the encoder 102 adds to the compressed file 104. Thus, setting the threshold value E 252 to zero will suppress any image enhancement information.

If the result of convolving a particular 16×16 high resolution block is greater than the threshold value E 252, the 16×16 high-resolution block is prioritized and added to the enhancement list 250. Thus the enhancement list 250 identifies which 16×16 blocks are coded and prioritizes how the 16×16 coded blocks are listed.

Figure 16:
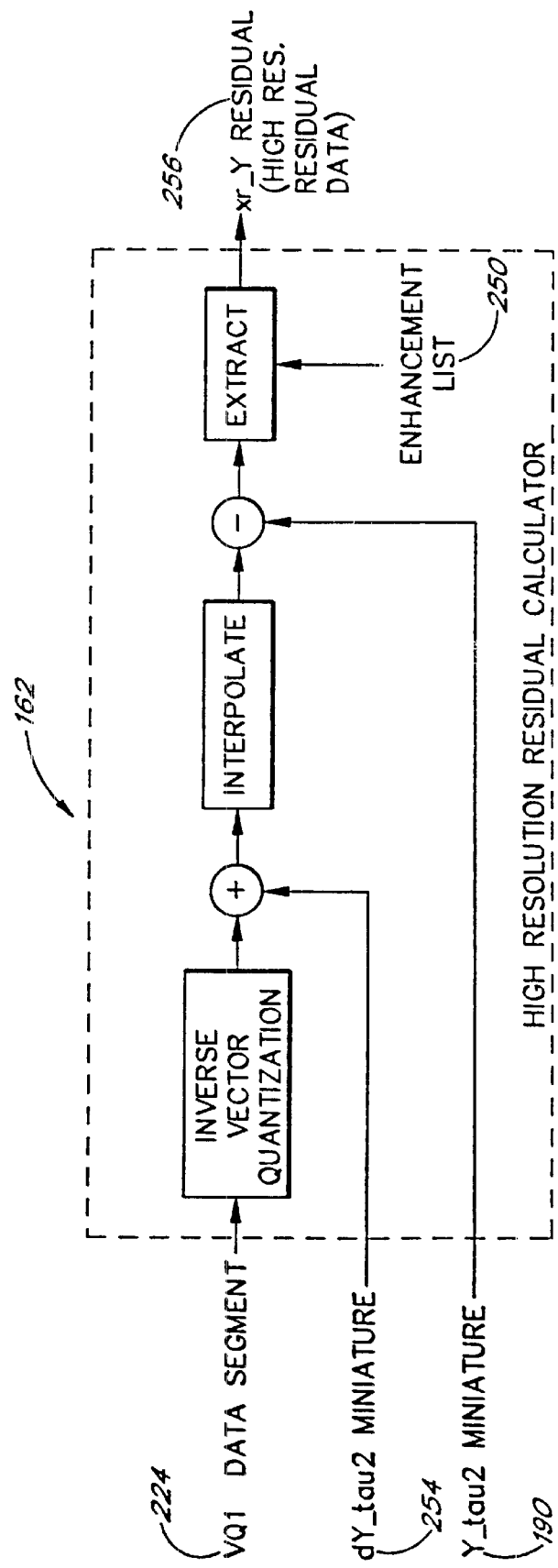
FIG. 16 is a block diagram of the high resolution residual calculator.

The high resolution residual calculator 162, as shown in FIG. 16, determines the high resolution residual for each 16×16 high resolution block identified in the enhancement list 250. The high resolution residual calculator 162 translates the VQ1 data segment 224 from the AVQ 134 into a reconstructed rY_tau2 residual 212 by mapping the indexes in the VQ1 data segment 224 to the patterns in the codebook. The reconstructed rY_tau2 residual is added to the dY_tau2 miniature 254 (dequantized DCT components).

The result is interpolated by a factor of two in the vertical and horizontal dimensions and is subtracted from the original Y_tau2 190 miniature to form the high resolution residual.

The high resolution residual calculator 162 then extracts high resolution 16×16 blocks from the high resolution residual according to the priorities in the enhancement list 250. As will be explained in more detail below, the high resolution residual calculator 162 outputs the highest priority blocks in the first enhancement layer, the next-highest priority blocks in the second enhancement layer, etc. The high resolution residual blocks are referred to as the xr_Y residual 256.

The xr_Y residual 256 is further compressed with the AVQ 134. The AVQ 134 subdivides the xr_Y residual 256 into 4×4 residual blocks. The residual blocks are compared with blocks in the codebook. If a residual block corresponds to a block pattern in the codebook, the AVQ 134 compresses the 4×4 residual block by assigning an index that identifies the corresponding block pattern in the codebook. Once complete, the AVQ 134 outputs the compressed high resolution residual to the VQ2 data segment 258.

Figure 17:
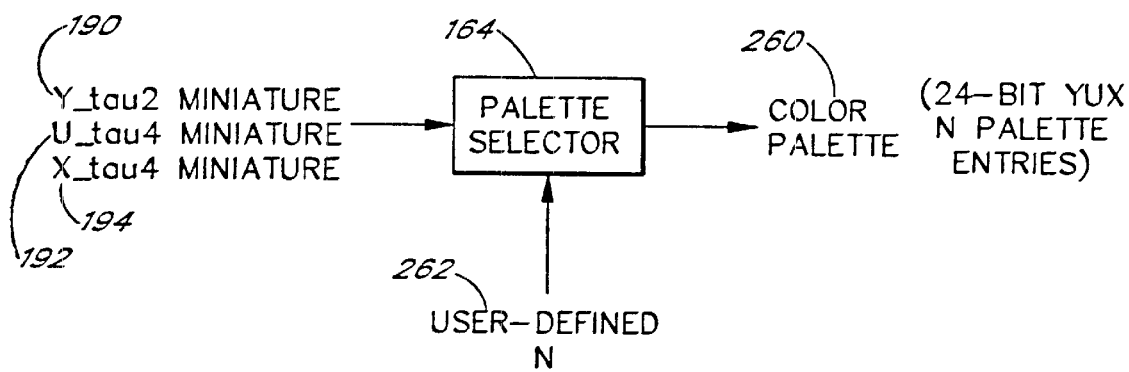
FIG. 17 is the block diagram of the palette selector.

FIG. 17 illustrates a block diagram of the palette selector 164. The palette selector 164 computes a "best-fit" 24-bit color palette 260 for the decoder 110. The palette selector 164 is optional and is user defined. The palette selector 164 computes the color palette 260 from the Y_tau2 miniature 190, the U_tau2 miniature 192 and the X_tau2 miniature 194. The user can select a number of palette entries N 262 to range from 0 to 255 entries. If the user selects a zero, no palette is computed. If enabled, the palette selector 164 adds the color palette 260 to a plurality of data segments 166.

Figure 18:
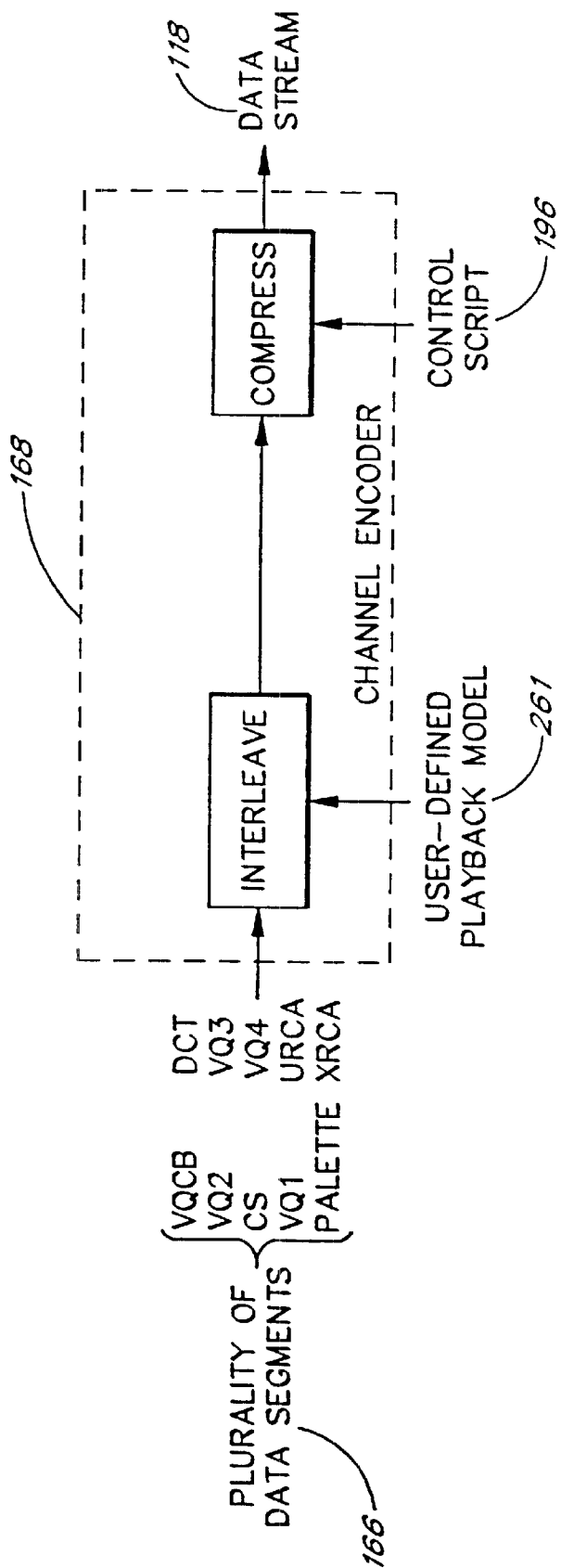
FIG. 18 is the block diagram of the channel encoder.

The channel encoder 168, as shown in FIG. 18, interleaves and channel encodes the plurality of data segments 166. Based on the user defined playback model 261, the plurality of data segments 166 are interleaved as follows: 1) as a single layer, single-pass comprising the entire image, 2) as two layers comprising the thumbnail miniature 120 and the remainder of the image 122 with enhancement information interleaved into each data block (panel) in the second layer, and 3) as multiple layers comprising the thumbnail miniature 120, the standard image 124, the sharp image 105, and additional layers as specified by the user. For each playback model an option exists to interleave the data for panellized or non-panellized display. The user defined playback model 261 is described in more detail below.

After interleaving the plurality of data segments 166, the channel encoder 168 compresses the plurality of data segments 166 in response to the control script 196. In the preferred embodiment, the channel encoder 168 compresses the plurality of data segments 166 with: 1) a Huffman encoding process that uses fixed tables, 2) a Huffman process that uses adaptive tables, 3) a conventional LZ1 coding technique or 4) a run-length encoding process. The channel encoder 168 chooses the optimal compression method based on the image type identified in the control script 196.

The Adaptive Vector Quantizer

Figure 19:
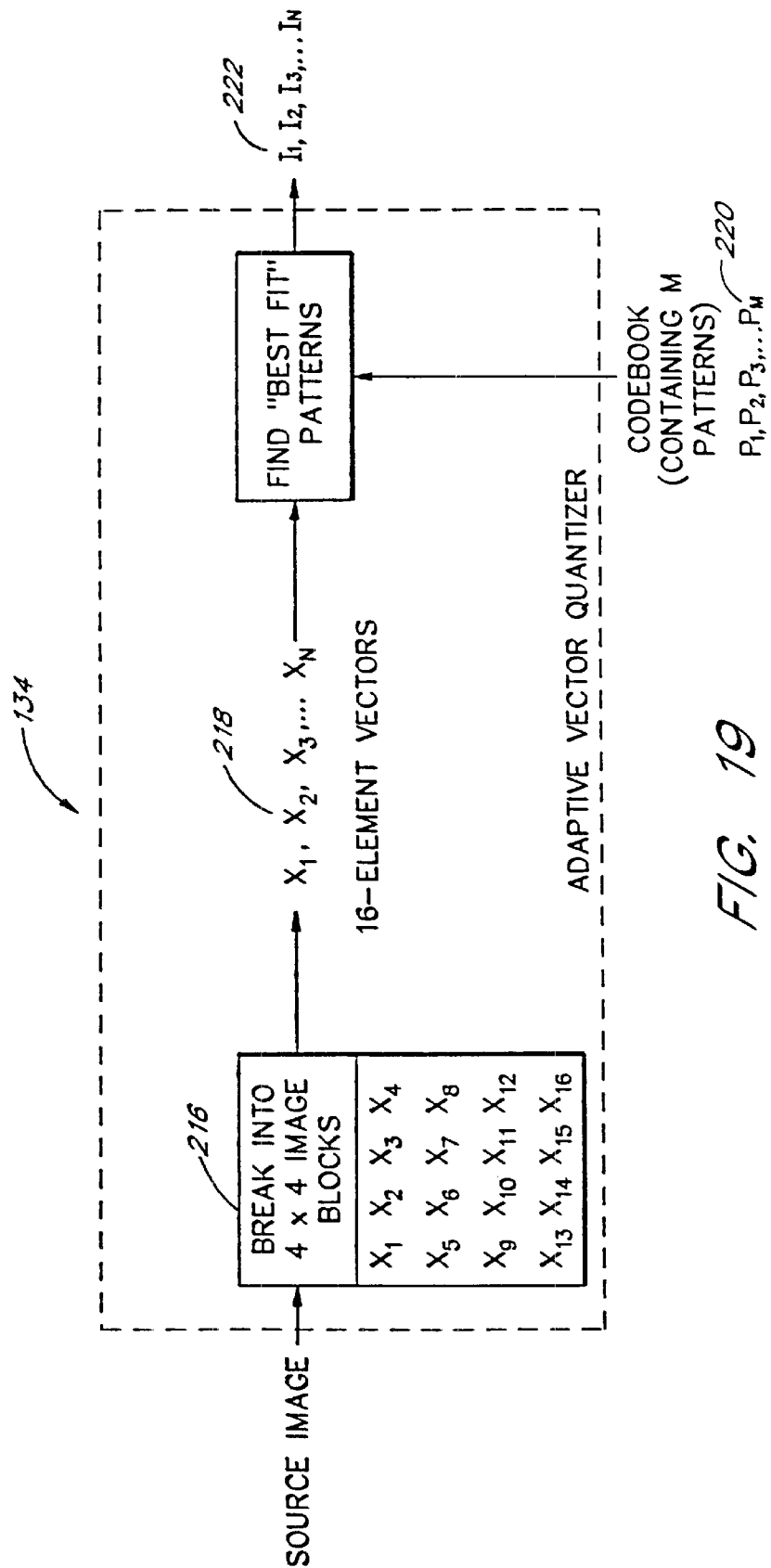
FIG. 19 is a block diagram of the vector quantization process.

The preferred embodiment of the AVQ 134 is illustrated in FIG. 19. More specifically, the AVQ 134 optimizes the vector quantization techniques described above. The AVQ 134 sub-divides the image data into a set of 4×4 pixel blocks 216. The 4×4 pixel blocks 216 include sixteen (16) elements $X_1, X_2, X_3 \ldots X_{16}$ 218, that start at: the upper left-hand corner and move left to right on every row to the bottom right-hand corner.

The codebook 214 of the present invention comprises M predetermined sixteen-element vectors, $P_1, P_2, P_3, \ldots P_M$ 220, that correspond to common patterns found in the population of images. The indexes $I^1, I_2, I_3, \ldots I_M$ 222 refer respectively to the patterns $P_1 P_2, P_3, \ldots, P_M$ 220.

Finding a best-fit pattern from the codebook 214 requires comparing each input block with every pattern in the codebook 214 and selecting the index that corresponds to the pattern with the minimum squared error summed over the 16 elements in the 4×4 block. The optimal code, C, for an input vector, X, is the index j such that pattern $P_j$ satisfies:

$$\sum_{i=0}^{15} \left[ \frac{(X_i - P_{ij})^2}{16} \right] = \min_{P_k \in P} \sum_{i=0}^{15} \left[ \frac{(X_i - P_{ik})^2}{16} \right]$$

where: $X_i$ is the ith element of the input vector, X and $P_{ik}$ is the ith element of the VQ pattern $P_k$.

The comparison equation finds the best match by selecting the minimum error term that results from comparing the input block with the codebook patterns. In other words, the AVQ 134 calculates the mean squared error term associated with each pattern in the codebook 214 in, order to determine which pattern in the codebook 214 has the minimum squared error (also referred to as the minimum error). The error term is the mean square error produced by subtracting the pattern element $P_{ik}$ from the input block element $X_i$, squaring the result and dividing by sixteen (16).

The process of searching for a matching pattern in the codebook 214 is time-consuming. The AVQ 134 of the preferred embodiment accelerates the pattern matching process with a variety of techniques.

First, in order to find the optimal codebook pattern, the AVQ 134 compares each input block term $X_i$ to the corresponding term in the codebook pattern $P_j$ being tested and calculates the total squared error for the first codebook pattern. This value is stored as the initial minimum error. For each of the other patterns $P_j = P_2, P_3, \ldots, P_M$ the AVQ 134 subtracts the $X_1$ and $P_{1j}$ terms and squares the result. The AVQ 134 compares the resulting squared error to the minimum error. If the squared error value is less than the minimum error, the AVQ 134 continues with the next input term $X_2$ and computes the squared error associated with $X_2$ and $P_{2j}$. The AVQ 134 adds the result to the squared error of the first two terms. The AVQ 134 then compares the accumulated squared error for $X_1$ and $X_2$ to the minimum error. If the accumulated squared error is less than the minimum error the squared error calculation continues until the AVQ 134 has evaluated all 16 terms.

If at any time in the comparison, the accumulated squared error for the new pattern is greater than the minimum squared error, the current pattern is immediately rejected and the AVQ 134 discontinues calculating the squared error for the remaining input block terms for that pattern. If the total squared error for the new pattern is less than the minimum error, the AVQ 134 replaces the minimum error with the squared error from the new pattern before making the comparisons for the remaining patterns.

Also, if the accumulated squared error for a particular codebook pattern is less than a predetermined threshold, the codebook pattern is immediately accepted and the AVQ 134 quits testing other codebook patterns. Furthermore, the codebook patterns in the present invention are ordered according to the frequency of matches. Thus, the AVQ 134 begins by comparing the input block with patterns in the codebook 214 that are most likely to match. Still further, the codebook patterns are grouped by the sum of their squared amplitudes. Thus the AVQ 134 selects a group of similar codebook patterns by summing the squared amplitude of an input block in order to determine which group of codebook patterns to search.

Besides improving the time it takes for the AVQ 134 to find an optimal codebook pattern, the AVQ 134 includes a set of codebooks 214 that are adapted to the input blocks (i.e., codebooks 214 that are optimized for input blocks that contain DCT residual values, high resolution residual values, etc.). Finally, the AVQ 134 of the preferred embodiment, 20 adapts a codebook 214 to the source image 100 by devising a set of new patterns to add to a codebook 214.

Therefore, the AVQ 134 of the preferred embodiment has three modes of operation: 1) the AVQ 134 uses a specified codebook 214, 2) the AVQ 134 selects the best-fit codebook 214, or 3) the AVQ 134 uses a combination of existing codebooks 214, and new patterns that the AVQ 134 creates. If the AVQ 134 creates new patterns, the AVQ 134 stores the new patterns in the VQCB data segment 223.

The Compressed File Format

Figure 20A:
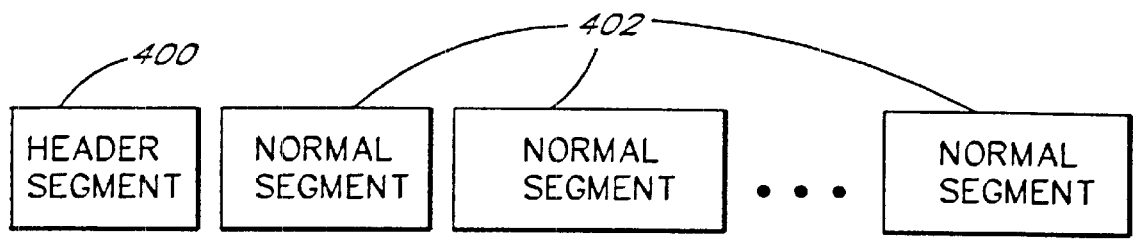
FIGS. 20a and 20b show the segmented architecture of the data stream.
Figure 20B:
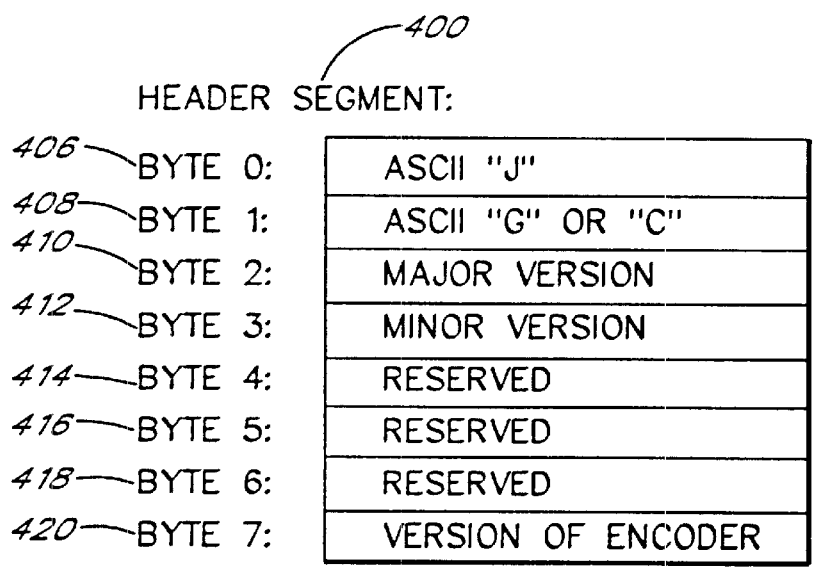

FIGS. 20a and 20b illustrate the segmented architecture of the data stream 118 that results from transmitting the compressed file 104. The segmented architecture of the compressed file 104 in the preferred embodiment allows layering of the compressed image data. Referring to FIG. 2, the layering of the compressed file 104 allows the decoder 110 to display the thumbnail miniature 120, the splash image 122 and the standard image 124 before the entire compressed file 104 is transferred. As the decoder 110 receives each successive layer of components, the decoder 110 adds additional detail to the displayed image.

In addition to layering the compressed data, the segmented architecture allows the decoder 110 of the preferred embodiment: 1) to move from one segment to the next in the stream without fully decoding segments of data, 2) to skip parts of the data stream 118 that contain data that is unnecessary for a given rendition of the image, 3) to ignore parts of the data stream 118 that are in an unknown format, 4) to process the data in an order that is configurable on the fly if the entire data stream 118 is stored locally, and 5) to store different layers of the compressed file 104 separately from one another.

As shown in FIG. 20a, the byte arrangement of the data stream 118 and the compressed file 104 includes a header segment 400 and a normal segment 402. The header segment 400 contains header information, and the normal segment 402 contains data. The header segment 400 is the first segment in the compressed file 104 and is the first segment transmitted with the data stream 118. In the preferred embodiment, the header segment 400 is eight bytes long.

As shown in FIG. 20b, the byte arrangement of the header segment 400 includes a byte 0 406 and a byte 1 408 of the header segment 400. Byte 0 406 and byte 1 408 of the header segment 400 identify the data stream 118. Byte 1 408 also indicates if the data stream 118 contains image data (indicated by a "G") or if it contains resource data (indicated by a "C"). Resource data includes color lookup tables, font information, and vector quantization tables.

Byte 2 410, byte 3 412, byte 4 414, byte 5 416, byte 6 418 and byte 7 420 of the header segment 400 specify which encoder 102 created the data stream 118. As new encoding methods are added to the encoder 102, new versions of the encoder 102 will be sold and distributed to decode the data encoded by the new methods. Thus, to remain compatible with prior encoders 102, the decoder 110 needs to identify which encoder 102 generated the compressed data. In the preferred embodiment, byte 7 420 identifies the encoder 102 and byte 2 410, byte 3 412, byte 4 414, byte 5 416, and byte 6 418 are reserved for future enhancements to the encoder 102.

Figure 21:
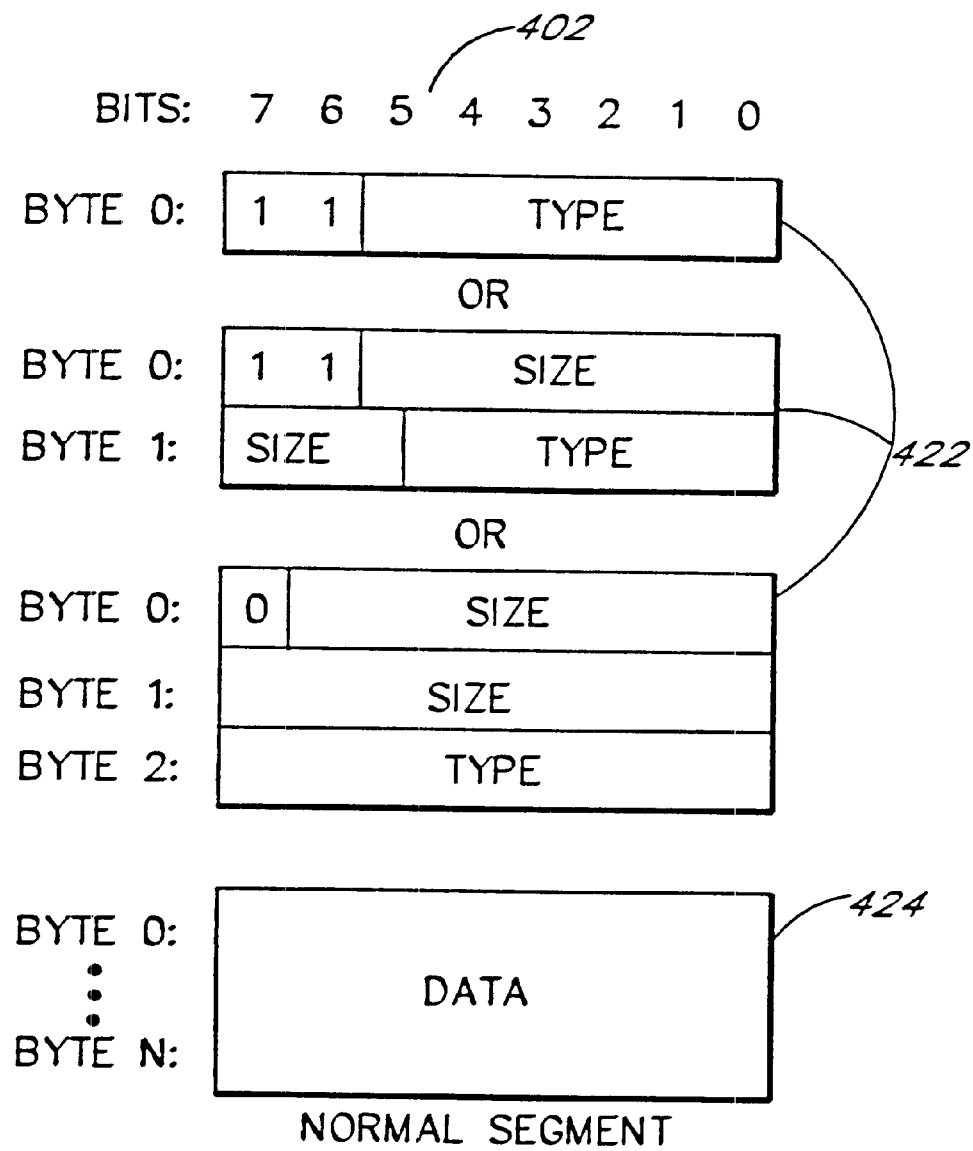
FIG. 21 illustrates the normal segment.

FIG. 21 illustrates the normal segment 402 as a sequence of bytes that are logically separated into two sections: an identifier section 422 and a data section 424. The identifier section 422 precedes the data section 424. The identifier section 422 specifies the size of the normal segment 402, and identifies a segment type. The data section 424 contains information about the source image 100.

The identification section 422 is a sequence of one, two, or three bytes that identifies the length of the normal segment 402 and the segment type. The segment type is an integer number that specifies the method of data encoding. The compressed file 104 contains 256 possible segment types. The data in the normal segment 402 is formatted according to the segment type. In the preferred embodiment, the normal segments 402 are optimally formatted for the color palette, the Huffman bitstreams, the Huffman tables, the image panels, the codebook information, the vector dequantization tables, etc.

For example, the file format of the preferred embodiment allows the use of different Huffman bitstreams such as an 8-bit Huffman stream, a 10-bit Huffman stream, and a DCT Huffman stream. The encoder 102 uses each Huffman bitstream to optimize the compressed file 104 in response to different image types. The identification section 422 identifies which Huffman encoder was used and the normal segment 402 contains the compressed data.

FIGS. 22a, 22b, 22c, and 22d illustrate the layering and interleaving of the plurality of data segments 166 in the compressed file 104 of the preferred embodiment. The plurality of data segments 166 in the compressed file 104 are interleaved based on the user defined playback model 261 as follows: 1) as a single-pass, non-parnellized image (FIG. 22a), 2) as a single-pass, panellized image (FIG. 22b), 3) as two layers comprising the thumbnail miniature 120, and the sharp image 125 (FIG. 22c) and 4) as multiple layers comprising the thumbnail miniature 120, the standard image 124, and the sharp image 125 (FIG. 22d).

Block diagram 426 in FIG. 22a shows the compressed file format for the single-pass, non-panellized image. The compressed file 104 begins with the header, the optional color palette and the resource data such as the tables and Huffman encoding information. The plurality of data segments 166 are not interleaved or layered. Thus, the decoder 110 must receive the entire compressed file 104 before any part of the source image 100 can be displayed.

Block diagram 428 in FIG. 22b shows; the compressed file 104 for the single-pass, panellized image. The plurality of data segments 166 are interleaved panel-by-panel, so that all of the segments for each panel are contiguously transmitted. The decoder 110 can expand and display a panel at a time until the entire compressed file 104 is expanded.

Block diagram 430 in FIG. 22c shows the compressed file format of the thumbnail miniature 120, the splash image 122 and the final or sharp image 125. The plurality of data segments 166 are interleaved panel-by-panel and the resolution components for the thumbnail miniature 120 and splash image 122 exist in the first layer, the panels for the final image exist in the second layer. The first layer includes selected portions of the plurality of data segments 166 that are needed to decode the panels of the thumbnail miniature 120 and splash image 122. Thus, the compressed file 104 only stores the low detail color components (URCA data segment 246, the XRCA data segment 248), the DC terms 201 and as many as the first five AC terms 200 in the first layer. The number of AC terms 200 depends on the user-selected quality of the thumbnail miniature 120.

The plurality of data segments 166 in the first layer are also interleaved panel-by-panel to allow the thumbnail miniature 120 and splash image 122 to be decoded a panel at a time. The second layer contains the remaining plurality of data segments 166 needed to expand the compressed file 104 into the final image. The plurality of data segments 166 in the second layer are also interleaved panel-by-panel.

Block 432 in FIG. 22d shows the compressed file format of the thumbnail image 120, the splash image 122, the layered standard image 124, and the sharp image 125. The thumbnail miniature 120 and splash image 122 are arranged in the first layer as described above. The remaining data segments 166 are layered at different quality levels. The multi-layering is accomplished by layering and interleaving panel information associated with the VQ2 data segment 258 (high resolution residual). The multiple layers allow the display of all the panels at a particular level of detail before decoding the panels in the next layer.

The Decoder

Figure 23:
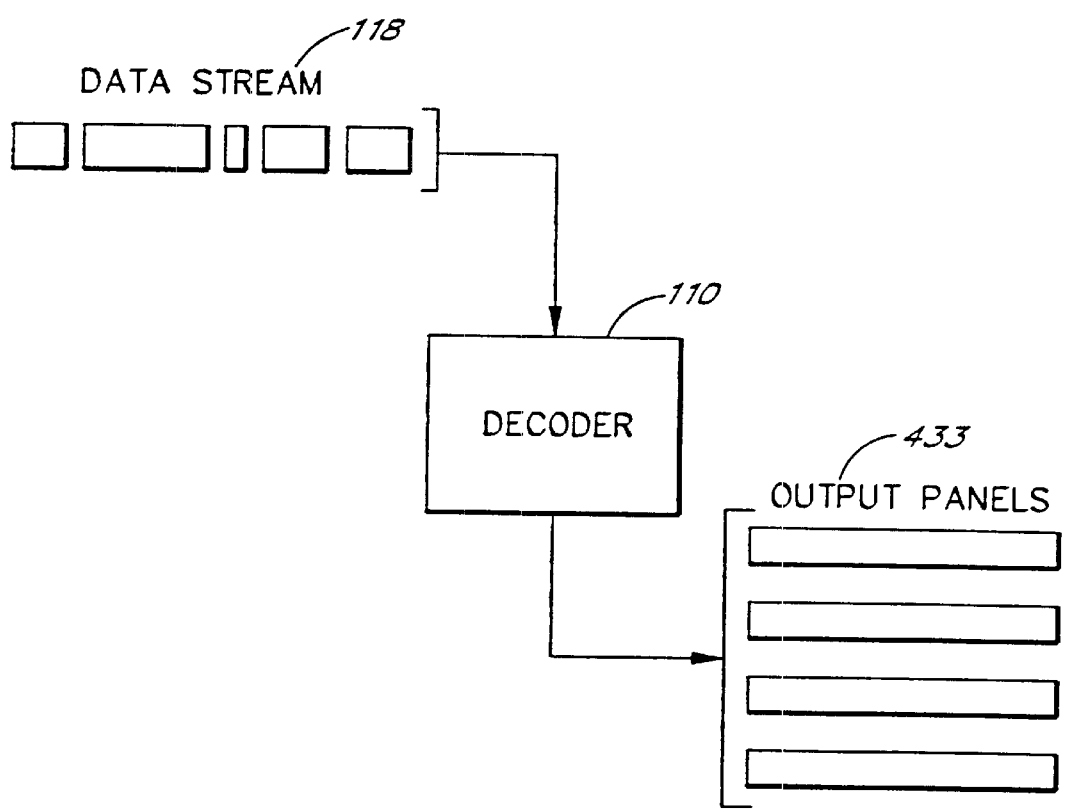
FIG. 23 is a block diagram of the decoder of the present invention.

FIG. 23 illustrates the decoder 310 of the present invention. The decoder 110 takes as input the compressed data stream 118 and expands or decodes it into an image for viewing on the display 112. As explained above, the compressed file 104 and the transmitted data stream 118 include image components that are layered with a plurality of panels 433. The decoder 110 expands the plurality of panels 433 one at a time.

Figure 24:
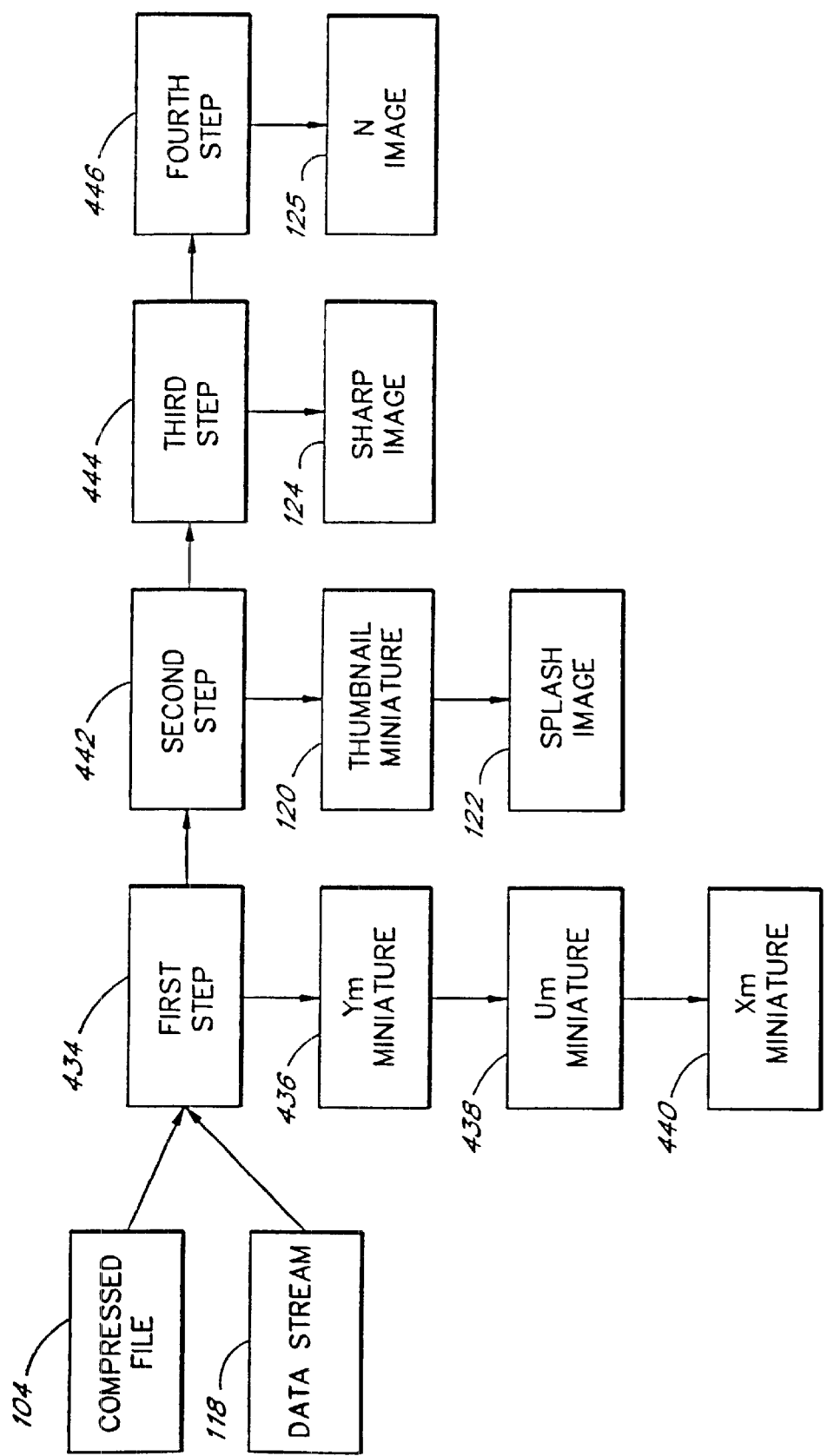
FIG. 24 illustrates the multi-step decoding process and includes a Ym miniature, a Um miniature, an Xm miniature, the thumbnail miniature, the splash image and the standard image, and the enhanced image.

As illustrated in FIG. 24, the decoder 110 expands the compressed file 104 in four steps. In a first step 434, the decoder 110 expands the first layer of image data in the compressed file 104 or the data stream 118 into a Ym miniature 436, a Um miniature 438, and an Xm miniature 440. In a second step 442, the decoder 110 uses the Ym miniature 436, the Um miniature 438, and an Xm miniature 440 to generate the thumbnail miniature 120, and the splash image 122. In a third step 444, the decoder 110 receives a second layer of image data and generates the higher detail panels 445 needed to expand the thumbnail miniature 120 into a standard image 124, a fourth step 44L6 the decoder 110 receives a third layer of image data to generate higher detail panels to enhance the detail of the standard image in order to create an enhanced image 105 that corresponds to the source image 100.

Figure 25:
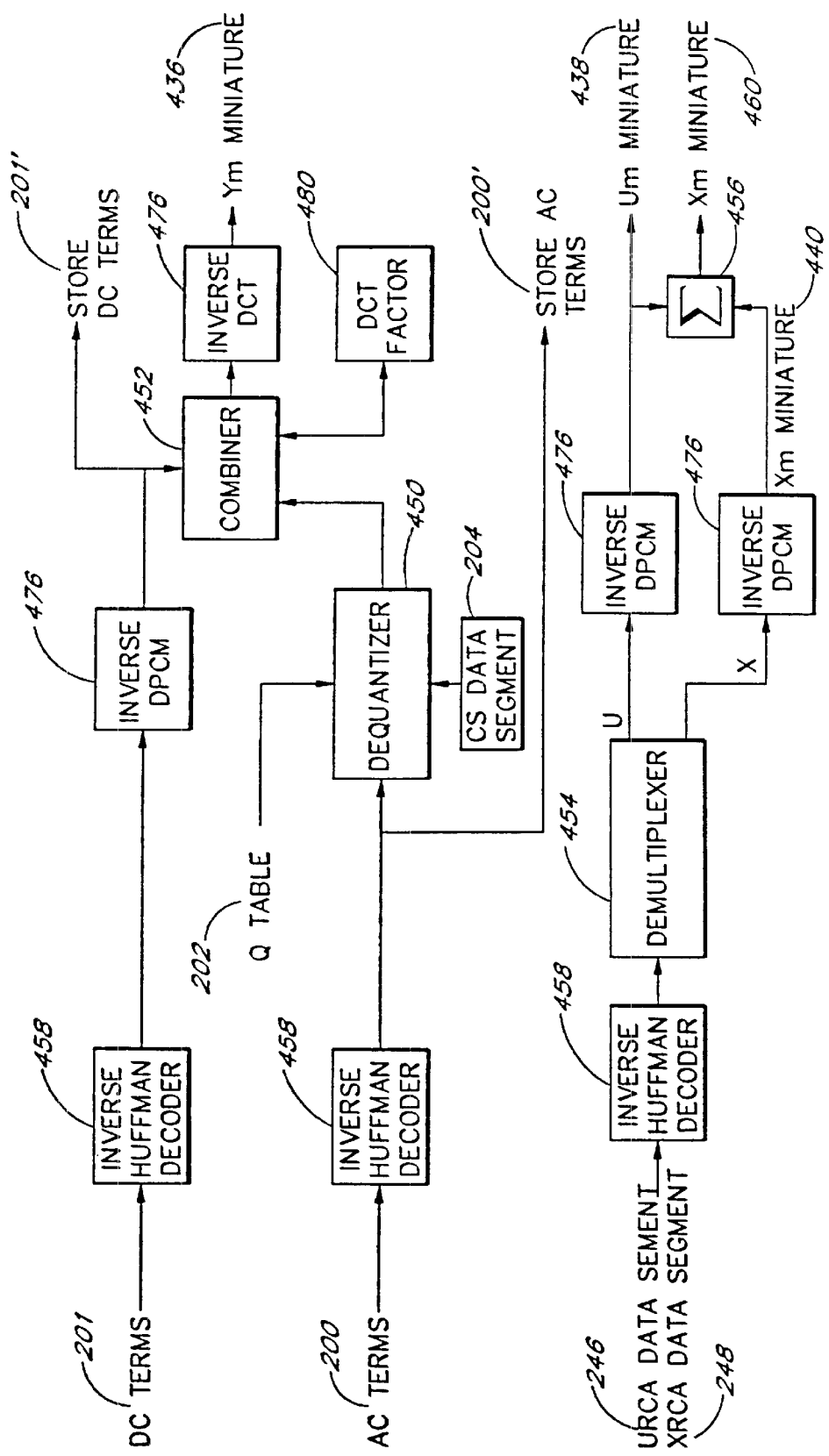
FIG. 25 is a block diagram of the decoder and includes an inverse Huffman encoder, an inverse DPCM, a dequantizer, a combiner, an inverse DCT, a demultiplesxer, and an adder.

FIG. 25 illustrates the elements of the first step 434 in which the decoder 110 expands the AC terms 200, the DC terms 201, the URCA data segment 246, and the XRCA data segment 248 into the Ym miniature 436, the Um miniature 438, and Xm miniature 440. The first step 434 includes an inverse Huffman encoder 458, an inverse DPCM 476, a dequantizer 450, a combiner 452, an inverse DCT 476, a demultiplexer 454, and an adder 456.

The decoder 110 then separates the DC terms 201 and the AC terms 200 from the URCA data segment 246 and the XRCA data segment 248. The inverse Huffman encoder 458 decompresses the first layer of the data stream 118 which includes the AC terms 200, the URCA data segment 246, and the XRCA data segment 248. The inverse DPCM 476 further expands the DC terms 201 to output DC terms 201'. The dequantizer 450 further expands the AC terms 200 to output AC terms 200' by multiplying the output AC terms 200' with the quantization factors 478 in the quantization table Q 202 to output 8×8 DCT coefficient blocks 482. The quantization table Q 202 is stored in the CS data segment 204 (not shown).

The combiner 452 combines the output DC terms 201' with the 8×8 DCT coefficient blocks 482. The decoder 110 sets the inverse DCT factor 480, and the inverse DCT 476 outputs the DCT coefficient blocks 482 that correspond to the Ym miniature 436 that is 1/256th the size of the original image.

The demultiplexer 454 separates the inverse Huffman encoded URCA data segment 246 from the XRCA data segment 248. The inverse DPCM 476 then expands the URCA data segment 246 and the XRCA data segment 248 to generate the blocks that correspond to the Um miniature 438 and the Xm miniature 440. The adder 456 translates the blocks corresponding to the Um miniature 438 and the Xm miniature 440 into blocks that correspond to a Xm miniature 460.

Figure 26:
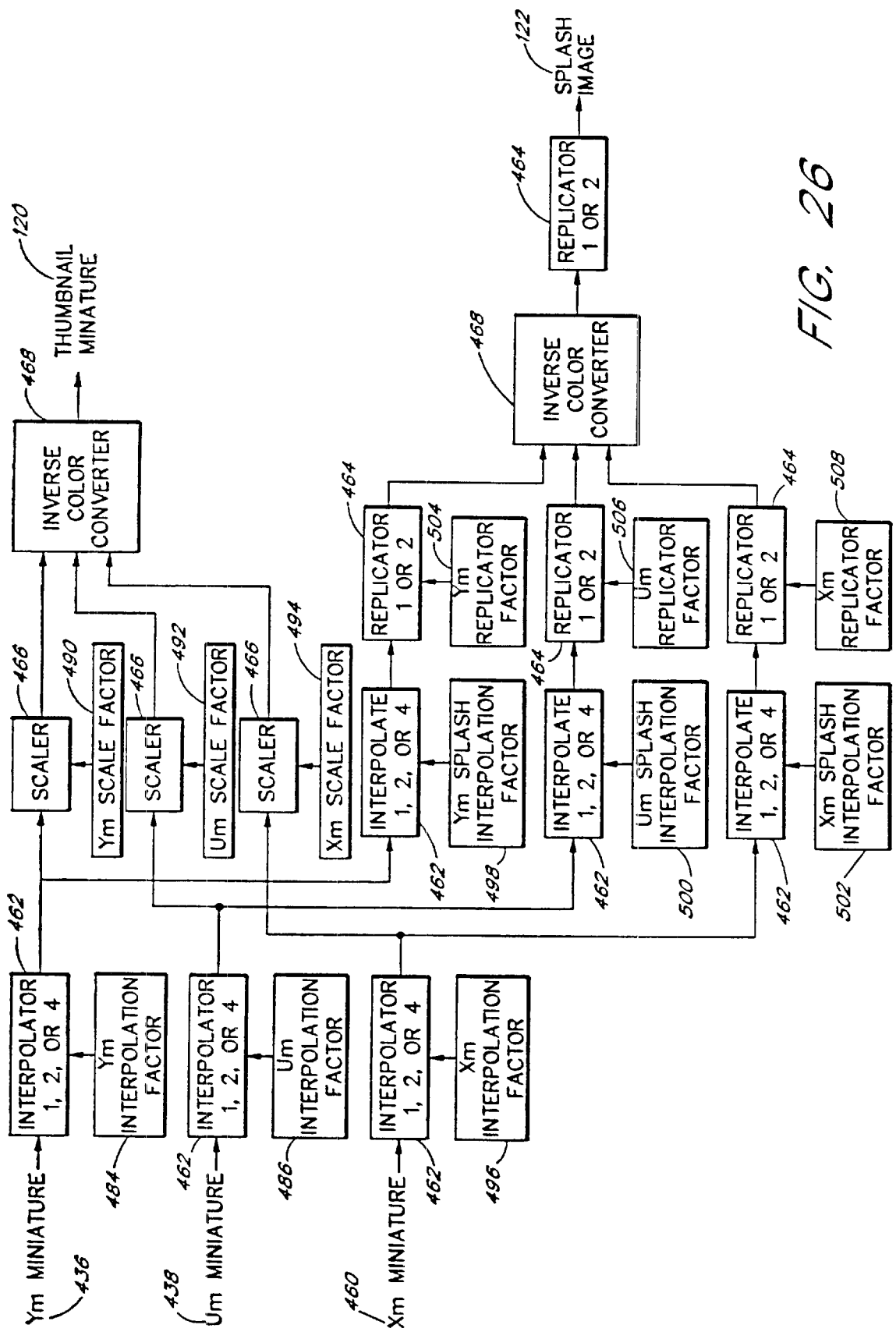
FIG. 26 is a block diagram of the decoder and includes the interpolator, interpolation factors, a scaler, scale factors, a replicator, and an inverse color converter.

FIG. 26 illustrates the second step 442 in which the decoder 110 expands the Ym miniature 436, the Um miniature 438, and the Xm miniature 460 that the decoder 110 further includes the interpolator 462 that operates on the Um miniature 436, the Um miniature 438 and the Xm miniature 460. The interpolator 462 is controlled by a Ym interpolation factor 484, a Um interpolation factor 486, and a Xm interpolation factor 496. A scaler 466 is controlled by a Ym scale factor 490, a Um scale factor 492, a Xm scale factor 494. The decoder 110 further includes the replicator 464 and the inverse color converter. The interpolator 462 uses a linear interpolation process to enlarge the Ym miniature 436, the Um miniature 438, and the Xm miniature 460 by one, two or four times in both the horizontal and vertical directions.

The Ym interpolation factor 484, the Um interpolation factor 486, and the Xm interpolation factor 488 control the amount of interpolation. The size of the source image 100 in the compressed file 104 is fixed, thus the decoder 110 may need to enlarge or reduce the expanded image before display. The decoder 110 sets the Ym interpolation factor 484 to a power of 2 (i.e., 1, 2, 4, etc.) in order to optimize the decoding process. However, in order to display an expanded image at the proper size, the scaler 466 scales the interpolated image to accommodate different display formats.

The interpolator 462 also expands the Um miniature 438 and the Xm miniature 440. Like the Ym interpolation factor 484, the decoder 110 sets the Um interpolation factor 486 and the Xm interpolation factor 496 to a power of two. The decoder 110 sets the Ym interpolation factor 484, and the Um interpolation factor 486 so that the Umrn miniature 438 and Xm miniature 460 approximate the size of the interpolated and scaled Ym miniature 436.

After interpolation, the scaler 466 enlarges or reduces the interpolated Ym miniature based on. the Ym scale factor 490. In the preferred embodiment, the decoder 110 sets the Ym interpolation factor 484 so that the interpolated Ym miniature 436 is nearly twice the size of the thumbnail miniature 120. The decoder 110 then sets the Ym scale factor 490 to reduce the interpolated Ym miniature 436 to the display size of the thumbnail miniature 120. The scaler 466 interpolates the Um miniature 458 and the Xm miniature 460 with the Um scale factor 492, and the Xm scale factor 494. The decoder 110 sets the Xm scale factor 494, the Um scale factor 492, as necessary to scale the image to the display size.

The inverse color converter 468 transforms the interpolated and scaled miniatures into a red, green, and blue pixel array or a palletized image as required by the display 112. When converting to a palletized image, the inverse color converter 468 also dithers the converted image. The decoder 110 displays the interpolated, scaled and color converted miniatures as the thumbnail miniature 120.

In order to create the splash image 122, the decoder 110 expands the interpolated Ym miniature 436, the interpolated Um miniature 438 and the interpolated Xm miniature 440 with a second interpolation process that: uses a Ym splash interpolation factor 498, a Um splash interpolation factor 500, and an Xm splash interpolation factor 502. Like the thumbnail miniature 120, the decoder 110 also sets the splash interpolation factors to a power of two.

The interpolated data are then expanded with the replicator 464. The replicator 464 enlarges the interpolated data one or two times by replicating the pixel information. The replicator 464 enlarges the interpolated data based on a Ym replication factor 504, a Um replication factor 506, and an Xm replication factor 508. The decoder 110 sets the Ym replication factor 504, the Um replication factor 506, and the Xm replication factor 508 so that the replicated image is one-fourth of the display size.

The inverse color converter 468 transforms the replicated image data into red, green and blue image data.

The replicator 464 then again replicates the red, green, and blue image data to match the display size. The decoder 110 displays the resulting splash image 122 on the display 112.

Figure 27:
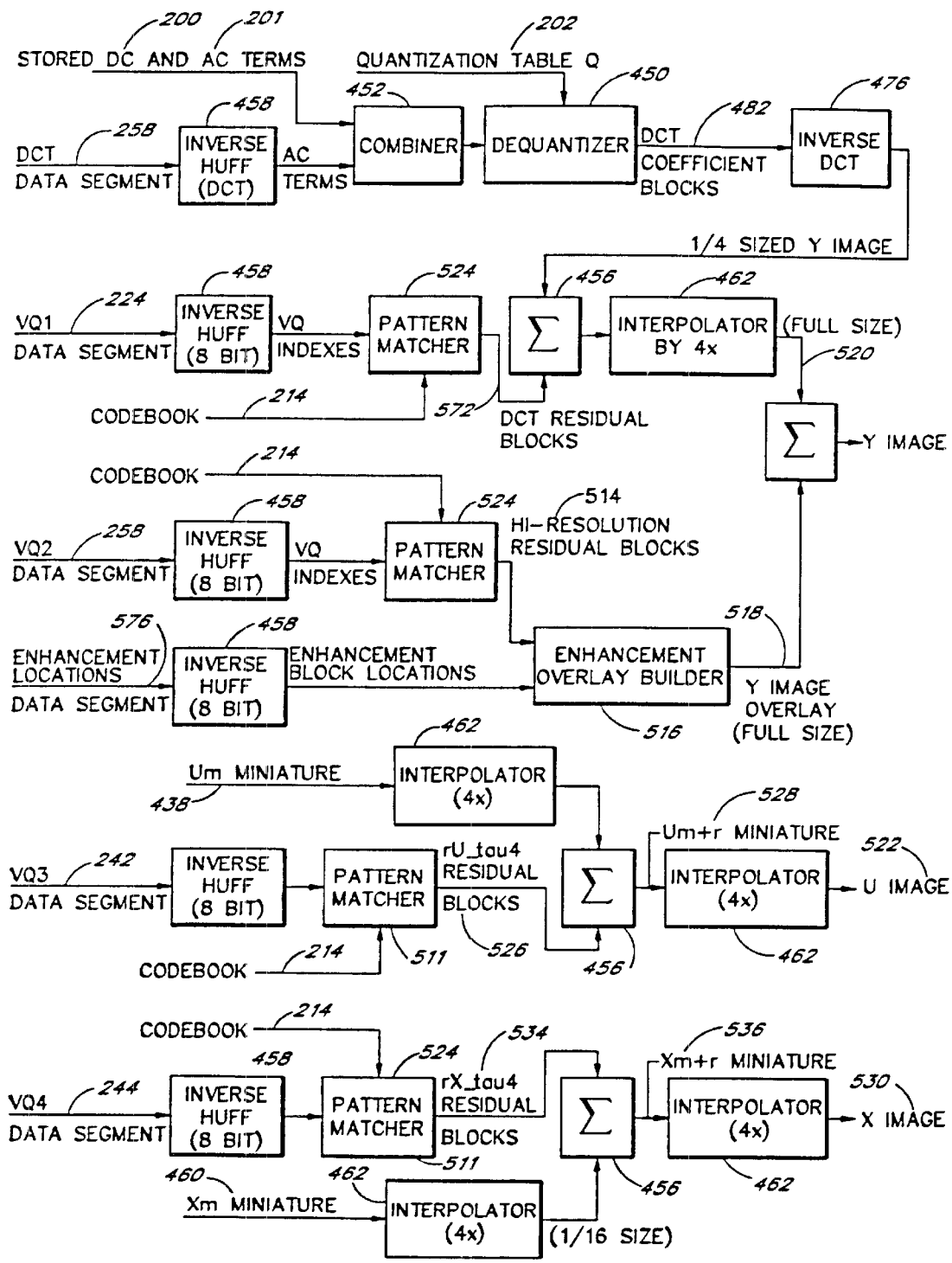
FIG. 27 is a block diagram of the decoder that includes the inverse Huffman encoder, the combiner, the dequantizer, the inverse DCT, a pattern matcher, the adder, the interpolator, and an enhancement overlay builder.

FIG. 27 illustrates the third step 3 in which the decoder 110 generates the higher detail panels to expand the thumbnail miniature 120 into a standard image 124. FIG. 27 also illustrates the fourth step 446 in which the decoder 110 generates generate higher detail panels to enhance the detail of the standard image in order to create an enhanced image 105 that corresponds to the source image 100.

The decoding of the standard image 124 and the enhanced image 105 requires the inverse Huffman encoder 458, the combiner 452, the dequantizer 450, the inverse DCT 476, a pattern matcher 524, the adder 456, the interpolator 462, and an edge overlay builder 516. The decoder 110 adds additional detail to the displayed image as the decoder 110 receives new layers of compressed data. The additional layers include new panels of the DCT data segment 208 (containing the remaining AC terms 200'), the VQ1 data segment 224, the VQ2 data segment 258, the enhancement location data segment 510, the VQ3 data segment 242, and the VQ4 data segment 244.

The decoder 110 builds upon the Ym miniature 436, the Um miniature 438 and the Xm miniature 440 calculated for the thumbnail miniature 120 by expanding the next layer of image detail. The next layer contains a portion of the DCT data segment 208, the VQ1 data segment 224, the VQ2 data segment 258, the enhancement location data segment 510, the VQ3 data segment 242, and the VQ4 data segment 244 that correspond to the standard image.

The inverse Huffman encoder 458 decompresses the DCT data segment 208 and the VQ1 data segment 224 (the DCT residual). The combiner 452 combines the DCT information from the inverse Huffman encoder 458 with the AC terms 200 and the DC terms 201. The dequantizer 450 reverses the quantization process by multiplying the DCT quantized values 206 with the quantization factors 478. The dequantizer obtains the correct quantization factors 478 from the quantization table Q 202. The dequantizer outputs 8×8 DCT coefficient blocks 482 to the inverse DCT 476. The inverse DCT 476 in turn, outputs the 8×8 DCT coefficient blocks 482 that correspond to a Y image 509 that is ¼th the size of the original image.

The pattern matcher 524 replaces the DCT residual blocks 512 by finding an index to a matching pattern block in the codebook 214. The adder 456 adds the DCT residual blocks 512 to the DCT coefficient blocks 482 on a pixel by pixel basis. The interpolator 462 interpolates the output of the adder 456 by a factor of four to create a full size Y image 520. The interpolator 462 performs bilinear interpolation to enlarge the Y image 520 horizontally and vertically.

The inverse Huffman encoder 458 decompresses the VQ2 data segment 258 (the high resolution residual) and the enhancement location data segment 510. The pattern matcher 524 uses the codebook indexes to retrieve the matching pattern blocks stored in the codebook 214 to expand the VQ2 data segment 258 to create 16×16 high resolution residual blocks 514. An enhancement overlay builder 516 inserts the 16×16 high resolution residual blocks into a Y image overlay 518 specified by the edge location data segment 510. The Y image overlay 518 is the size of the original image. The adder 456 adds the Y image overlay 518 to the full sized Y image 520.

To calculate the full sized U image 522, the inverse Huffman encoder 458 expands the VQ3 data segment 242. The pattern matcher 524 uses the codebook indexes to retrieve the matching pattern blocks stored in the codebook 214 to expand the VQ3 data segment 242 into 4×4 rU_tau4 residual blocks 526. The interpolator 462 interpolates the Um miniature 438 by a factor of four and the adder 456 adds the 4×4 rU_tau4 residual blocks 526 to the interpolated Um miniature 438 in order to create a Um+r miniature 528. The interpolator 462 interpolates the Um+r miniature 528 by a factor of four to create the full sized U image 522.

To calculate the full sized X image 530, the inverse Huffman encoder 458 expands the VQ4 data segment 244. The pattern matcher 524 uses the codebook indexes to retrieve the matching pattern blocks stored in the codebook 214 to expand the VQ4 data segment 244 into 4×4 rX_tau4 residual blocks. The decoder 110 then translates the 4×4 rX_tau4 residual blocks 532 into 4×4 rV_tau4 residual blocks 534. The interpolator 462 interpolates the Xm miniature 460 by a factor of four, and the adder 456 adds the 4×4 rV_tau4 residual blocks 534 to the interpolated Xm miniature 460 in order to create a Xm+r miniature 536. The interpolator 462 interpolates the Xm+r miniature 536 by a factor of four to create the full sized X image 530.

The decoder stores the full sized Y image 520, the full sized U image 522, and the full sized X image 530 in local memory. The inverse color converter 468 then converts the full sized Y image 520, the full sized U image 522, and the full sized X image 530 into a full sized red, green, and blue image. The panel is then added to the displayed image. This process is completed for each panel until the entire source image 100 is expanded.

In the forth step the decoder 110 receives the third image layer and builds upon the full sized Y image 520, the full sized U image 522, and the full sized X image 530 stored in local memory to generate the enhanced image 105. The third image data layer contains the remaining portion of the DCT data segment 208, the VQ1 data segment 224, the VQ2 data segment 258, the enhancement location data segment 510, the VQ3 data segment 242, and the VQ4 data segment 244 that correspond to the enhanced image 105.

The decoder 110 repeats the process illustrated in FIG. 27 to generate a new full sized Y image 520, a new full sized U image 522, and a new full sized X image 530. The new full sized Y image 520 is added to the full sized Y image generated in the third step 444. The new full sized U image 522 is added to the full sized U image 522 generated in the third step 444. The new full sized X image 530 is added to the full sized X image generated in the third step 444.

The inverse color converter 468 converts the full sized Y image 520, the full sized U image 522, and the full sized X image 530 into a full sized red, green, and blue image. The panel is then added to the displayed image. This process is completed for each panel until the entire enhanced image 105 is expanded.

The inverse DCT 476 of the preferred embodiment is a mathematical transformation for mapping data in the time (or spatial) domain to the frequency domain, based on the "cosine" kernel. The two dimensional version operates on a block of 8×8 elements.

Referring to FIG. 9, the compressed DCT coefficients 198 are stored as DC terms 201 and AC terms 200. In the preferred embodiment, the inverse DCT 476 as shown in FIGS. 25 and 27 combines the process of transformation and decimation in the frequency and spatial domains (frequency and then spatial) into a single operation in the frequency domain. The inverse DCT 476 of the present invention provides at least a factor of 2 in implementation efficiency and is utilized by the decoder 110 to expand the thumbnail miniature 120 and splash image 122.

The inverse DCT 476 receives a sequence of DC terms 201 and AC terms 200 which are frequency coefficients. The high frequency terms are arbitrarily discarded at a predefined frequency to prevent aliasing. The discarding of the high frequency terms is equivalent to a low pass filter which passes everything below a predefine frequency while attenuating all the high frequencies to zero.

The equation for an inverse DCT is:

$$f_{y,x} := \frac{1}{4} \sum_u \sum_v C_u \cdot C_v \cdot F_{v,u} \cdot \cos\left(\frac{2 \cdot x + 1}{16}\right) \cdot u \cdot \pi \cdot \cos\left(\frac{2 \cdot y + 1}{16} \cdot v \cdot \pi\right)$$

where $u := 0 \ldots 7 \quad v := 0 \ldots 7$
$x := 0 \ldots 7 \quad y := 0 \ldots 7$
$C_u := \frac{1}{\sqrt{2}} \cdot (u = 0) + (u \neq 0)$ The inverse DCT 476 generates an 8×8 output matrix that is decimated to a 4×4 matrix then to a 2×2 matrix. The inverse DCT 476 then decimates the output matrix by subsampling with a filter. After subsampling, an averaging filter smooths the output. Smoothing is accomplished by using a running average of the adjacent elements to form the output.

For example, for a 4×4 output matrix the 8×8 matrix from the inverse DCT 476 is sub-divided into sixteen 2×2 regions, and adjacent elements within each 2×2 region is averaged to form the output. Thus the sixteen regions form a 4×4 matrix output.

For a 2×2 output matrix, the 8×8 matrix from the inverse DCT 476 is sub-divided into four 4×4 regions. The adjacent elements within each 4×4 matrix region are averaged to form the output. Thus, the four regions form a 2×2 matrix output.

In addition, since most of the AC coefficients are zero, the inverse DCT 476 is simplified by combining the inverse DCT equations with the averaging and the decimation equations. Thus, the creation of a 2×2 output matrix where a given X is an 8×8 input matrix that consists of DC terms 201 and AC terms 200 is stated formally as:

$$X := \begin{bmatrix} X_{0,0} & X_{0,1} & 0 & 0 & 0 & 0 & 0 & 0 \\ X_{1,0} & X_{1,1} & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

All elements with i or j greater than 1 are set to zero. The setting of the high frequency index to zero is equivalent to filtering out the high frequency coefficients from the signal.

Assigning Y as the 2×2 output matrix, the decimated output is thus equal to:

$Y_{0,0} := X_{0,0} + (k_1 \cdot (X_{0,1})) + (k_1 \cdot (X_{1,0})) + (k_2 \cdot (X_{1,1}))$ $Y_{0,1} := X_{0,0} - (k_1 \cdot (X_{0,1})) + (k_1 \cdot (X_{1,0})) - (k_2 \cdot (X_{1,1}))$ $Y_{1,0} := X_{0,0} + (k_1 \cdot (X_{0,1})) - (k_1 \cdot (X_{1,0})) - (k_2 \cdot (X_{1,1}))$ $Y_{1,1} := X_{0,0} - (k_1 \cdot (X_{0,1})) - (k_1 \cdot (X_{1,0})) + (k_2 \cdot (X_{1,1}))$ where $$k_1 := \frac{1}{\sqrt{8}} \cdot (c(1) + c(3) + c(5) + c(7)) \quad c(k) = \cos\left(\pi \cdot \frac{k}{16}\right)$$

$$k_2 := (k_1)^2$$

The creation of a 4×4 output matrix where a given X is an 8×8 input matrix that consists of DC terms 201 and AC terms 200 is stated formally as:

All elements with i or j greater than 3 are set to zero.

It is possible to implement the calculations in the 2×2 case where the two dimensional equation is decomposed downward; however, performing the one dimensional approach twice reduces complexity and decreases the calculation time. In the preferred embodiment, the inverse DCT 476 computes an additional one-dimensional row inverse DCT, and then a one-dimensional column inverse DCT.

$$X := \begin{bmatrix} X_{0,0} & X_{0,1} & X_{0,2} & X_{0,3} & 0 & 0 & 0 & 0 \\ X_{1,0} & X_{1,1} & X_{1,2} & X_{1,3} & 0 & 0 & 0 & 0 \\ X_{2,0} & X_{2,1} & X_{2,2} & X_{2,3} & 0 & 0 & 0 & 0 \\ X_{3,0} & X_{3,1} & X_{3,2} & X_{3,3} & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

The equation for a one dimensional case is as follows:

(1dout$_x$ are the elements of the one dimensional case)

$1\text{dout}_0 := \text{in}_0 + (k_1 \cdot \text{in}_1) + (k_2 \cdot \text{in}_2) + (k_3 \cdot \text{in}_3)$ $1\text{dout}_1 := \text{in}_0 + (k_4 \cdot \text{in}_1) - (k_2 \cdot \text{in}_2) - (k_5 \cdot \text{in}_3)$ $1\text{dout}_2 := \text{in}_0 - (k_4 \cdot \text{in}_1) - (k_2 \cdot \text{in}_2) + (k_5 \cdot \text{in}_3)$ $1\text{dout}_3 := \text{in}_0 - (k_1 \cdot \text{in}_1) + (k_2 \cdot \text{in}_2) - (k_3 \cdot \text{in}_3)$ $$k_1 := \frac{c(1) + c(3)}{\sqrt{2}} \quad k_2 := \frac{c(2) + c(6)}{\sqrt{2}} \quad k_3 := \frac{c(3) - c(7)}{\sqrt{2}}$$

$$k_4 := \frac{c(5) + c(7)}{\sqrt{2}} \quad k_5 := \frac{c(5) + c(1)}{\sqrt{2}}$$

where c(k) is defined as in the 2×2 output matrix.

The scaler 466 of the preferred embodiment is also shown in FIG. 27. More specifically, the scaler 466 utilizes a generalized routine that scales the image up or down while reducing aliasing and reconstruction noise. Scaling can be described as a combination of decimation and interpolation. The decimation step consists of downsampling and using an anti-aliasing filter; the interpolation step consists of pixel filling using a reconstruction filter for any scale factor that can be represented by a rational number P/Q, where P and Q are integers associated with the interpolation and decimation ratios.

Figure 28:
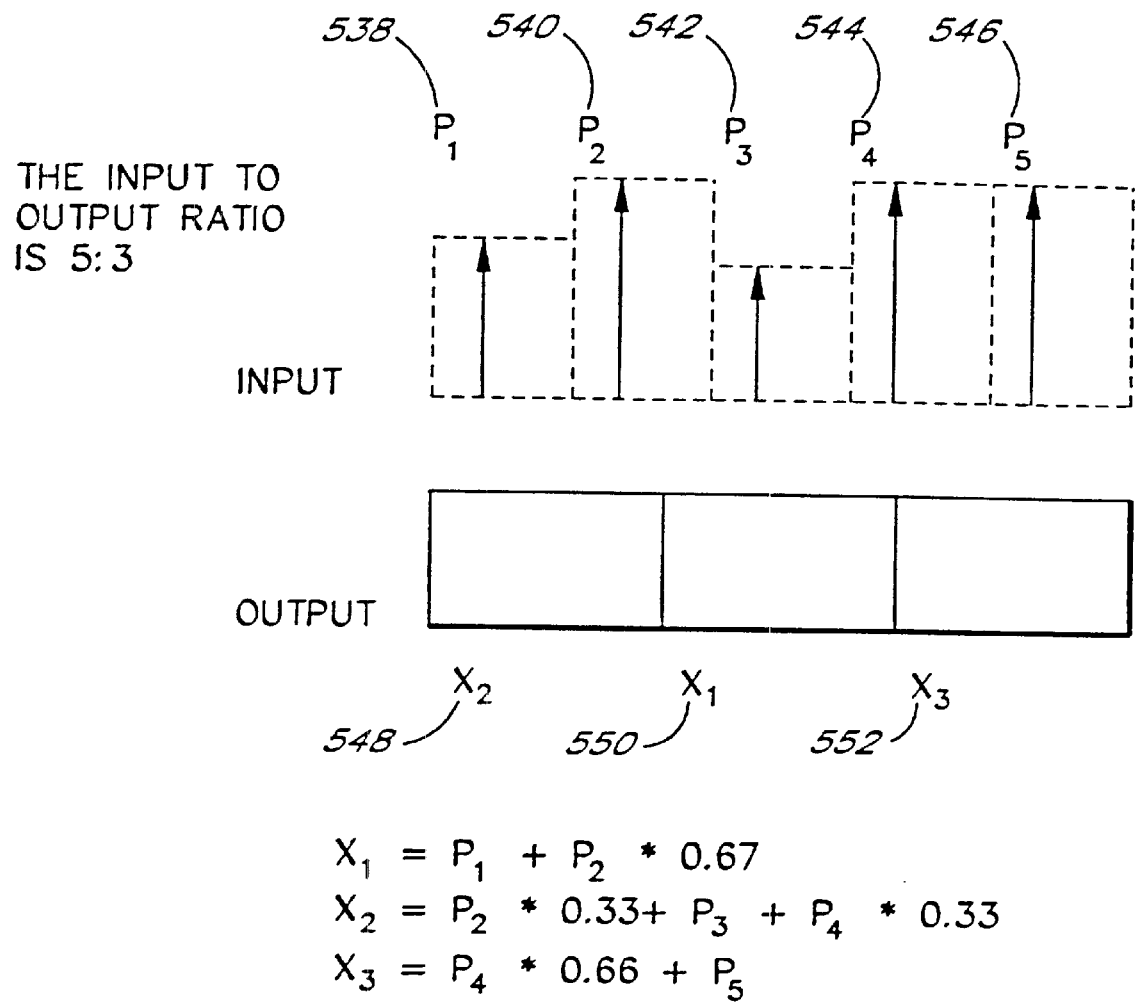
FIG. 28 is block diagram of the scaler with an input to output ratio of five-to-three in the one dimensional case.

The scaler 466 decimates the input data by dividing the source image into the desired number of output pixels and then radiometrically weights the input data to form the necessary output. FIG. 28 illustrates the scaler 466 with an input to output ratio of five-to-three in the one dimensional case. Input pixel $P_1$ 538, pixel $P_2$ 540, pixel $P_3$ 542, pixel $P_4$ 544, and pixel $P_5$ 546 contain different data values. The output pixel $X_1$ 548, pixel $X_2$ 550, and pixel $X_3$ 552 are computed as follows:

$X_1 = P_1 + (P_2)(0.67)$ $X_2 = (P_2)(0.33) + P_3 + (P_4)(0.33)$ $X_3 = (P_4)(0.66) + P_5$

The decimated data is then filtered with a reconstruction filter and an area average filter. The reconstruction filter interpolates the input data by replicating the pixel data. The area average filter then area averages by integrating the area covered by the output pixel.

Figure 29:
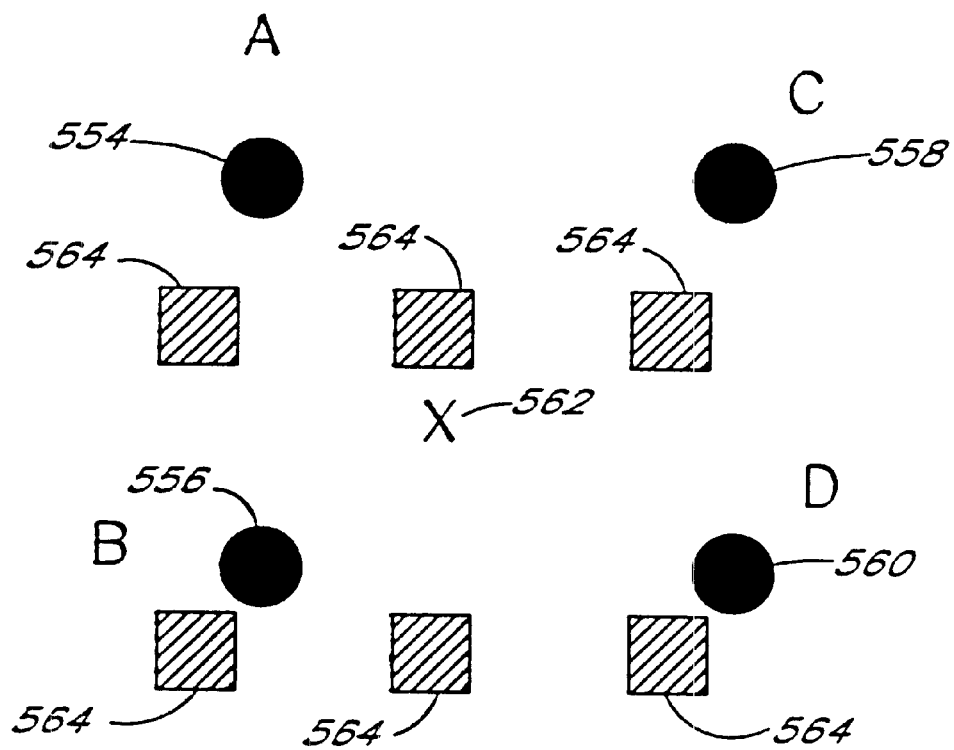
FIG. 29 illustrates the process of bilinear interpolation.

If the output ratio is less than 1 (i.e, interpolation is necessary), the interpolator 462 utilizes bilinear interpolation. FIG. 29 illustrates the operation of the bilinear interpolation. Input pixel A 554, input pixel B 556, input pixel C 558, and input pixel D 560, and reference point X 562 are interpolated to create output 564. For this example reference point X 562 is α to the right of pixel A 554 and 1−α to the right of pixel C 558, and reference point X 562 is βdown from pixel A 554 and 1−β up from pixel B 556. Reference point X 562 is stated formally as:

X=(1−α)*((1−β)*A+β*B)+α*((1−β)*C+β*D).

The Image Classifier

The preferred embodiment of the image classifier 152 is illustrated in FIG. 8. More specifically, the image classifier 152 uses fuzzy logic techniques to determine which compression methods will optimize the compression of various regions of the source image 100. The image classifier 152 adds intelligence to the encoder 102 by providing the means to decide, based on statistical characteristics of the image, what "tools" (combinations of compression methods) will best compress the image.

The source image 100 may include a combination of different image types. For example, a photograph could show a person framed in a graphical border, wherein the person is wearing a shirt that contains printed text. In order to optimize the compression ratio for the regions of the image that contain different image types, the image classifier 152 subdivides the source image 100 and then outputs the control script 196 that specifies the correct compression methods for each region. Thus, the image classifier 152 provides a customized, "most-efficient" compression ratio for multiple image types.

The image classifier 152 uses fuzzy logic to infer the correct compression steps from the image content. Image content is inherently "fuzzy" and is not amenable to simple discrete classification. Images will thus tend to belong to several "classes." For example, a classification scheme might include one class for textual images and a second class for photographic images. Since an image may comprise a photograph of a person wearing a shirt containing printed text, the image will belong to both classes to varying degrees. Likewise, the same image may be high contrast, "grainy," black and white and/or high activity.

Fuzzy logic is a set-theoretic approach to classification of objects that assigns degrees of membership in a particular class. In classical set theory, an object either belongs to a set or it does not; membership is either 100% or 0%. In fuzzy set theory, an object can be partly in one set and partly in another. The fuzziness is of greater significance when the content must be categorized for the purpose of applying appropriate compression techniques. Relevant categories in image compression include photographic, graphical, noisy, and high-energy. Clearly the boundaries of these sets are not sharp. A scheme that matches appropriate compression tools to image content must reliably distinguish between content types that require different compression techniques, and must also be able to judge how to blend tools when types requiring different tools overlap.

Figure 30:
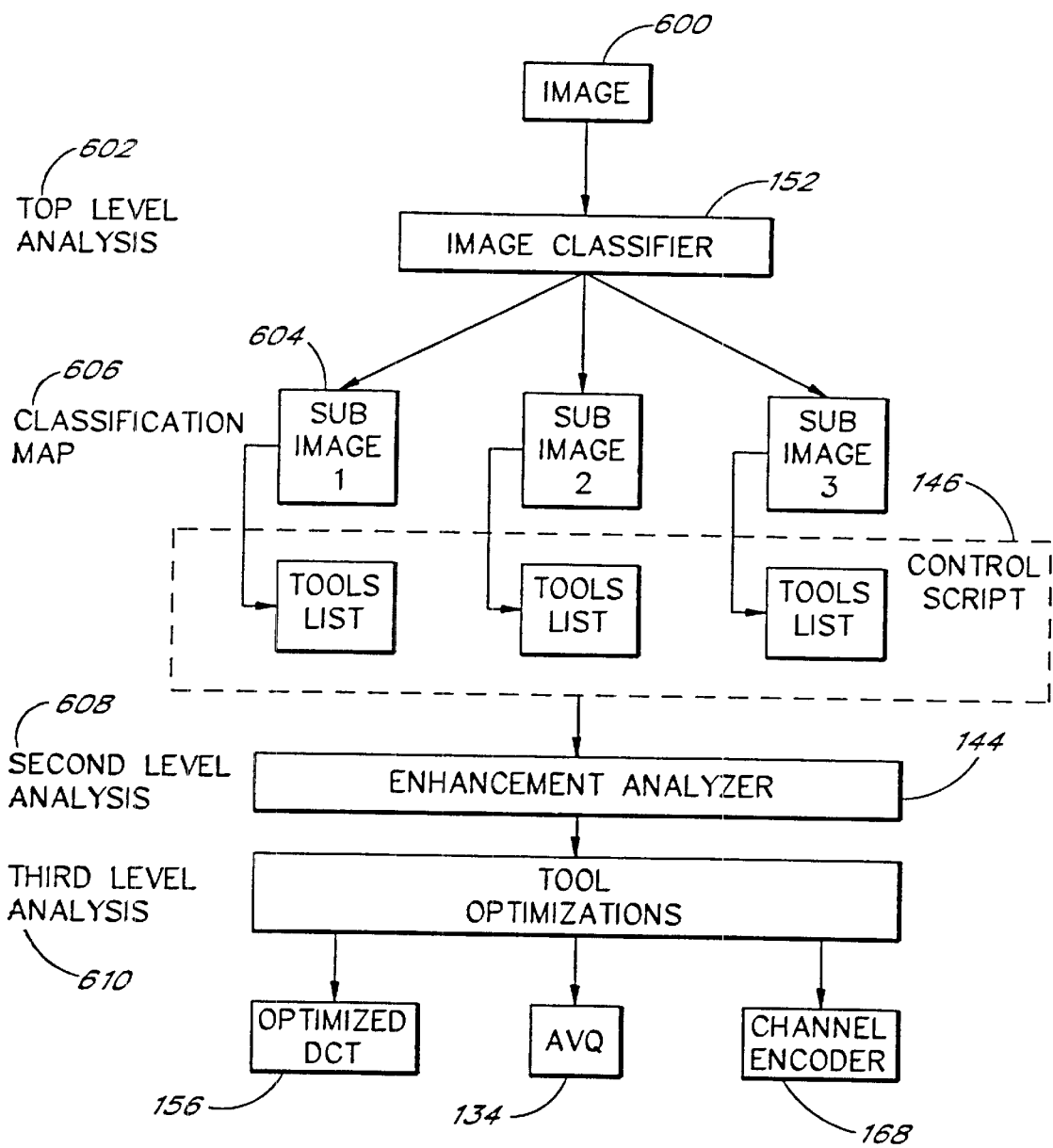
FIG. 30 is a block diagram of the process of optimizing the compression methods with the image classifier, the enhancement analyzer, the optimized Dcrt, the AVQ, and the channel encoder.

FIG. 30 illustrates the optimization of the compression process. The optimization process analyzes the input image 600 at different levels. In the top level analysis 602 the image classifier 152 decomposes the image into a plurality of subimages 604 (regions) of relatively homogeneous content as defined by a classification map 606. The image classifier 152 then outputs the control script 196 that specifies which compression methods or "tools" to employ in compressing each region. The compression methods are further optimized in the second level analysis 608 by the enhancement analyzer 144 which determines which areas of an image are the most visually important (for example, text and strong luminance edges). The compression methods are then further optimized in the third level analysis 610 with the optimized DCT 156, AVQ 134, and adaptive methods in the channel encoder 168. The second level analysis 608 and the third level analysis 610 determine how to adapt parameters and tables to a particular image.

The fuzzy logic image classifier 152 provides adaptive "intelligent" branching to appropriate compression methods with a high degree of computational simplicity. It is not feasible to provide the encoder 102 with an exhaustive mapping of all possible combinations of inherently non-linear, discontinuous, multidimensional inputs (image measurements) onto desired control scripts 196. The fuzzy logic image classifier 152 reduces such an analysis.

Furthermore, the fuzzy logic image classifier 152 ensures that the encoder 102 makes a smooth transition from one compression method (as defined by the control script 196) to another compression method. As image content becomes "more like" one class than another, the fuzzy controller avoids the discrete switching from one compression method to another compression method.

The fuzzy logic image classifier 152 receives the image data and determines a set of image measurements which are mapped onto one or more input sets. The image classifier 152 in turn maps the input sets to corresponding output sets that identify which compression methods to apply. The output sets are then blended ("defuzzified") to generate a control script 196. The process of mapping the input image to a particular control script 196 thus requires three sets of rules: 1) rules for mapping input measurements onto input sets (e.g., degree of membership with the "high activity" input set=F[average of AC coefficients 56–63]); 2) rules for mapping input sets onto output sets (e.g., if graphical image, use DCT quantization table 5 and 3) rules for defuzzification that mediate between membership of several output sets, i.e., how the membership of more than one output sets, should be blended to generate a single control script 196 that controls the compression process.

Still further, the fuzzy logic rule base is easily maintained. The rules are modular. Thus, the rules can be understood, researched, and modified independently of one another. In addition, the rule bases are easily modified allowing new rules to make the image classifier 152 more sensitive to different types of image content. Furthermore, the fuzzy logic rule base is extendable to include additional image types specified by the user or learned using neural network or genetic programming methods.

Figure 31:
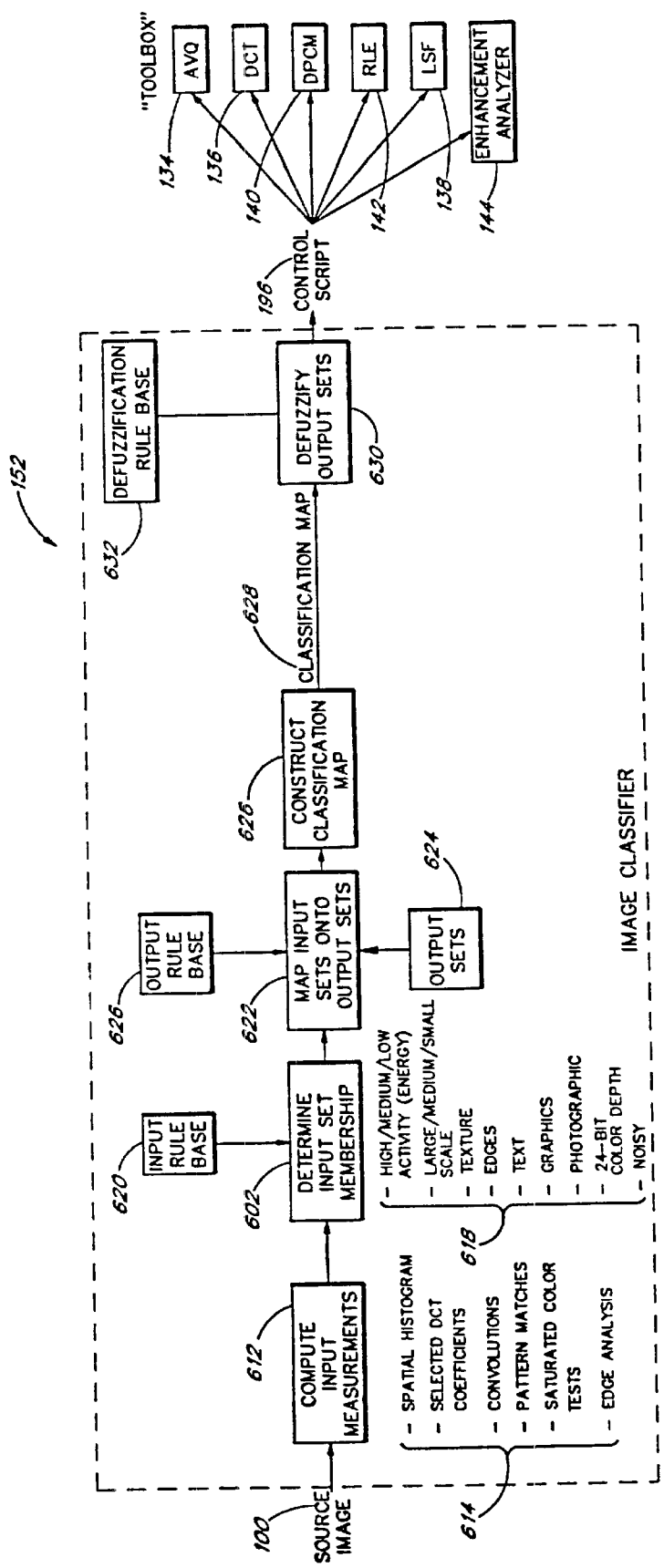
FIG. 31 is a block diagram of the image classifier.

FIG. 31 illustrates a block diagram of the image classifier 152. In block 612 the image classifier 152 determines a set of input measurements 614 that correspond to the source image 100. In order to determine the input measurements 614, the image classifier 152 sub-divides the source image 100 into a plurality of blocks. To conserve computations, the user can enable the image classifier 152 to select a random sample of the plurality of blocks to use as the basis of the input measurements 614.

The image classifier 152 determines the set of input measurements 614 from the plurality of blocks using a variety of methods. The image classifier 152 calculates the mean, the variance, and a histogram of all three color components. The image classifier 152 performs a discrete cosine transform of the image blocks to derive a set of DCT components wherein each DCT coefficient is histogrammed to provide a frequency domain profile of the inputted image. The image classifier 152 performs special convolutions to gather information about edge content, texture content, and the efficacy of the Reed Spline Filter. The image classifier 152 derives spatial domain blocks and matches the spatial domain blocks with a special VQ-like pattern list to provide information about the types of activity contained in the picture. Finally, the image classifier scans the image for common and possibly localized features that bear on the compressibility of the image (such as typed text or scanning artifacts).

In block 616 the image classifier 152 analyzes the input measurements 614 generated in block 612 to determine the extent to which the source image 100 belongs to one of the fuzzy input sets 618 within the input rule base 620. The input rule base 620 identifies the list of image types. In the preferred embodiment, the image classifier 152 contains input sets 618 for the following image types: scale, text, graphics, photographic, color depth, degree of activity, and special features.

Membership in the activity input set and the scale image input set are determined by the input measurements 614 for the DCT coefficient histogram, the spatial statistics, and the convolutions. Membership in the text image input set and the graphic input set correspond to the input measurements 614 for a linear combination of high frequency DCT coefficients and gaps in the luminance histogram. The photographic input set is the complement of the graphic input set.

The color depth input set includes four classifications: gray scale images, 4-bit images, 8-bit images and 24-bit images. The color depth input corresponds to the input measurements 614 for the Y, U and X color components. A small dynamic range in the U and X color components indicates that the picture is likely to be a gray scale image, while gaps in the Y component histogram reveals whether the image was once a palettized 4-bit or 8-bit image.

The special feature input set corresponds to the input measurements 614 for the common or localized features that bear on the compressibility of the image. Thus the special feature input set identifies such artifacts as black borders caused by inaccurate scanning and graphical titling on a photographic image.

In block 622 the image classifier 152 maps the input sets 618 onto output sets 624 according to the output rule base 626. The image classifier 152 applies the output rule base 626 to map each input set 618 onto membership of each fuzzy output set 624. The output sets 624 determine, for example, how many CS terms are stored in the CS data segment 204 and the optimization of the VQ1 data segment 224, the VQ2 data segment 258, the VQ3 data segment 242, the VQ4 data segment 244, and the number of VQ patterns to use. The output sets also determine whether the encoder 102 performs an optimized DCT 136 and which quantization tables Q 202 to apply.

For the second Reed Spline Filter 225 and the third Reed Spline Filter 227, the output sets 624 adjust the decimation factor tau and the orientation of the kernal function. Finally, the output sets determine whether the channel encoder 168 utilizes a fixed Huffman encoder, and adaptive Huffman encoder or an LZ1. FIG. 33 illustrates several examples of mapping from input measurements 614 to input sets 618 to output sets 624.

Referring to FIG. 31, in block 626 the image classifier constructs a classification map 628 based upon membership within the output sets. The classification map 628 identifies independent regions in the source image 100 that are independently compressed. Thus the image classifier 152 identifies the regions of the image that belong to compatible output sets 624. These are regions that contain relatively homogenous image contrast and call for one method or set or complementary methods to be applied to the entire region.

In block 630 the image classifier 152 converts (defuzzifies), based on the defuzzification rule base 632, the membership of the fuzzy output sets 624 of each independent region in order to generate the control script 196. The control script 196 contains instructions for which compression methods to perform and what parameters, tables, and optimization levels to employ for a particular region of the source image 100.

The Enhancement Analyzer

The preferred embodiment of the enhancement analyzer 144 is illustrated in FIGS. 4, 15 and 30. More specifically, the enhancement analyzer 144 examines the Y_tau2 miniature 190, the U_tau2 miniature 192, and the X_tau4 miniature 228 to determine the enhancement priority of image blocks that correspond to 16×16 blocks in the original source image 100. The enhancement analyzer 144 prioritizes the image blocks by 1) calculating the mean of the Y_tau2 miniature 190, the U_tau2 miniature 192, and the X_tau4 miniature 228, and 2) testing every color block against a normalized threshold value E 252 for the Y_tau2 miniature 190, the U_tau2 miniature 192, and the X_tau4 miniature 228. A list of blocks that exceed the threshold value E 252 are added to the enhancement list 250.

The enhancement analyzer 144 determines a threshold value $E_Y$ for the Y_tau2 miniature 190, a threshold value $E_U$ for the U_tau2 miniature 192, and a threshold value $E_X$ for the X_tau4 miniature 228. Once the enhancement analyzer 144 computes the threshold value $E_Y$, the threshold value $E_U$ and the threshold value $E_X$, the enhancement analyzer 144 tests each 8×8 Y_tau2 block, each 4×4 U_tau4 block and each 4×4 X_tau4 block (each block corresponds to a 16×16 block in the source image 100) as follows:

Every pixel in the test block is convolved with the following filter masks:

$M_1 = \{-1, -2, -1, 0, 0, 0, 1, 2, 1\}$
$M_2 = \{1, 0, -1, 2, 0, -2, 1, 0, -1\}$ to compute two statistics $S_1$ and $S_2$.

Masks $M_1$ and $M_2$ are convolved with a three by three block of pixels centered on the pixel being tested. The three by three block of pixels is represented as:

$x_{11}\ x_{12}\ x_{13}$
$x_{21}\ x_{22}\ x_{23}$
$x_{31}\ x_{32}\ x_{33}$ where the pixel $x_{22}$ is the pixel being tested. Thus the statistics are calculated with the following equations:

$S_1 = (-1 \cdot x_{11}) - (2 \cdot x_{12}) - (1 \cdot x_{13}) + (1 \cdot x_{31}) + (2 \cdot x_{32}) + (1 \cdot x_{33})$ $S_2 = (1 \cdot x_{11}) - (1 \cdot x_{13}) + (2 \cdot x_{21}) - (1 \cdot x_{23}) + (1 \cdot x_{31}) - (1 \cdot x_{33})$ If $S_1$ plus $S_2$ is greater than the threshold value $E_Y$ for a particular 8×8 Y_tau2 block, the enhancement analyzer 144 adds the 8×8 Y_tau2 block to the enhancement list 250. If $S_1$ plus $S_2$ is greater than the threshold value $E_U$ for a particular 4×4 U_tau4 block, the enhancement analyzer 144 adds the 4×4 U_tau4 block to the enhancement list 250. If $S_1$ plus $S_2$ is greater than the threshold value $E_X$ for a particular 4×4 X_tau4 block the enhancement analyzer 144 adds the 4×4 X_tau4 block to the enhancement list 250.

In addition to the enhancement list 250, the enhancement analyzer 144 also uses the DCT coefficients 198 to identify visually unimportant "texture" regions where the compression ratio can be increased without significant loss to the image quality.

Optimized DCT

The preferred embodiment of the optimized DCT 136 is illustrated in FIG. 9. More specifically, the optimized DCT 136 uses the quantization table Q 202 to assign the DCT coefficients (DC terms 200 and AC terms 201) quantization step values. In addition, the quantization step values in the quantization table Q 202 vary depending on the optimized DCT 136 operation mode. The optimized DCT 136 operates in four DCT modes as follows: 1) switched fixed uniform DCT quantization tables that correspond to image classification, 2) optimal reconstruction values, 3) adaptive uniform DCT quantization tables, and 4) adaptive non-uniform DCT quantization tables.

The fixed DCT quantization tables are tuned to different image types, including eight standard tables corresponding to images differing along three dimensions: photographic versus graphic, small-scale versus large-scale, and high-activity versus low-activity. In the preferred embodiment, additional tables can be added to the resource file 160 (not shown).

The control script 196 defines which standard table the optimized DCT 136 uses in the fixed-table DCT mode. In the fixed-table mode, quantized step values for each DCT coefficient is obtained by linearly quantizing each $x_i$ DCT coefficient with the quantization value qi in quantization table Q. The mathematical relationship for the quantization procedure is:

for i=0, 1, ... , 63
  if $x_i \geq 0$, $$c_i = \frac{\left(x_i + \frac{q_i}{2}\right)}{q_i}$$

if $x_i < 0$, $$c_i = \frac{\left(x_i - \frac{q_i}{2}\right)}{q_i}$$

Reconstruction is also linear unless reconstruction values have been computed and stored in the CS data segment 204. Letting r denote the dequantized DCT coefficients, the linear dequantization formula is:

for i=0, 1, ... ,63
  $r_i = c_i \cdot q_i$

In the fixed-table DCT mode, the optimized DCT 136 can also compute the optimal reconstruction values stored in the CS data segment 204. While the DC term 201 is always calculated linearly, the CS reconstruction values represent the conditional expected value of each quantized level of each AC term 200. The CS reconstruction values are calculated for each AC term 200 by first calculating an absolute value frequency histogram, $H_i$ for the ith coefficient (for i=1, 2, ... , 63) over all DCT blocks in the source image, N, as follows:

for j=0, 1, ... , N
  $H_i(k)$=frequency $(abs(x_{ij})=k)$
  where $x_{ij}$=the value of the ith coefficient in the jth DCT block.

Second, the centroid of coefficient values is calculated between each quantization step. The formula for the centroid of the ith coefficient in the kth quantization interval is:

$$CS_i(k) = \sum_{j=kq-\frac{q}{2}}^{kq+\frac{q}{2}} \left[\frac{H_i(j)}{T_i(k)}\right]$$

where $$T_i(k) = \sum_{j=kq-\frac{q}{2}}^{kq+\frac{q}{2}} H(j)$$

This provides a non-linear mapping of quantized coefficients onto reconstructed values as follows:

$r_i = CS_i(q_i)$ for i=1, 2, ... , 63.

In the adaptive uniform DCT quantization mode, the image the classifier 152 outputs the control script 196 that directs the optimized DCT 136 to adjust a given DCT uniform quantization table Q 202 to provide more efficient compression while holding the visual quality constant. This method adjusts the DCT quantization step sizes such that the compressed bit rate (entropy) after quantizing the DCT coefficients is minimized subject to the constraint that the visually-weighted mean squared error arising from the DCT quantization is held constant with respect to the base quantization table and the user-supplied quantization parameter L.

The optimized DCT 136 uses marginal analysis to adjust the DCT quantization step sizes. A "marginal rate of transformation (MRT)" is computed for each DCT coefficient. The MRT represents the rate at which bits are "transformed" into (a reduction of) the visually weighted mean squared error (VMSE). The MRT of a coefficient is defined as the ratio of 1) the marginal change in the encoded bit rate with respect to a quantization step value q to 2) the marginal change in the visual mean square error with respect to the quantization step value q.

MRT (bits/VMSE) ratio is calculated as follows:

MRT (bits/VMSE)=$((\Delta bits/\Delta q)/(\Delta VMSE/\Delta q))$.

Increasing the quantization step value q will add more bits to the representation of the corresponding DCT coefficient. However, adding more bits to the representation of a DCT coefficient will reduce the VMSE. Since the bits added to the step value q are usually transformed into VMSE reduction, the MRT is generally negative.

The MRT is calculated for all of the DCT coefficients. The adaptive method utilized by the optimized DCT 136 adjusts the quantization step values q of the quantized table Q 202 by reducing the quantization step value q corresponding to the maximum MRT and increasing the quantization step value q corresponding to the minimum MRT. The optimized DCT 136 repeats the process until the MRT is equalized across all of the DCT coefficients while holding the VMSE constant.

Figure 32:
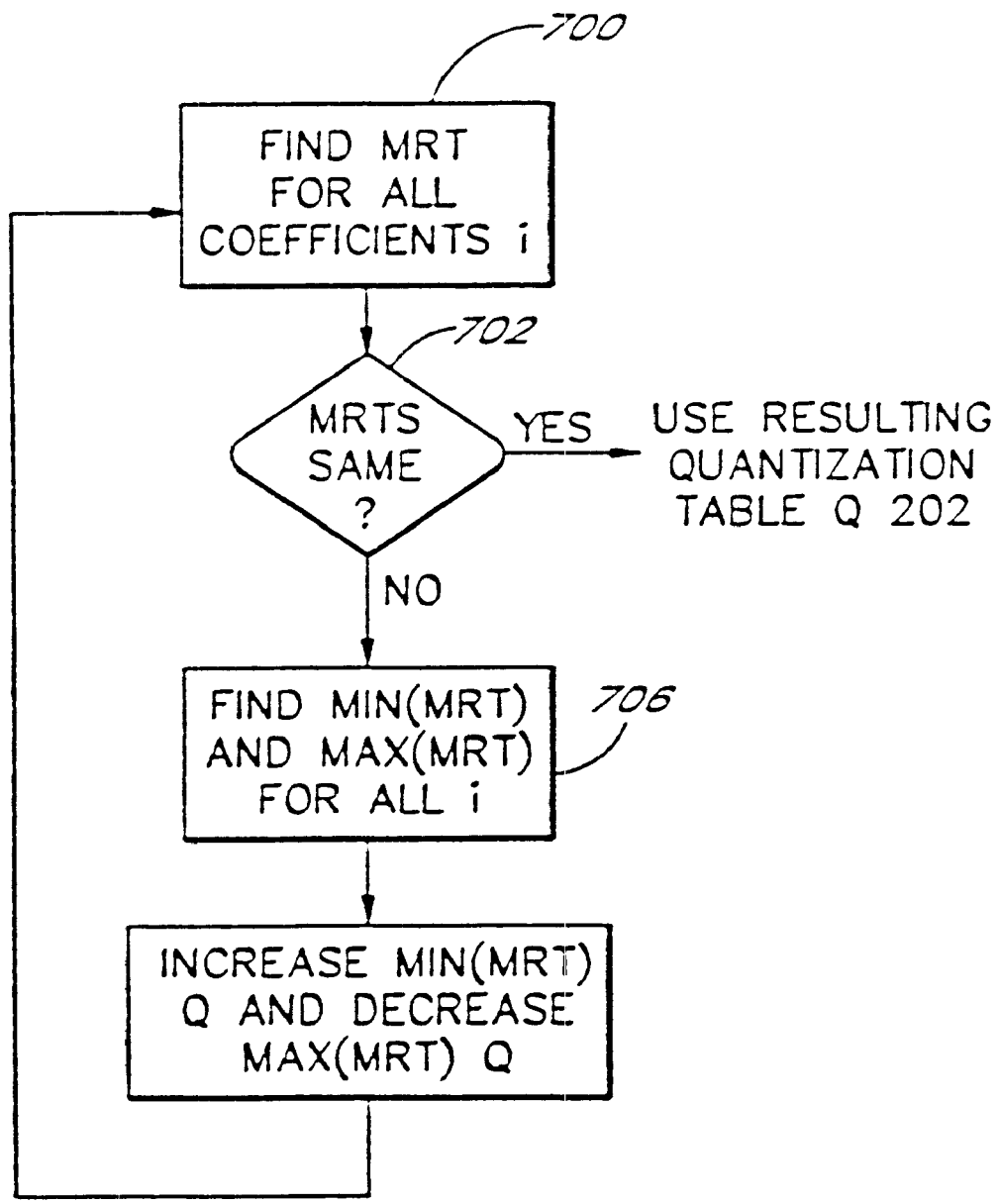
FIG. 32 is a flow chart of the process of creating an adaptive uniform DCT quantization table.

FIG. 32 shows a flow chart of the process of creating an adaptive uniform DCT quantization table. In a step 700 the optimized DCT 136 computes the MRT values for all DCT coefficients i. In step 702 the optimized DCT 136 compares the MRT values, if the MRT values are the same, the optimized DCT 136 uses the resulting quantization table Q 202. If the MRT values are not equal, the optimized DCT 136 finds the minimum MRT value and the maximum MRT value for the DCT coefficients i in step 706.

In step 708, the optimized DCT 136 increases the quantization step value $q_{low}$ corresponding to the minimum MRT value and decreases the quantization step value $q_{high}$ associated with the maximum MRT value. Increasing $q_{low}$ which reduces the number of bits devoted to the corresponding DCT coefficient but does not increase VMSE appreciably. Reducing the quantization step value $q_{high}$ increases the number of bits devoted to the corresponding dCT coefficient and reduces the VMSE significantly. The optimized DCT 136 offsets the adjustments for the quantization step values $q_{low}$ and $q_{high}$ in order to keep the VMSE constant.

The optimized DCT 136 returns to step 700, where the process is repeated until all MRT values are equal. Once all of the quantization step values q are determined the resulting quantization table Q 202 is complete.

The Reed Spline Filter

FIGS. 34–57 illustrate a preferred embodiment of the Reed Spline Filter 138 which is advantageously used for the first, second and third Reed Spline Filters 148, 225, and 227. The Reed Spline Filter described in FIGS. 34–57 is in terms of a generic image format. In particular the image input data comprises Y image input which corresponds for example to the red, green and blue image data in the first Reed Spline Filter 148 in the foregoing discussion. In like manner the outputs of the Reed Spline Filter 138 described as reconstruction values should be understood to correspond, for example, to the R_tau2 miniature 180, the G_tau2 miniature 182 and the B_tau2 miniature 184 of the first Reed Spline Filter 138.

The Reed Spline Filter is based on the a least-mean-square error (LMS)-error spline approach, which is extendable to N dimensions. One- and two-dimensional image data compression utilizing linear and planar splines, respectively, are shown to have compact, closed-form optimal solutions for convenient, effective compression. The computational efficiency of this new method is of special interest, because the compression/reconstruction algorithms proposed herein involve only the Fast Fourier Transform (FFT) and inverse FFT types of processors or other high-speed direct convolution algorithms. Thus, the compression and reconstruction from the compressed image can be extremely fast and realized in existing hardware and software. Even with this high computational efficiency, good image quality is obtained upon reconstruction. An important and practical consequence of the disclosed method is the convenience and versatility with which it is integrated into a variety of hybrid digital data compression systems.

I. SPLINE FILTER OVERVIEW

Figure 34:
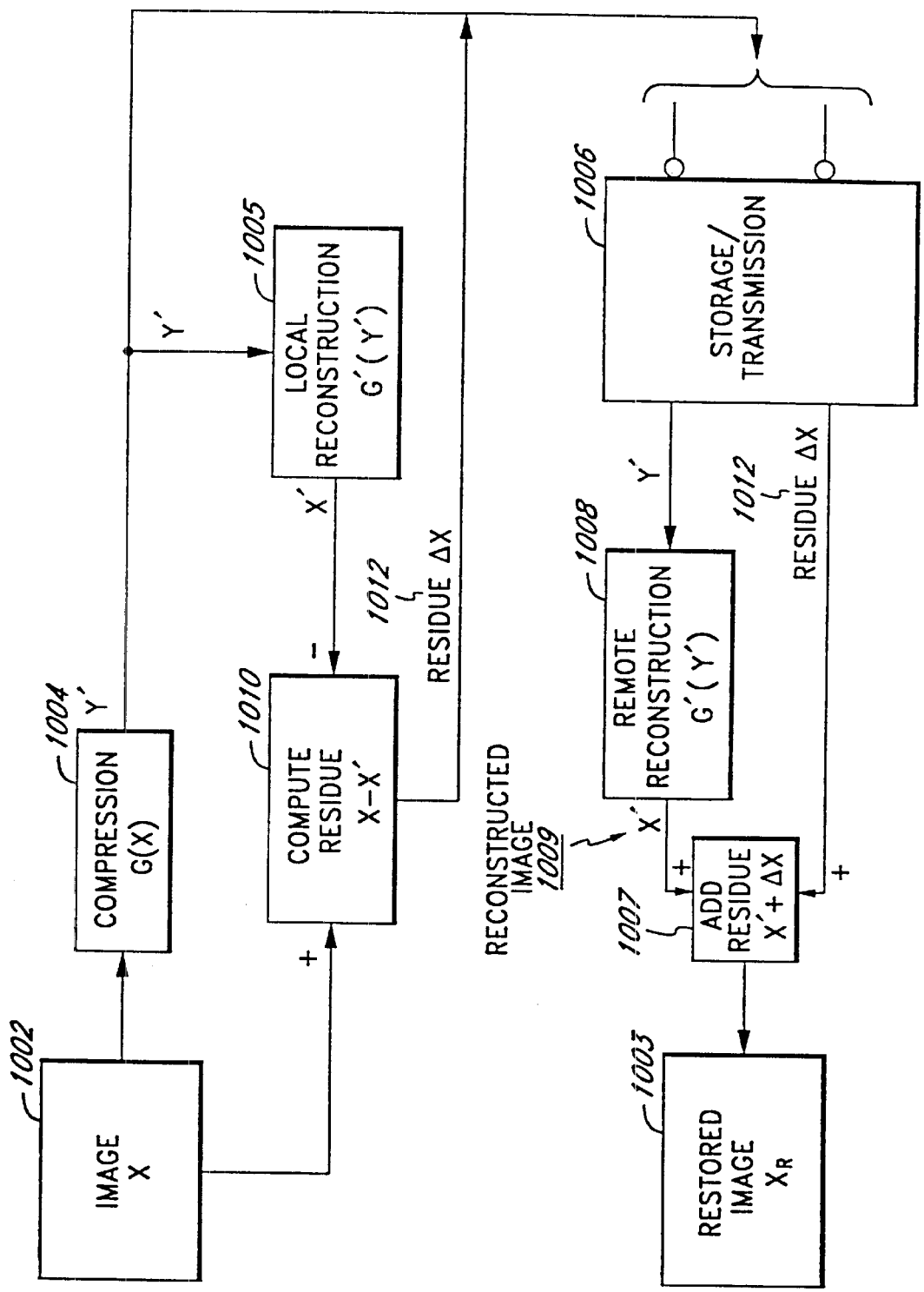
FIG. 34 is a block diagram of image data compression.

The basic process of digital image coding entails transforming a source image X into a. "compressed" image Y such that the signal energy of Y is concentrated into fewer elements than the signal energy of X, with some provisions regarding error. As depicted in FIG. 34, digital source image data 1002 represented by an appropriate N-dimensional array X is supplied to compression block 1004, whereupon image data X is transformed to compressed data Y' via a first generalized process represented here as G(X)=Y'. Compressed data may be stored or transmitted (process block 1006) to a "remote" reconstruction block 1008, whereupon a second generalized process, G' (Y')=X', operates to transform compressed data Y' into a reconstructed image X'.

G and G' are not necessarily processes of mutual inversion, and the processes may not: conserve the full information content of image data X. Consequently, X' will, in general, differ from X, and information is lost through the coding/reconstruction process. The residual image or so-called residue is generated by supplying compressed data Y' to a "local" reconstruction process 1005 followed by a difference process 1010 which computes the residue $\Delta X = X - X'$ 1012. Preferably, X and X' are sufficiently close, so that the residue $\Delta X$ 1012 is small and may be transmitted, stored along with the compressed data Y', or discarded. Subsequent to the remote reconstruction process 1008, the residue $\Delta X$ 1012 and reconstructed image X' are supplied to adding process 1007 to generate a restored image $X'+\Delta X=X''$ 1003.

Figure 35:
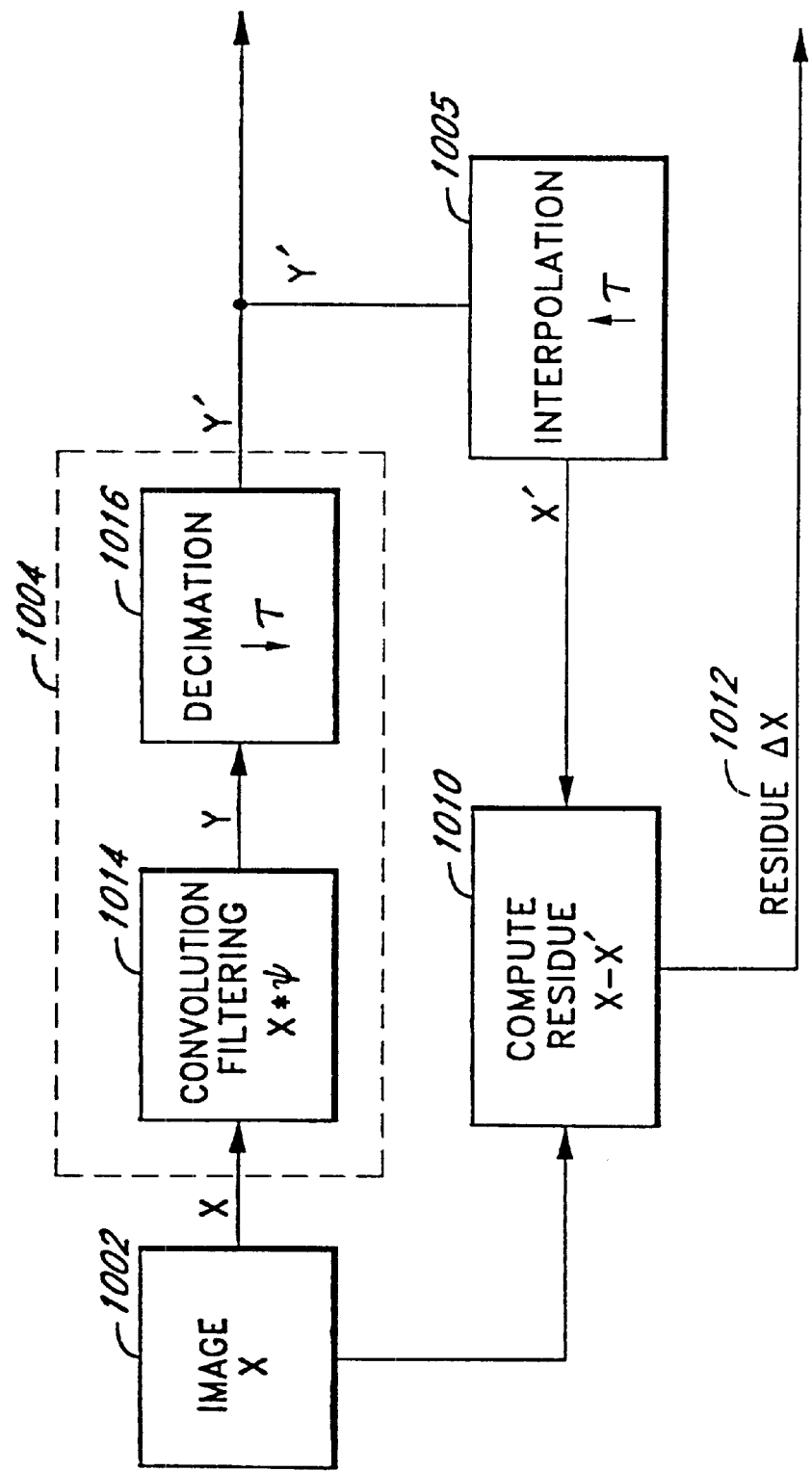
FIG. 35 is a block diagram of a spline decimation/interpolation filter.

In practice, to reduce computational overhead associated with large images during compression, a decimating or subsampling process may be performed to reduce the number of samples. Decimation is commonly characterized by a reduction factor τ (tau), which indicates a measure of image data elements to compressed data elements. However, one skilled in the art will appreciate that image data X must be filtered in conjunction with decimation to avoid aliasing. As shown in FIG. 35, a low-pass input filter may take the form of a pointwise convolution of image data X with a suitable convolution filter 1014, preferably implemented using a matrix filter kernel. A decimation process 1016 then produces compressed data Y', which is substantially free of aliasing prior to subsequent process steps. While the convolution or decimation filter 1014 attenuates aliasing effects, it does so by reducing the number of bits required to represent the signal. It is "low-pass" in nature, reducing the information content of the reconstructed image X'. Consequently, the residue $\Delta X$ 1012 will be larger, and in part, will offset the compression attained through decimation.

Figure 36:
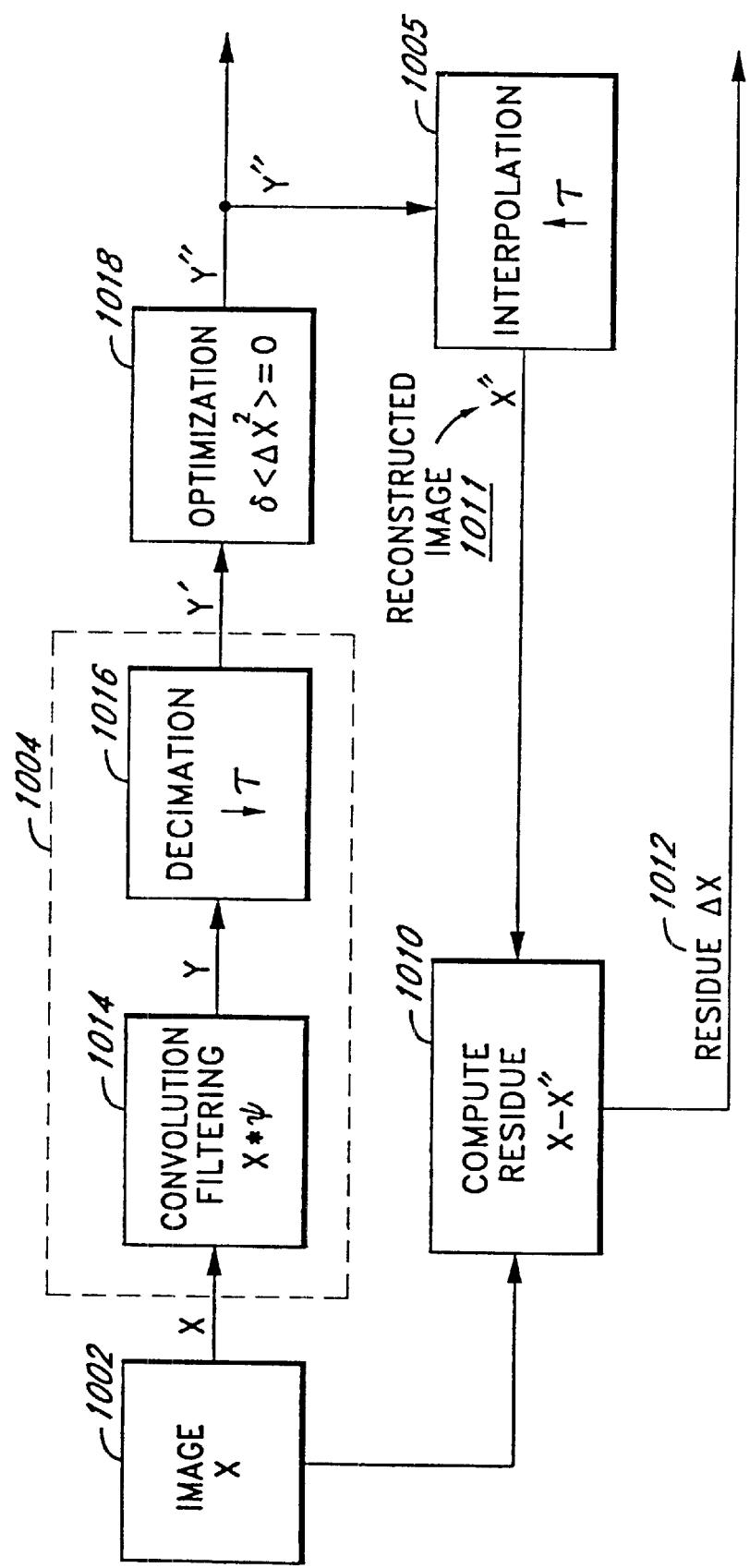
FIG. 36 is a block diagram of an optimal spline filter.

The present invention disclosed herein solves this problem by providing a method of optimizing the compressed data such that the mean-square-residue $\langle \Delta X^2 \rangle$ is minimized, where "< >" shall herein denote an averaging process. As shown in FIG. 36, compressed data Y', generated in a manner similar to that shown in FIG. 35, is further processed by an optimization process 1018. Accordingly, the optimization process 1018 is dependent upon the properties of convolution filter 1014 and is constrained such that the variance of the mean-square-residue is zero, $\delta \langle \Delta X^2 \rangle = 0$. The disclosed method of filter optimization "matches" the filter response to the image data, thereby minimizing the residue. Since the decimation filter 1014 is low-plass in nature, the optimization process 1018, in part, compensates by effectively acting as a "self-tuned" high-pass filter. A brief descriptive overview of the optimization procedure is provided in the following sections.

A. Image Approximation by Spline Functions

As will become clear in the following detailed description, the input decimation filter 1014 of FIG. 36 may be regarded as a projection of an image data vector $\underline{X}$ onto a set of basis functions that constitute shifted, but overlapping, spline functions $\{\Psi_k(\underline{x})\}$ such that $$X \cong X' = \sum_k \chi_k \psi_k(x),$$

where $\underline{X}'$ is the reconstructed image vector and $\chi_k$ is the decomposition weight. The image data vector $\underline{X}$ is thus approximated by an array of preferably computationally simple, continuous functions, such as lines or planes, allowing also an efficient reconstruction of the original image.

According to the method, the basis functions need not be orthogonal and are preferably chosen to overlap in order to provide a continuous approximation to image data, thereby rendering a non-diagonal basis correlation matrix:

$$A_{jk} = \Psi_j(\underline{x}) \cdot \Psi_k(\underline{x}).$$

This property is exploited by the method of the present invention, since it allows the user to "adapt" the response of the filter by the nature and degree of cross-correlation. Furthermore, the basis of spline functions need not be complete in the sense of spanning the space of all image data, but preferably generates a close approximation to image $\underline{X}$. It is known that the decomposition of image vector $\underline{X}$ into components of differing spline basis functions $\{\Psi_k(\underline{x})\}$ is not unique. The method herein disclosed optimizes the projection by adjusting the weights $\chi_k$ such that the differential variations of the average residue vanishes, $\delta \langle \underline{\Delta X}^2 \rangle = 0$, or equivalently $\langle \underline{\Delta X}^2 \rangle = \min$. In general, it will be expected that a more complete basis set will provide a smaller residue and better compression, which, however, requires greater computational overhead and greater compression. Accordingly, it is preferable to utilize a computationally simple basis set, which is easy to manipulate in closed form and which renders a small residual image. This residual image or residue $\underline{\Delta X}$ is preferably retained for subsequent processing or reconstruction. In this respect there is a compromise between computational complexity, compression, and the magnitude of the residue.

Figure 37:
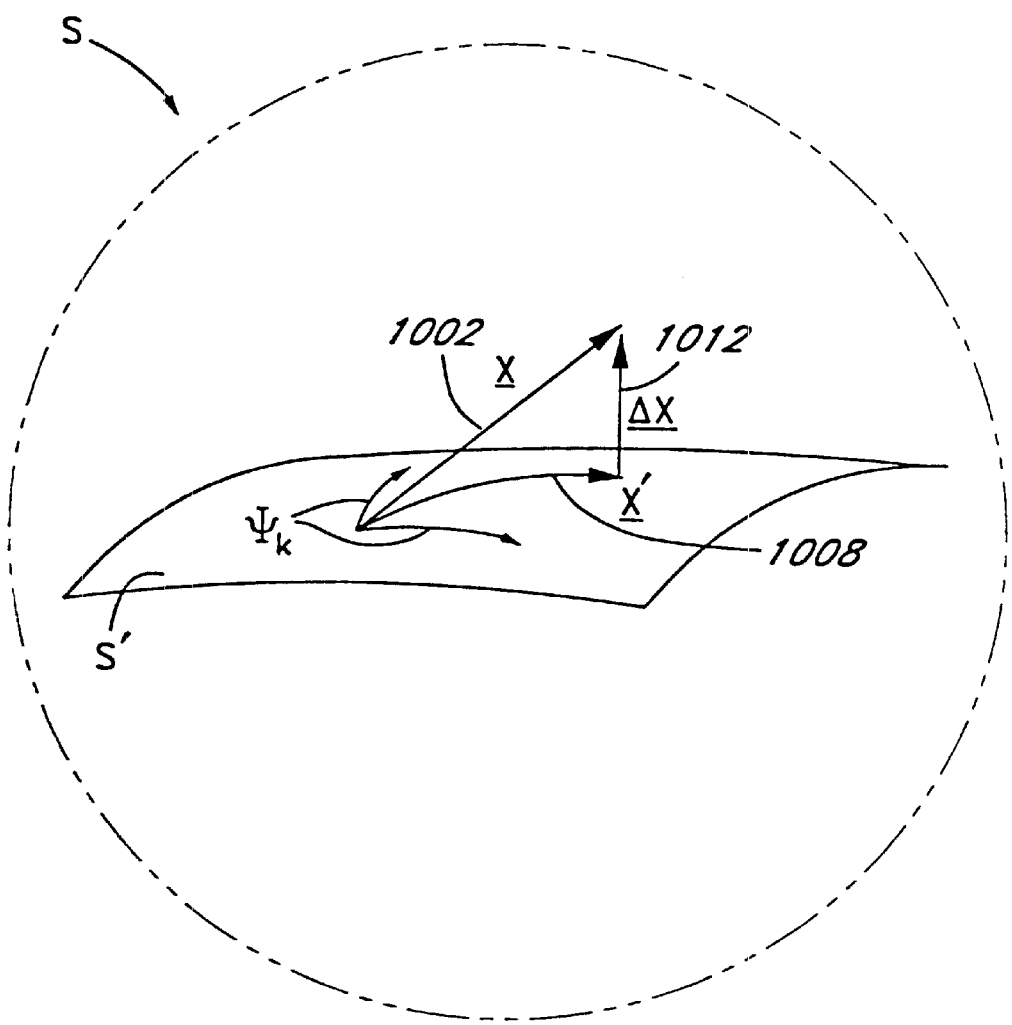
FIG. 37 is a vector representation of the image, processed image, and residual image.

In a schematic view, a set of spline basis functions $S' = \{\Psi_k\}$ may be regarded as a subset of vectors in the domain of possible image vectors $S = \{\underline{X}\}$, as depicted in FIG. 37. The decomposition on projection of $\underline{X}$ onto components of S' is not unique and may be accomplished in a number of ways. A preferable criterion set forth in the present description is a least-mean-square (LMS) error, which minimizes the overall difference between the source image $\underline{X}$ and the reconstructed image $\underline{X}'$. Geometrically, the residual image $\underline{\Delta X}$ can be thought of as a minimal vector in the sense that it is the shortest possible vector connecting $\underline{X}$ to $\underline{X}'$. That is, $\underline{\Delta X}$ might, for instance, be orthogonal to the subspace S', as shown in FIG. 37. As it will be elaborated in the next section, the projection of image vector $\underline{X}$ onto S' is approximated by an expression of the form:

$$X \simeq X' = \sum_k \chi_k \psi_k(x)$$

The "best" $\underline{X}'$ is determined by the constraint that $\underline{\Delta X} = \underline{X} - \underline{X}'$ is minimized with respect to variations in the weights $\chi_j$:

$$\frac{\partial}{\partial \chi_j}\langle \Delta x^2 \rangle = \frac{\partial}{\partial \chi_j}\left\{\left(X - \sum_k \chi_k \psi_k(x)\right)^2\right\} = 0,$$

which by analogy to FIG. 37, described an orthogonal projection of X onto S'.

Generally, the above system of equations which determines the optimal $\chi_k$ may be regarded as a linear transformation, which maps $\underline{X}$ onto S' optimally, represented here by:

$$A(\chi_k) = \underline{X} * \Psi_k(\underline{x}),$$

where $A_{ij} = \Psi_i * \Psi_j$ is a transformation matrix having elements representing the correlation between bases vectors $\Psi_i$ and $\Psi_j$. The optimal weights $\chi_k$ are determined by the inverse operation $A^{-1}$:

$$\chi_k = A^{-1}(\underline{X} * \Psi_k(\underline{x})),$$

rendering compression with the least residue. One skilled in the art of LMS criteria will know how to express the processes given here in the geometry of multiple dimensions. Hence, the processes described herein are applicable to a variety of image data types.

The present brief and general description has direct processing counterparts depicted in FIG. 36. The operation $$\underline{X} * \Psi_k(\underline{x})$$

represents a convolution filtering process 1014, and $$A^{-1}(\underline{X} * \Psi_k(\underline{x}))$$

represents the optimizing process 1018.

In addition, as will be demonstrated in the following sections, the inverse operation $A^{-1}$ is equivalent to a so-called inverse eigenfilter when taken over to the conjugate image domain. Specifically, $$DFT \chi_k = \frac{1}{\lambda_m} DFT(\underline{X} \cdot \psi_k(\underline{x})),$$

where DFT is the familiar discrete Fourier transform (DFT) and $\lambda_m$ are the eigenvalues of A. The equivalent optimization block 1018, shown in FIG. 38, comprises three steps: (1) a discrete Fourier transformation (DFT) 1020; (2) inverse eigenfiltering 1022; and (3) an inverse discrete Fourier transformation (DFT$^{-1}$) 1024. The advantages of this embodiment, in part, rely on the fast coding/reconstruction speed, since only DFT and DFT$^{-1}$ are the primary computations, where now the optimization is a simple division. Greater elaboration into the principles of the method are provided in Section II where also the presently contemplated preferred embodiments are derived as closed form solutions for a one-dimensional linear spline basis and two-dimensional planar spline bases. Section III provides an operational description for the preferred method of compression and reconstruction utilizing the optimal procedure disclosed in Section II. Section IV discloses results of a reduction to practice of the preferred embodiments applied to one- and two-dimensional images. Finally, Section V discloses a preferred method of the filter optimizing process implemented in the image domain.

II. IMAGE DATA COMPRESSION BY OPTIMAL SPLINE INTERPOLATION

A. One-Dimensional Data Compression by LMS-Error Linear Splines

Figure 39:
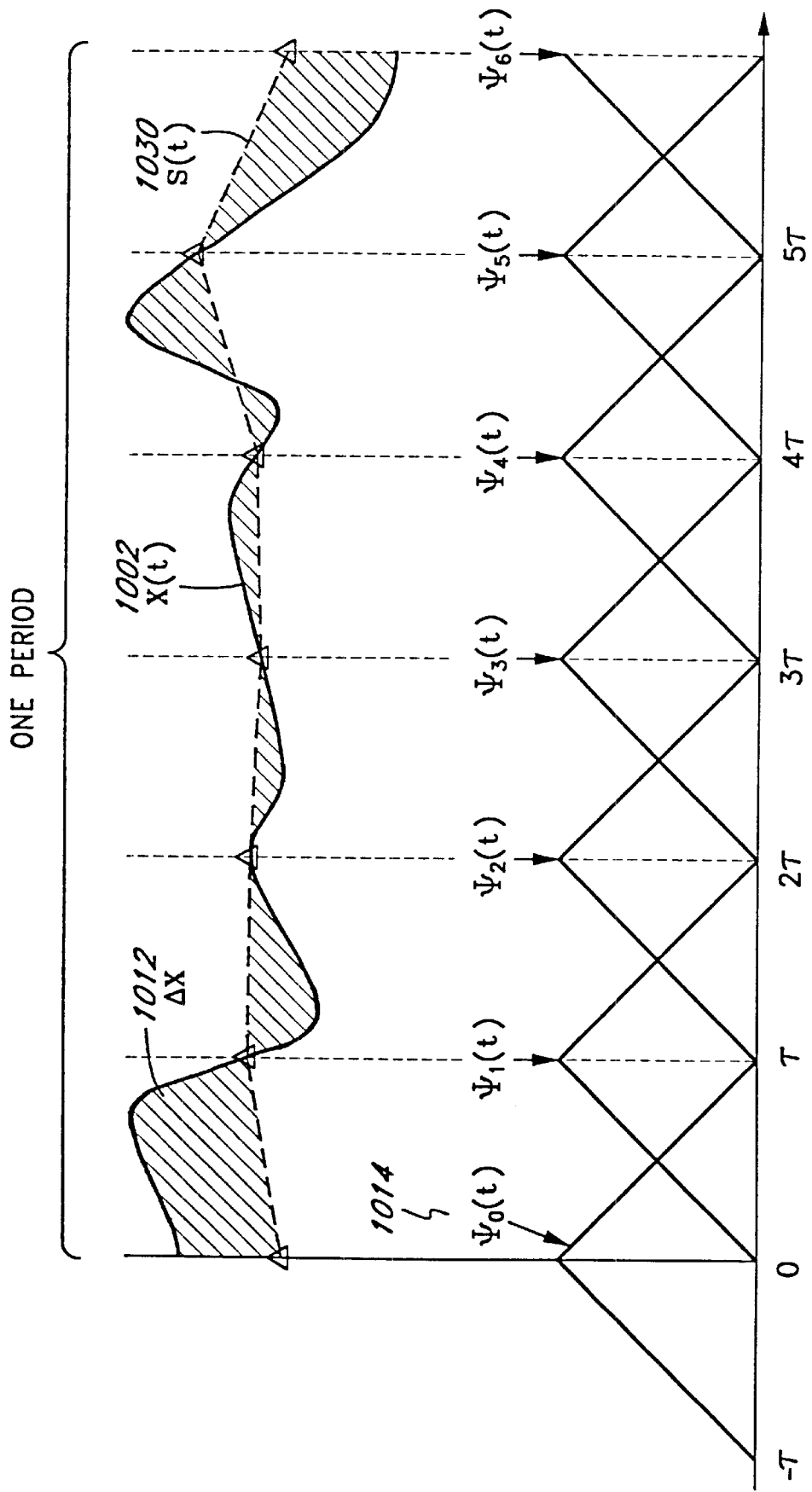
FIG. 39 is a graphical illustration of a one-dimensional bi-linear spline projection.

For one-dimensional image data, bi-linear spline functions are combined to approximate the image data with a resultant linear interpolation, as shown in FIG. 39. The resultant closed-form approximating and optimizing process has a significant advantage in computational simplicity and speed.

Letting the decimation index $\tau$ and image sampling period t be fixed, positive integers (e.g., $\tau, t = 1, 2, \ldots$), and letting X(t) be a periodic sequence of data of period $n\tau$, where n is also an integer, consider a periodic, linear spline 1014 of period $n\tau$ of the type, $$F(t) = F(t + n\tau), \quad (1)$$

where $$F(t) = \begin{cases} 1 - \frac{|t|}{\tau} & \text{for } |t| \leq \tau \\ 0 & \text{for } \tau < |t| < (n-1)\tau \end{cases} \quad (2)$$

as shown by the functions $\Psi_k(t)$ 1014 of FIG. 39.

The family of shifted linear splines F(t) is defined as follows:

$$\Psi_k(t) = F(t - k\tau) \text{ for } (k = 0, 1, 2, \ldots, (n-1)). \quad (3)$$

One object of the present embodiment is to approximate X(t) by the n-point sum:

$$S(t) = \sum_{k=0}^{n-1} X_k \psi_k(t), \quad (4)$$

in a least-mean-squares fashion where $X_0, \ldots, X_{n-1}$ are n reconstruction weights. Observe that the two-point sum in the interval $0 < t < \tau$ is:

$$X_0 \psi_0(t) + X_1 \psi_1(t) = X_0\left(1 - \frac{t}{\tau}\right) + X_1\left(1 - \frac{|t - \tau|}{\tau}\right) \quad (5)$$
$$= X_0 + (X_1 - X_0)\frac{t}{\tau},$$

Hence, S(t) 1030 in Equation 4 represents a linear interpolation of the original waveform X(t) 1002, as shown in FIG. 39.

To find the "best" weights $X_0, \ldots, X_{n-1}$, the quality L($X_0$, $X_1, \ldots, X_{n-1}$) is minimized:

$$L(X_0, X_1, \ldots, X_{n-1}) = \sum_{t=-\tau}^{n\tau} \left\{ \left( X(t) - \sum_{k=0}^{n-1} X_k \psi_k(t) \right)^2 \right\}, \quad (6)$$

where the sum has been taken over one period plus $\tau$ of the data. $X_k$ is minimized by differentiating as follows:

$$\frac{\partial L}{\partial X_j} = \sum_{t=\tau}^{n\tau} 2\left( X(t) - \sum_{k=0}^{n-1} X_k \psi_k(t) \right) \psi_j(t) \quad (7)$$

$$= \left\langle 2\left( \sum_{t=-\tau}^{n\tau} X(t)\psi_j(t) - \sum_{k=0}^{n-1} X_k \sum_{t=-\tau}^{n\tau} \psi_k(t)\psi_j(t) \right) \right\rangle \equiv 0.$$

This leads to the system, $$\sum_{k=0}^{n-1} A_{jk} X_k = Y_j, \quad (8)$$

of linear equations for $X_k$, where $$A_{jk} = \sum_{t=-\tau}^{n\tau} \psi_j(t)\psi_k(t) \text{ for } (j, k = 0, 1, \ldots, n-1) \quad (9)$$

and $$Y_j = \sum_{t=-\tau}^{n\tau} X(t)\psi_j(t) \text{ for } (j = 0, 1, \ldots, n-1) \quad (10)$$

The term $Y_j$ in Equation 10 is reducible as follows:

$$Y_j = \sum_{t=-\tau}^{n\tau} X(t) F(t - j\tau) \quad (11)$$

$$= \sum_{t=(j-1)\tau}^{(j+1)\tau} X(t) F(t - j\tau).$$

Letting $(t - j\tau) = m$, then:

$$Y_j = \sum_{m=-\tau+1}^{\tau-1} X(m + j\tau) F(m) \text{ for } (j = 0, 1, 2, \ldots, n-1). \quad (12)$$

The $Y_j$'s in Equation 12 represent the compressed data to be transmitted or stored. Note that this encoding scheme involves n correlation operations on only $2\tau-1$ points.

Since $F(t)$ is assumed to be periodic with period $n\tau$, the matrix form of $A_{jk}$ in Equation 9 can be reduced by substitution Equation 3 into Equation 9 to obtain:

$$A_{jk} = \sum_{m=-\tau+1}^{\tau-1} F(m + (j-k)\tau) F(m) \quad (13)$$

$$= \begin{cases} \sum_{m=-\tau+1}^{\tau-1} (F(m))^2 \triangleq \alpha & \text{if } j - k \equiv 0 \mod n \\ \sum_{m=-\tau+1}^{\tau-1} F(m \pm \tau) F(m) \triangleq \beta & \text{if } j - k \equiv \pm 1 \mod n \\ 0 & \text{otherwise} \end{cases}$$

By Equation 13, $A_{jk}$ can be expressed also in circulant form in the following manner:

$$A_{jk} = a_{(k-j)_n}, \quad (14)$$

where $(k-j)_n$ denotes $(k-j) \mod n$, and $$a_0 = \alpha, a_1 = \beta, a_2 = 0, \ldots, a_{n-1} = \beta \quad (15)$$

Therefore, $A_{jk}$ in Equations 14 and 15 has explicitly the following equivalent circulant matrix representations:

$$[A_{jk}] \triangleq \begin{bmatrix} A_{0,0} & A_{0,1} & \cdots & A_{0,n-1} \\ A_{1,0} & A_{1,1} & \cdots & A_{1,n-1} \\ \vdots & \vdots & \ddots & \vdots \\ A_{n-1,0} & A_{n-1,1} & \cdots & A_{n-1,n-1} \end{bmatrix} \quad (16)$$

$$= [\{a_{(k-j)_n}\}]$$

$$\triangleq \begin{bmatrix} a_0 & a_1 & a_2 & \cdots & a_{n-1} \\ a_{n-1} & a_0 & a_1 & \cdots & a_{n-2} \\ a_{n-2} & a_{n-1} a_0 & \cdots & a_{n-3} \\ \vdots & \vdots & \vdots & \ddots & \vdots \\ a_1 & a_2 & a_3 & \cdots & a_0 \end{bmatrix}$$

$$= \begin{bmatrix} \alpha & \beta & 0 & \cdots & \beta \\ \beta & \alpha & \beta & \cdots & 0 \\ 0 & \beta & \alpha & \cdots & 0 \\ \vdots & \vdots & \vdots & \ddots & \vdots \\ \beta & 0 & 0 & \cdots & \alpha \end{bmatrix}$$

One skilled in the art of matrix and filter analysis will appreciate that the periodic boundary conditions imposed on the data lie outside the window of observation and may be defined in a variety of ways. Nevertheless, periodic boundary conditions serve to simplify the process implementation by insuring that the correlation matrix $[A_{jk}]$ has a calculable inverse. Thus, the optimization process involves an inversion of $[A_{jk}]$, of which the periodic boundary conditions and consequent circulant character play a preferred role. It is also recognized that for certain spline functions, symmetry rendered in the correlation matrix allows inversion in the absence of periodic image boundary conditions.

B. Two-Dimensional Data Compression by Planar Splines

Figure 40:
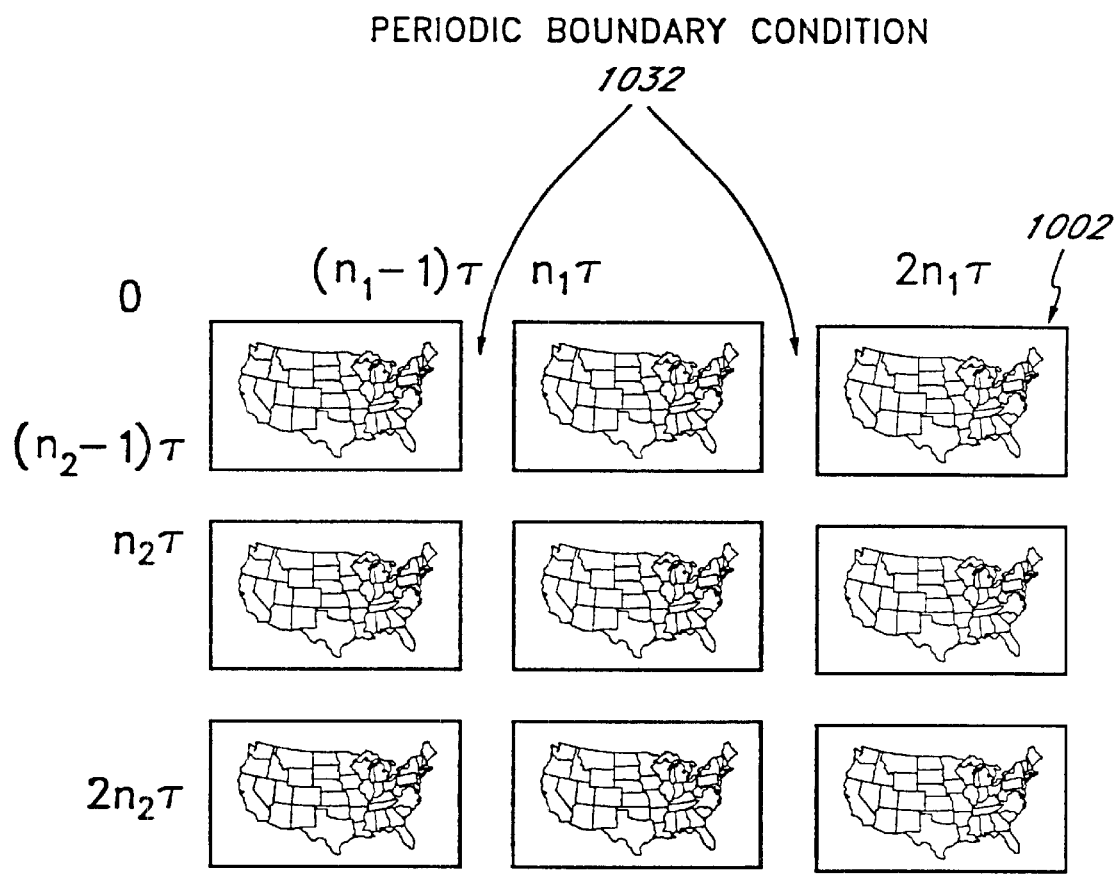
FIG. 40 is a schematic view showing periodic replication of a two-dimensional image.

For two-dimensional image data, multi-planar spline functions are combined to approximate the image data with a resultant planar interpolation. In FIG. 40, $X(t_1, t_2)$ is a doubly periodic array of image data (e.g., still image) of periods $n_1\tau$ and $n_2\tau$, with respect to the integer variables $t_1$ and $t_2$ where $\tau$ is a multiple of both $t_1$ and $t_2$. The actual image 1002 to be compressed can be viewed as being repeated periodically throughout the plane as shown in the FIG. 40. Each subimage of the extended picture is separated by a border 1032 (or gutter) of zero intensity of width $\tau$. This border is one of several possible preferred "boundary conditions" to achieve a doubly-periodic image.

Consider now a doubly periodic planar spline, $F(t_1, t_2)$ which has the form of a six-sided pyramid or tent, centered at the origin and is repeated periodically with periods $n_1\tau$ and $n_2\tau$ with respect to integer variables $t_1$ and $t_2$, respectively. A perspective view of such a planar spline function 1034 is shown in FIG. 41*a* and may hereinafter be referred to as "hexagonal tent." Following the one-dimensional case by analogy, letting:

$$\Psi_{k_1 k_2}(t_1, t_2) = F(t_1 - k_1\tau, t_2 - k_2\tau) \qquad (17)$$

for $(k_1=0,1,\ldots,n_1-1)$ and $(k_2=0,1,\ldots,n_2-1)$, the "best" weights $X_{k_1 k_2}$ are found such that:

$$L(X_{k_1 k_2}) = \sum_{t_1,t_2=-\tau}^{n_1\tau,n_2\tau} \left\{ \left( X(t_1, t_2) - \sum_{k_1,k_2=0}^{n_1-1,n_2-1} X_{k_1 k_2} \psi_{k_1 k_2}(t_1, t_2) \right)^2 \right\} \qquad (18)$$

is a minimum.

A condition for L to be a minimum is $$\frac{\partial L}{\partial X_{j_1 j_2}} = 2 \sum_{t_1,t_2=-\tau}^{n_1\tau,n_2\tau} \left\{ \left( X(t_1, t_2) - \sum_{k_1,k_2=0}^{n_1-1,n_2-1} X_{k_1 k_2} \psi_{k_1 k_2}(t_1, t_2) \right) \psi_{j_1 j_2}(t_1, t_2) \right\} \qquad (19)$$

$$= 2 \left( \sum_{t_1,t_2=-\tau}^{n_1\tau,n_2\tau} X(t_1, t_2) \psi_{j_1 j_2}(t_1, t_2) - \sum_{k_1,k_2=0}^{n_1-1,n_2-1} X_{k_1 k_2} \sum_{t_1,t_2=-\tau}^{n_1\tau,n_2\tau} \psi_{j_1 j_2}(t_1, t_2) \psi_{k_1 k_2}(t_1, t_2) \right)$$

$$\equiv 0.$$

The best coefficients $X_{k_1 k_2}$ are the solution of the 2nd-order tensor equation, $$A_{j_1 j_2 k_1 k_2} X_{k_1 k_2} = Y_{j_1 j_2}, \qquad (20)$$

where the summation is on $k_1$ and $k_2$, $$A_{j_1 j_2 k_1 k_2} = \sum_{t_1,t_2=-\tau}^{n_1\tau,n_2\tau} \psi_{j_1 j_2}(t_1, t_2) \psi_{k_1 k_2}(t_1, t_2) \qquad (21)$$

and $$Y_{j_1 j_2} = \sum_{t_1,t_2=-\tau}^{n_1\tau,n_2\tau} X(t_1, t_2) \psi_{j_1 j_2}(t_1, t_2). \qquad (22)$$

With the visual aid of FIG. 41*a*, the tensor $Y_{j_1 j_2}$ reduces as follows:

$$Y_{j_1 j_2} = \sum_{t_1,t_2=-\tau}^{n_1\tau,n_2\tau} X(t_1, t_2) \psi_{j_1 j_2}(t_1, t_2) \qquad (23)$$

$$= \sum_{t_1,t_2=-\tau}^{n_1\tau,n_2\tau} X(t_1, t_2) F(t_1 - j_1\tau, t_2 - j_2\tau)$$

$$= \sum_{t_1=(j_1-1)\tau}^{(j_1+1)\tau} \sum_{t_2=(j_2-1)\tau}^{(j_2+1)\tau} X(t_1, t_2) F(t_1 - j_1\tau, t_2 - j_2\tau).$$

Letting $t_k - j_k\tau = m_k$ for $k=1,2$, then $$Y_{j_1 j_2} = \sum_{m_1,m_2=-\tau+1}^{\tau-1} X(m_1 + j_1\tau, m_2 + j_2\tau) F(m_1, m_2) \qquad (24)$$

for $(j_1=0,1,\ldots,n_1-1)$ and $(j_2=0,1,\ldots,n_2-1)$, where $F(m_1,m_2)$ is the doubly periodic, six-sided pyramidal function, shown in FIG. 41*a*. The tensor transform in Equation 21 is treated in a similar fashion to obtain $$A_{j_1 j_2 k_1 k_2} = \sum_{t_1,t_2=-\tau}^{n_1\tau,n_2\tau} \psi_{j_1,j_2}(t_1, t_2) \psi_{k_1 k_2}(t_1, t_2) \qquad (25)$$

$$= \sum_{m_1,m_2=-\tau+1}^{\tau-1} F(m_1 + (j_1 - k_1)\tau, m_2 + (j_2 - k_2)\tau) F(m_1, m_2)$$

$$= \begin{cases} \sum_{m_1,m_2=-\tau+1}^{\tau-1} [F(m_1, m_2)]^2 \stackrel{\Delta}{=} \alpha & \text{if } (j_1 - k_1) \equiv 0 \bmod n_1 \land (j_2 - k_2) \equiv 0 \bmod n_2 \\ \sum_{m_1,m_2=-\tau+1}^{\tau-1} F(m_1 \pm \tau, m_2) F(m_1, m_2) \stackrel{\Delta}{=} \beta & \text{if } (j_1 - k_1) \equiv \pm 1 \bmod n_1 \land (j_2 - k_2) \equiv 0 \bmod n_2 \\ \sum_{m_1,m_2=-\tau+1}^{\tau-1} F(m_1, m_2 \pm \tau) F(m_1, m_2) \stackrel{\Delta}{=} \gamma & \text{if } (j_1 - k_1) \equiv 0 \bmod n_1 \land (j_2 - k_2) \equiv \pm 1 \bmod n_2 \\ \sum_{m_1,m_2=-\tau+1}^{\tau-1} F(m_1 \pm \tau, m_2 \pm \tau) F(m_1, m_2) \stackrel{\Delta}{=} \xi & \text{if } (j_1 - k_1) \equiv \pm 1 \bmod n_1 \land (j_2 - k_2) \equiv \pm 1 \bmod n_2 \\ \sum_{m_1,m_2=-\tau+1}^{\tau-1} F(m_1 \mp \tau, m_2 \pm \tau) F(m_1, m_2) \stackrel{\Delta}{=} \eta & \text{if } (j_1 - k_1) \equiv \mp 1 \bmod n_1 \land (j_2 - k_2) \equiv \pm 1 \bmod n_2. \end{cases}$$

The values of $\alpha$, $\beta$, $\gamma$, and $\xi$ depend on $\tau$, and the shape and orientation of the hexagonal tent with respect to the image domain, where for example $m_1$ and $m_2$ represent row and column indices. For greater flexibility in tailoring the hexagonal tent function, it is possible to utilize all parameters of the $[A_{j_1 j_2 k_1 k_2}]$. However, to minimize calculational overhead it is preferable to employ symmetric hexagons, disposed over the image domain with a bi-directional period $\tau$. Under these conditions, $\beta = \gamma = \xi$ and $\eta = 0$, simplifying $[A_{j_1 j_2 k_1 k_2}]$ considerably. Specifically, the hexagonal tent depicted in FIG. 41a and having an orientation depicted in FIG. 41b is described by the preferred case in which $\beta = \gamma = \xi$ and $\eta = 0$. It will be appreciated that other orientations and shapes of the hexagonal tent are possible, as depicted, for example, in FIG. 41c. Combinations of hexagonal tents are also possible and embody specific preferable attributes. For example, a superposition of the hexagonal tents shown in FIGS. 41b and 41c effectively "symmetrizes" the compression process.

From Equation 25 above, $A_{j_1 j_2 k_1 k_2}$ can be expressed in circulant form by the following expression:

$$A_{j_1 j_2 k_1 k_2} = a_{(k_1-j_1)n_1,(k_2-j_2)n_2}. \tag{26}$$

where $(k_l - j_l)_{n_l}$ denote $(k_1 - j_1)$ mod $n_l$, $l=1,2$, and $$[a_{s_1 s_2}] = \begin{bmatrix} a_{00} & a_{01} & a_{02} & \cdots & a_{0,n_2-1} \\ a_{10} & a_{11} & a_{12} & \cdots & a_{1,n_2-1} \\ a_{20} & a_{21} & a_{22} & \cdots & a_{2,n_2-1} \\ \vdots & \vdots & \vdots & \ddots & \vdots \\ a_{n_1-1,0} & a_{n_1-1,1} & a_{n_1-1,2} & \cdots & a_{n_1-1,n_2-1} \end{bmatrix} \tag{27}$$

$$= \begin{bmatrix} \alpha & \beta & 0 & \cdots & 0 & \beta \\ \beta & \beta & 0 & \cdots & 0 & 0 \\ 0 & 0 & 0 & \cdots & 0 & 0 \\ \vdots & \vdots & \vdots & \ddots & \vdots & \vdots \\ 0 & 0 & 0 & \cdots & 0 & 0 \\ \beta & 0 & 0 & \cdots & 0 & \beta \end{bmatrix},$$

where $(s_1 = 0,1,2, \ldots n_1-1)$ and $(s_2 = 1,2,3, \ldots, n_2-1)$. Note that when $[a_{s_1,s_2}]$ is represented in matrix form, it is "block circulant."

C. Compression-Reconstruction Algorithms

Because the objective is to apply the above-disclosed LMS error linear spline interpolation techniques to image sequence coding, it is advantageous to utilize the tensor formalism during the course of the analysis in order to readily solve the linear systems in equations 8 and 20. Here, the tensor summation convention is used in the analysis for one and two dimensions. It will be appreciated that such convention may readily apply to the general case of N dimensions.

1. Linear Transformation of Tensors

A linear transformation of a 1st-order tensor is written as $$Y_r = A_{rs} X_s \text{(sum on s)}, \tag{28}$$

where $A_{rs}$ is a linear transformation, and $Y_r, X_s$ are 1st-order tensors. Similarly, a linear transformation of a second order tensor is written as:

$$Y_{r_1 r_2} = A_{r_1 r_2 s_1 s_2} X_{s_1 s_2} \text{(sum on } s_1, s_2\text{)}. \tag{29}$$

The product or composition of linear transformations is defined as follows. When the above Equation 29 holds, and $$Z_{q_1 q_2} = B_{q_1 q_2 r_1 r_2} Y_{r_1 r_2}, \tag{30}$$

then $$Z_{q_1 q_2} = B_{q_1 q_2 r_1 r_2} A_{r_1 r_2 s_1 s_2} X_{s_1 s_2}. \tag{31}$$

Hence, $$C_{q_1 q_2 s_1 s_2} = B_{q_1 q_2 r_1 r_2} A_{r_1 r_2 s_1 s_2} \tag{32}$$

is the composition or product of two linear transformations.

2. Circulant Transformation of 1st-Order Tensors

The tensor method for solving equations 8 and 20 is illustrated for the 1-dimensional case below: Letting $A_{rs}$ represent a circulant tensor of the form:

$$A_{rs} = a_{(s-r) \bmod n} \text{ for}(r,s=0,1,2, \ldots, n-1), \tag{33}$$

and considering the n special 1st-order tensors as $$W_s^{(l)} \equiv (\omega^l)^s \text{ for } (l=0,1,2, \ldots, n-1), \tag{34}$$

where $\omega$ is the n-th root of unity, then $$A_{rs} W_s^{(l)} = \lambda(l) W_r^{(l)}, \tag{35}$$

where $$\lambda(l) = \sum_{j=0}^{n-1} a_j (\omega^l)^j \tag{36}$$

are the distinct eigenvalues of $A_{rs}$. The terms $W_s^{(l)}$ are orthogonal.

$$W_s^{(l)} W_s^{(j)*} = \begin{cases} 0 & \text{for } l \neq j \\ n & \text{for } l = j. \end{cases} \tag{37}$$

At this point it is convenient to normalize these tensors as follows:

$$\varphi_s^{(l)} \triangleq \frac{1}{\sqrt{n}} w_s^{(l)} \quad \text{for } (l = 0, 1, 2, \ldots, n-1). \tag{38}$$

$\phi_s^{(l)}$ evidently also satisfies the orthonormal property, i.e., $$\phi_s^{(l)} \phi_s^{(j)*} = \delta_{lj} \tag{39}$$

where $\delta_{lj}$ is the Kronecker delta function and * represents complex conjugation.

A linear transformation is formed by summing the n dyads $\phi_r^{(l)} \phi_s^{(l)*}$ for $l=0,1, \ldots, n-1$ under the summation sign as follows:

$$\tilde{A}_{rs} = \sum_{l=0}^{n-1} \lambda(l) \varphi_r^{(l)} \varphi_s^{(l)*}. \tag{40}$$

Then $$\tilde{A}_{rs} \varphi_s^{(j)} = \sum_{j=0}^{n-1} \lambda(l) \varphi_r(l) \varphi_s(l) * \varphi_s(j) \tag{41}$$

$$= \sum_{n-1}^{l=0} \lambda(l) \varphi_r(l) \delta_{lj}$$

$$= \lambda(j) \varphi_r(j).$$

Since $\tilde{A}_{rs}$ has by a simple verification the same eigenvectors and eigenvalues as the transformation $A_{rs}$ has in Equations 9 and 33, the transformation $\tilde{A}_{rs}$ and $A_{rs}$ are equal.

3. Inverse Transformation of 1st-Order Tensors.

The inverse transformation of $A_{rs}$ is shown next to be $$A_{rs}^{-1} = \sum_{l=0}^{n-1} \frac{1}{\lambda(l)} \varphi_r^l \varphi_s^{l*}. \tag{42}$$

This is proven easily, as shown below:

$$A_{rs} A_{st}^{-1} = \sum_{l=0}^{n-1} \sum_{l'=0}^{n-1} \lambda(l) \frac{1}{\lambda(l')} \varphi_r^l \varphi_s^{l*} \varphi_s^{l'} \varphi_t^{l'*} \tag{43}$$

$$= \sum_{l=0}^{n-1} \sum_{l'=0}^{n-1} \lambda(l) \frac{1}{\lambda(l')} \varphi_r^l \delta_{ll'} \varphi_t^{l'*} = \sum_{l=0}^{n-1} \varphi_r^l \varphi_t^{l*}$$

$$= \sum_{l=0}^{n-1} \frac{1}{n} (\omega^l)^{rt} = \sum_{l=0}^{n-1} \frac{1}{n} (\omega^{rt})^l = \delta_{rt}$$

4. Solving 1st-Order Tensor Equations

The solution of a 1st-order tensor equation $Y_r = A_{rs} X$ is given by $$A_{qr}^{-1} Y_r = A_{qr}^{-1} A_{rs} X_s = \delta_{qs} X_s = X_q, \tag{44}$$

so that $$X_r = A_{rs}^{-1} Y_s \tag{45}$$

$$= \sum_{l=0}^{n-1} \frac{1}{\lambda(l)} \varphi_r^l \varphi_s^{l*} Y_s = \sum_{l=0}^{n-1} \left( \frac{\varphi_s^{l*} Y_s}{\lambda(l)} \right) \varphi_r^l$$

$$= \sum_{l=0}^{n-1} \left[ \frac{1}{\lambda(l)} \left( \frac{1}{n} \sum_{k=0}^{n-1} Y_k \omega^{-lk} \right) \right] \omega^{lr} = DFT\left[ \frac{1}{\lambda(l)} DFT^{-1}(Y_k) \right].$$

where DFT denotes the discrete Fourier Transform and $DFT^{-1}$ denotes its inverse discrete Fourier Transform.

An alternative view of the above solution method is derived below for one dimension using standard matrix methods. A linear transformation of a 1st-order tensor can be represented by a matrix. For example, let A denote $A_{rs}$ in matrix form. If $A_{rs}$ is a circulant transformation, then A is also a circulant matrix. From matrix theory it is known that every circulant matrix is "similar" to a DFT matrix. If Q denotes the DFT matrix of dimension (n×n), and $Q^\dagger$ the complex conjugate of the DFT matrix, and $\Lambda$ is defined to be the eigenmatrix of A, then:

$$A = Q \Lambda Q^\dagger. \tag{46}$$

The solution to y=Ax is then $$x = A^{-1} y = Q \Lambda^{-1} (Q^\dagger Y).$$

For the one-dimensional process described above, the eigenvalues of the transformation operators are:

$$\lambda(l) = \sum_{j=0}^{n-1} a_j (w^l)^j \tag{47}$$

$$= DFT(a_j).$$

where $a_0 = \alpha$, $a_1 = \beta$, ..., $a_{n-2} = 0$, $a_{n-1} = \beta$, and $\omega^n = 1$. Hence:

$$\lambda(l) = \alpha + \beta \omega^l + \beta \omega^{(n-1)l} = \alpha + \beta(\omega^l + \omega^{-l}). \tag{48}$$

A direct extension of the 1st-order tensor concept to the 2nd-order tensor will be apparent to those skilled in the art.

Figure 42A:
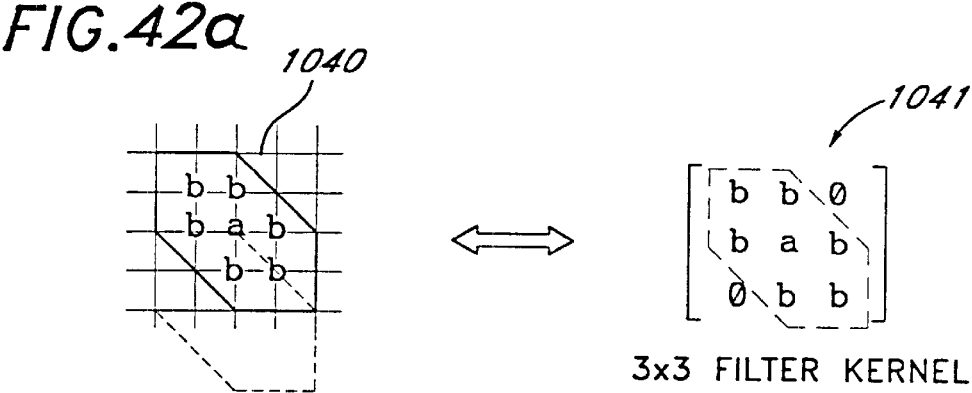
FIG. 42 is a diagram showing representations of the hexagonal tent function.
Figure 42B:
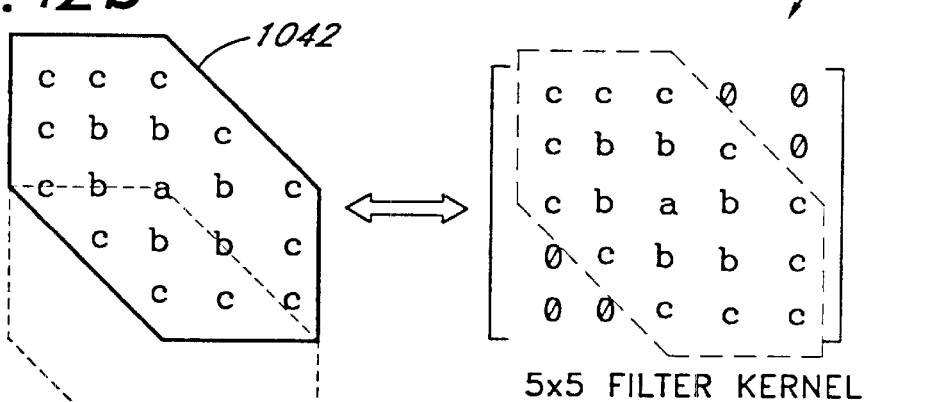
Figure 42C:
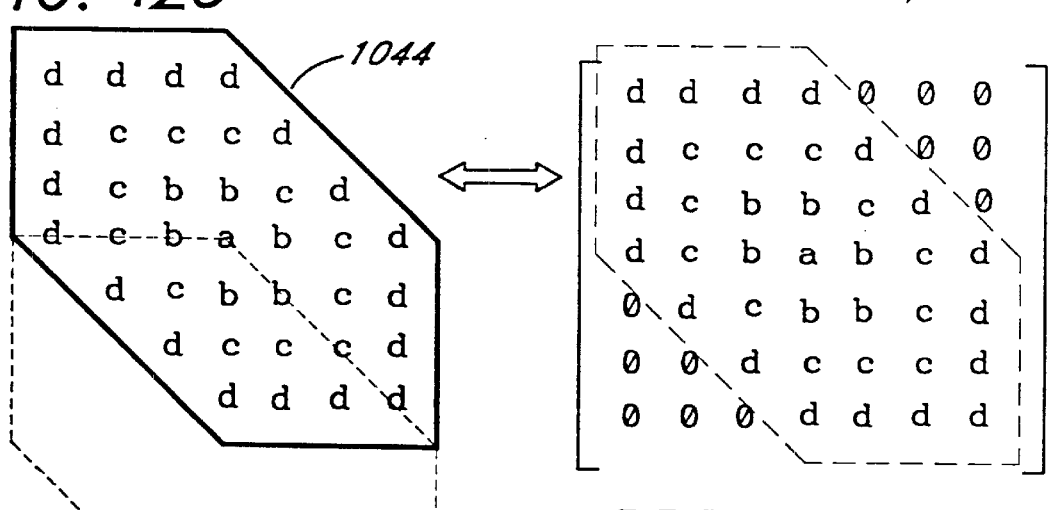

By solving the 2nd-order tensor equations, the results are extended to compress a 2-D image. FIG. 42 depicts three possible hexagonal tent functions for 2-dimensioned image compression indices $\tau = 2, 3, 4$. The following table exemplifies the relevant parameters for implementing the hexagonal tent functions:

| Decimation Index ($\tau$) | $\tau = 2$ | $\tau = 3$ | $\tau = 4$ |
|---|---|---|---|
| Compression Ratio ($\tau^2$) | 4 | 9 | 16 |
| $\alpha$ | $a^2 + 6b^2$ | $a^2 + 6b^2 + 12c^2$ | $a^2 + 6b^2 + 12c^2 + 18d^2$ |
| $\beta$ | $b^2$ | $2(c^2 + bc)$ | $2d^2 + 2db + 4dc + c^2$ |
| gain | $a + 6b$ | $a + 6b + 12c$ | $a + 6b + 12c + 18d$ |

The algorithms for compressing and reconstructing a still image are explained in the succeeding sections.

III. OVERVIEW OF CODING-RECONSTRUCTION SCHEME

Figure 43:
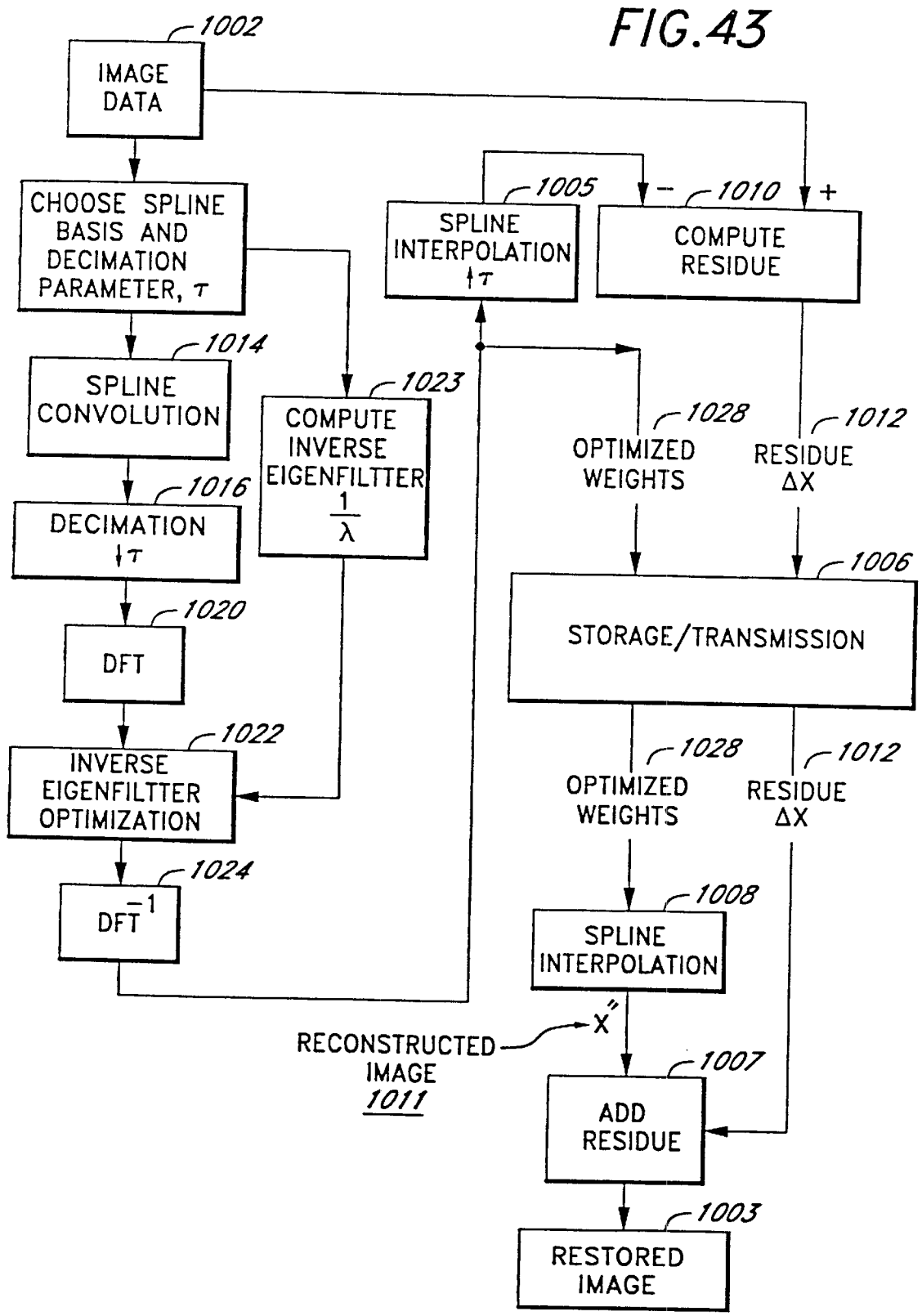
FIG. 43 is a flow diagram of compression and reconstruction of image data.
Figure 44:
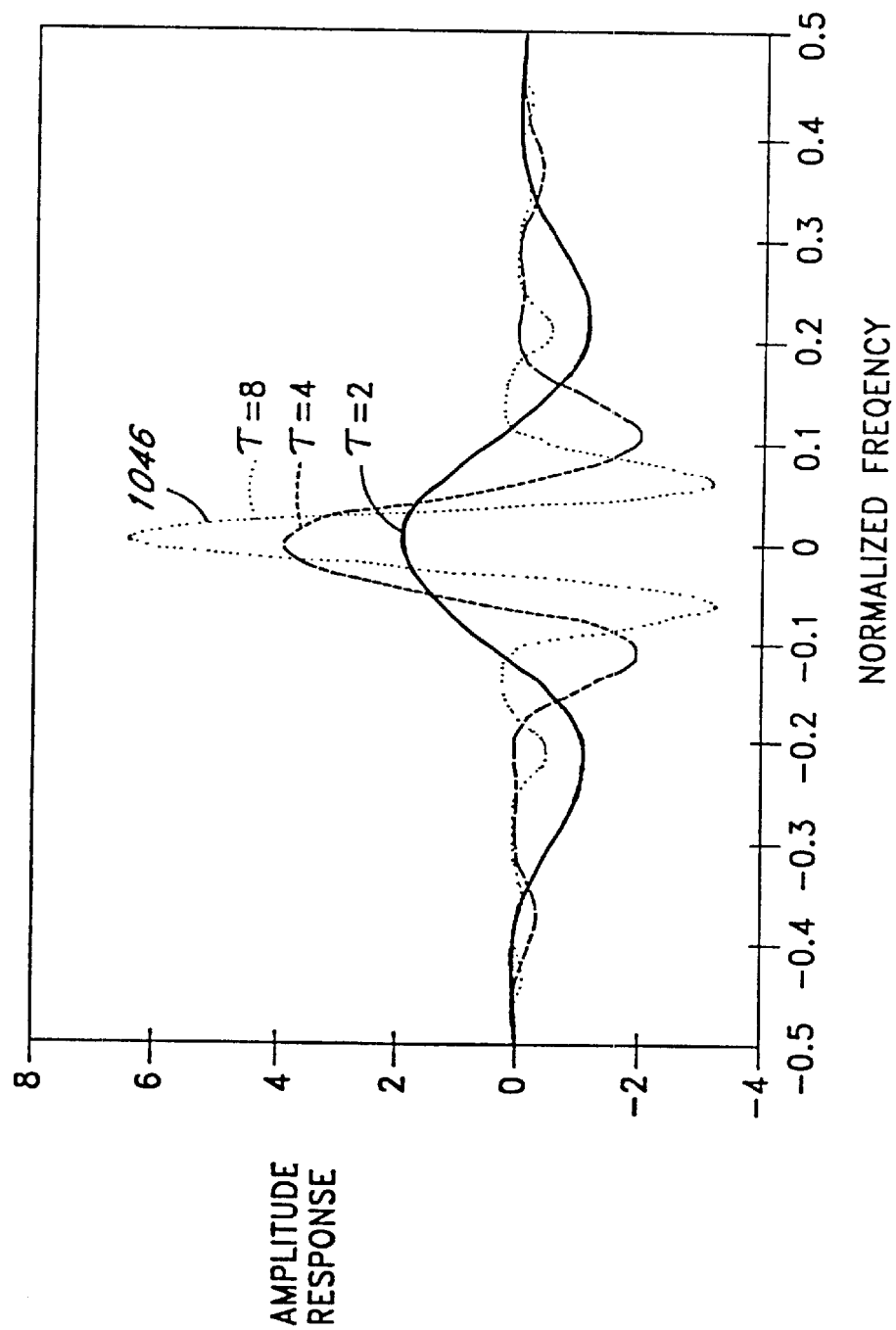
FIG. 44 is a graphical representation of a normalized frequency response of a one-dimensional bi-linear spline basis.
Figure 45A:
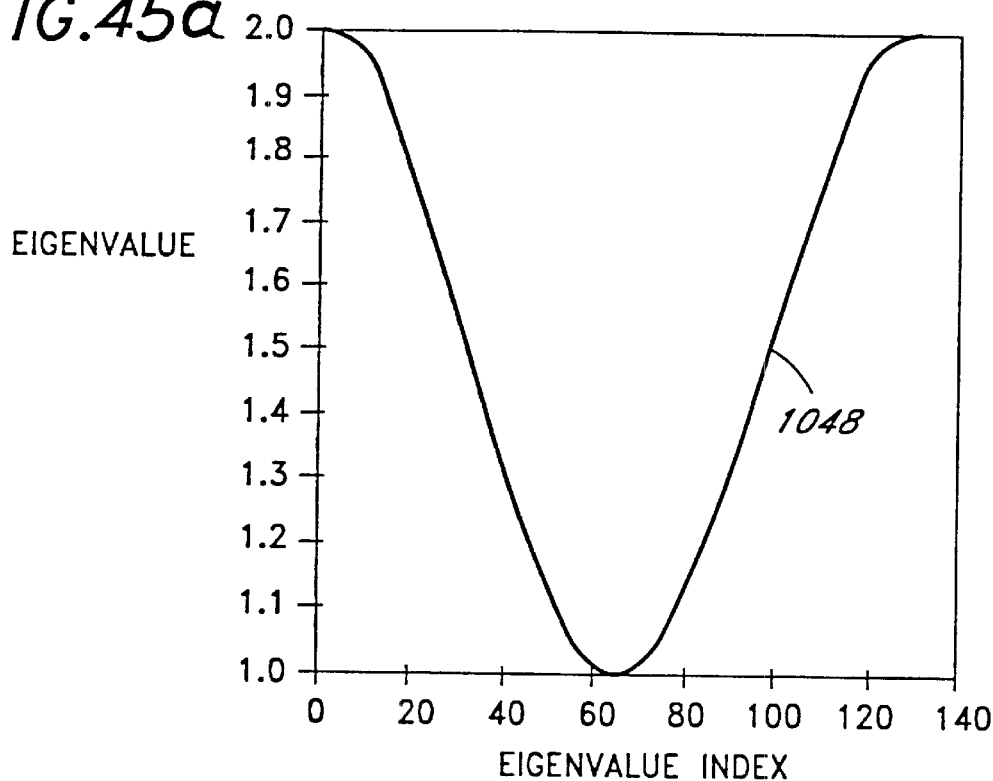
FIG. 45 is a graphical representation of a one-dimensional eigenfilter frequency response.
Figure 45B:
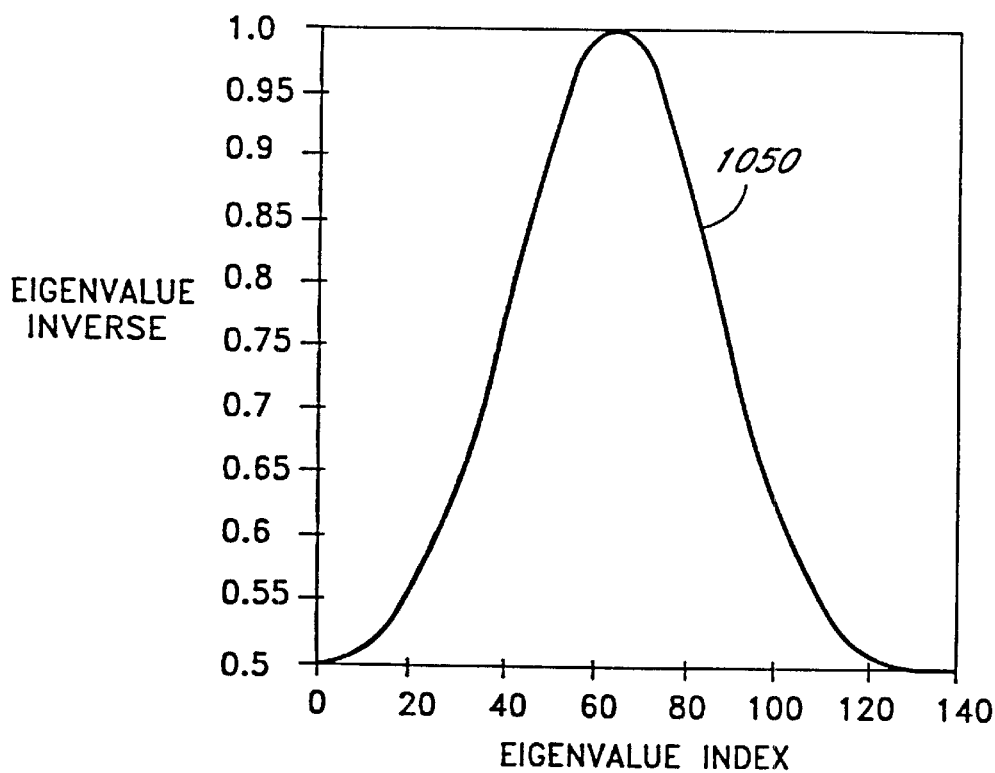
Figure 46B:
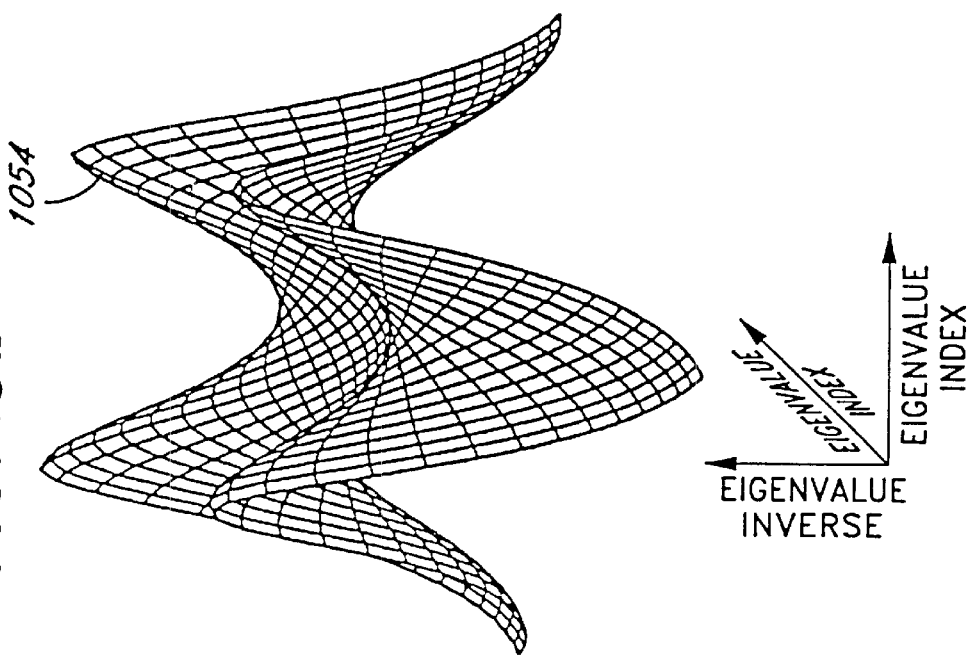
FIG. 46 is a perspective view of a two-dimensional eigenfilter frequency response.
Figure 46A:
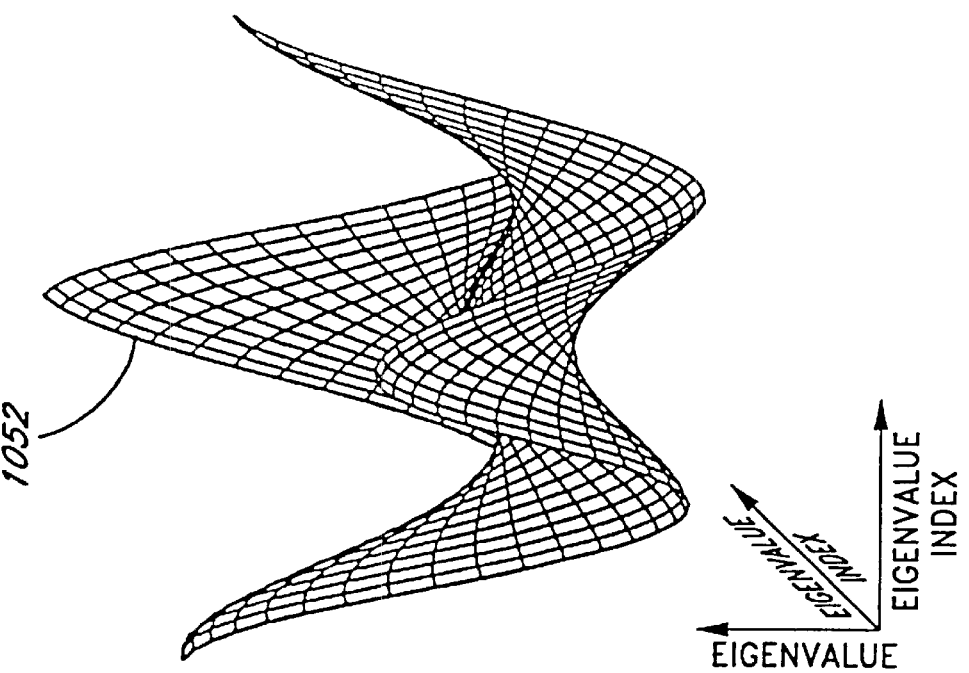

A block diagram of the compression/reconstruction scheme is shown in FIG. 43. The signal source 1002, which can have dimension up to N, is first passed through a low-pass filter (LPF). This low-pass filter is implemented by convolving (in a process block 1014) a chosen spline filter 1013 with the input source 1002. For example, the normalized frequency response 1046 of a one-dimensional linear spline is shown in FIG. 44. Referring again to FIG. 43, it can be seen that immediately following the LPF, a subsampling procedure is used to reduce the signal size 1016 by a factor $\tau$. The information contained in the subsampled source is not optimized in the least-mean-square sense. Thus, an optimization procedure is needed to obtain the best reconstruction weights. The optimization process can be divided into three consecutive parts. A DFT 1020 maps the non-optimized weights into the image conjugate domain. Thereafter, an inverse eigenfilter process 1022 optimizes the compressed data. The frequency response plots for some typical eigenfilters and inverse eigenfilters are shown in FIGS. 45 and 46. After the inverse eigenfilter 1022, a $DFT^{-1}$ process block 1024 maps its input back to the original image domain. When the optimized weights are derived, reconstruction can proceed. The reconstruction can be viewed as oversampling followed by a reconstruction low-pass filter.

The embodiment of the optimized spline filter described above may employ a DFT and $DFT^{-1}$ type transform processes. However, those skilled in the art of digital image processing will appreciate that it is preferable to employ a Fast Fourier Transform (FFT) and $FFT^{-1}$ processes, which substantially reduce computation overhead associated with conjugate transform operations. Typically, such an improvement is given by the ratio of computation steps required to transform a set of N elements:

$$\frac{FFT}{DFT} = \frac{\frac{N}{2} \log_2(N)}{N^2} = \frac{1}{2N} \log_2(N),$$

which improves with the size of the image.

A. The Compression Method

The coding method is specified in the following steps:

1. A suitable value of $\tau$ (an integer) is chosen. The compression ratio is $\tau^2$ for two-dimensional images.
2. Equation 23 is applied to find $Y_{j1,j2}$, which is the compressed data to be transmitted or stored:

$$Y_{j_1,j_2} = \sum_{t_1,t_2=-\tau}^{n_1\tau,n_2\tau} X(t_1, t_2)\psi_{j_1 j_2}(t_1, t_2)$$

$$= \sum_{t_1,t_2=-\tau}^{n_1,n_2} X(t_1, t_2)F(t_1 - j_1\tau, t_2 - j_2\tau)$$

$$= \sum_{t_1=(j_1-1)\tau}^{(j_1+1)\tau} \sum_{t_2=(j_2-1)\tau}^{(j_2+1)\tau} X(t_1, t_2)F(t_1 - j_1\tau, t_2 - j_2\tau)$$

B. The Reconstruction Method

The reconstruction method is shown below in the following steps:

1. Find the $FFT^{-1}$ of $Y_{j_1,j_2}$ (the compressed data).
2. The results of step 1 are divided by the eigenvalues $\lambda(l,m)$ set forth below. The eigenvalues $\lambda(l,m)$ are founl by extending Equation 48 to the two-dimensional case to obtain:

$$\lambda(l,m) = \alpha + \beta(\omega_1^l + \omega_1^{-l} + \omega_2^m + \omega_2^{-m} + \omega_1^l\omega_2^{-m} + \omega_1^{-l}\omega_2^m), \quad (49)$$

where $\omega_1$ is the $n_1$-th root of unity and $\omega_2$ is the $n_2$-th root of unity.

3. The FFT of the results from step 2 is then taken. After computing the FFT, $X_{k_1 k_2}$ (the optimized weights) are obtained.
4. The recovered or reconstructed image is:

$$S(t_1, t_2) = \sum_{k_1,k_2=0}^{n_1-1,n_2-1} X_{k_1 k_2}\psi_{k_1 k_2}(t_1, t_2). \quad (50)$$

5. Preferably, the residue is computed and retained with the optimized weights:

$$\Delta X(t_1,t_2) = X(t_1,t_2) - S(t_1, t_2).$$

Although the optimizing procedure outlined above appears to be associated with an image reconstruction process, it may be implemented at any stage between the aforementioned compression and reconstruction. It is preferable to implement the optimizing process immediately after the initial compression so as to minimize the residual image. The preferred order has an advantage with regard to storage, transmission and the incorporation of subsequent image processes.

C. Response Considerations

The inverse eigenfilter in the conjugate domain is described as follows:

$$H(i, j) = \frac{1}{\lambda(i, j)}. \quad (51)$$

where $\lambda(i,j)$ can be considered as an estimation of the frequency response of the combined decimation and interpolation filters. The optimization process $H(i,j)$ attempts to "undo" what is done in the combined decimation/interpolation process. Thus, $H(i,j)$ tends to restore the original signal bandwidth. For example, for $\tau=2$, the decimation/interpolation combination is described as having an impulse response resembling that of the following 3×3 kernel:

$$R = \begin{pmatrix} 0 & \beta & \beta \\ \beta & \alpha & \beta \\ \beta & \beta & 0 \end{pmatrix}. \quad (52)$$

Then, its conjugate domain counterpart, $\lambda(ij)|_{\alpha,\beta,N}$, will be $$\lambda(i, j)|_{\alpha,\beta,N} \equiv \alpha + 2\beta\left[\cos\left(\frac{2\pi i}{N}\right) + \cos\left(\frac{2\pi j}{N}\right) + \cos\left[2\pi\left(\frac{i}{N} - \frac{j}{N}\right)\right]\right], \quad (53)$$

where i,j are frequency indexes and N represents the number of frequency terms. Hence, the implementation accomplished in the image conjugate domain is the conjugate equivalent of the inverse of the above 3×3 kernel. This relationship will be utilized more explicitly for the embodiment disclosed in Section V.

IV. NUMERICAL SIMULATIONS

A. One-Dimensional Case

For a one-dimensional implementation, two types of signals are demonstrated. A first test is a cosine signal which is useful for observing the relationship between the standard error, the size of $\tau$ and the signal frequency. The standard error is defined herein to be the square root of the average error:

$$\left[\frac{1}{N}\sum_t (\Delta X(t))^2\right]^{1/2}.$$

A second one-dimensional signal is taken from one line of a grey-scale still image, which is considered to be realistic data for practical image compression.

Figure 47:
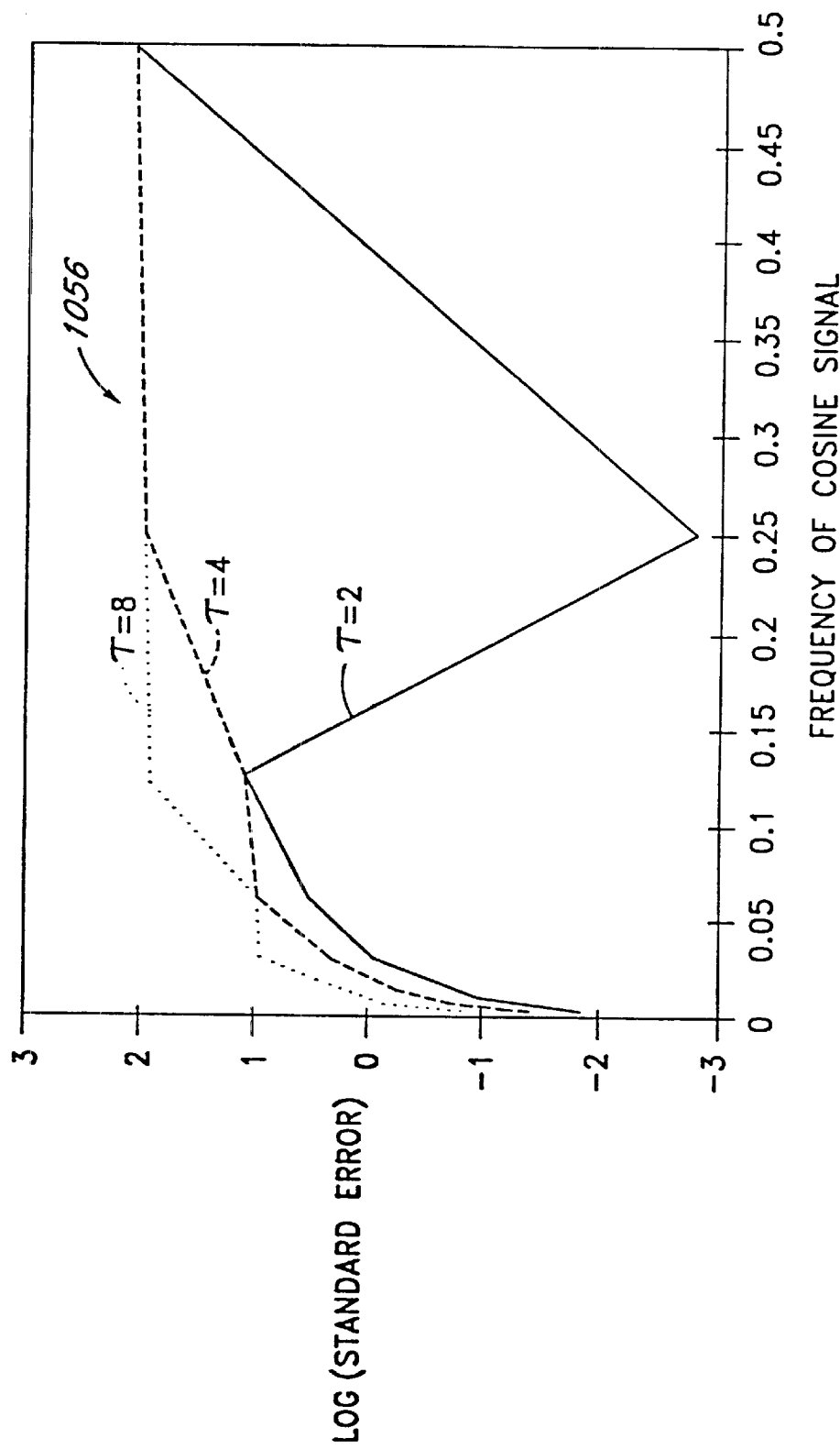
FIG. 47 is a plot of standard error as a function of frequency for a one-dimensional cosinusoidal image.

FIG. 47 shows the plots of standard error versus frequency of the cosine signal for different degrees of decimation $\tau$ 1056. The general trend is that as the input signal frequency becomes higher, the standard error increases. In the low frequency range, smaller values of $\tau$ yield a better performance. One abnormal phenomenon exists for the $\tau=2$ case and a normalized input frequency of 0.25. For this particular situation, the linear spline and the cosine signal at discrete grid points can match perfectly so that the standard error is substantially equal to 0.

Figure 48A:
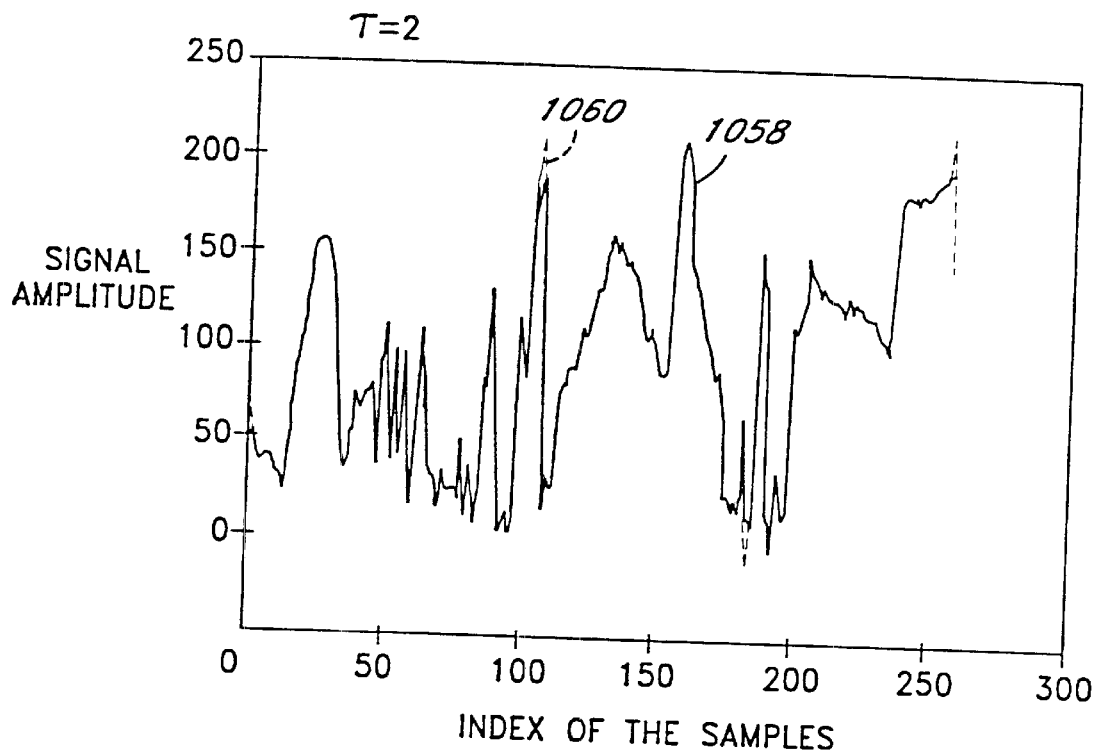
FIG. 48 is a plot of original and reconstructed one-dimensional images and a plot of standard error.
Figure 48B:
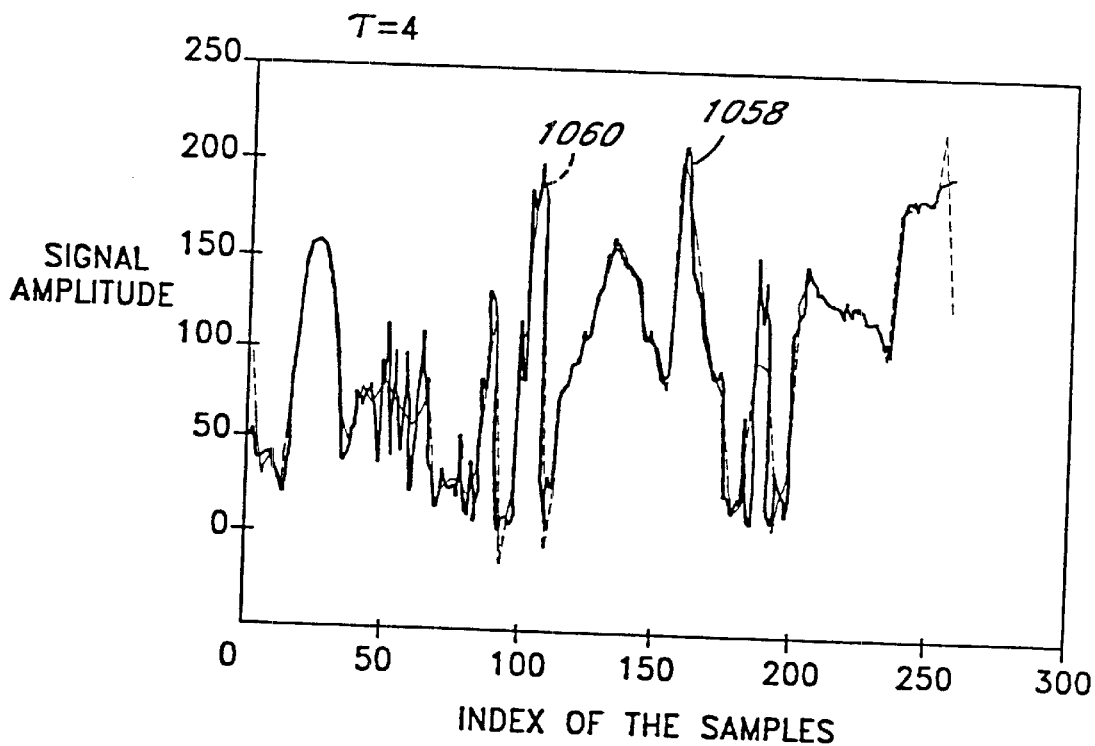
Figure 48C:
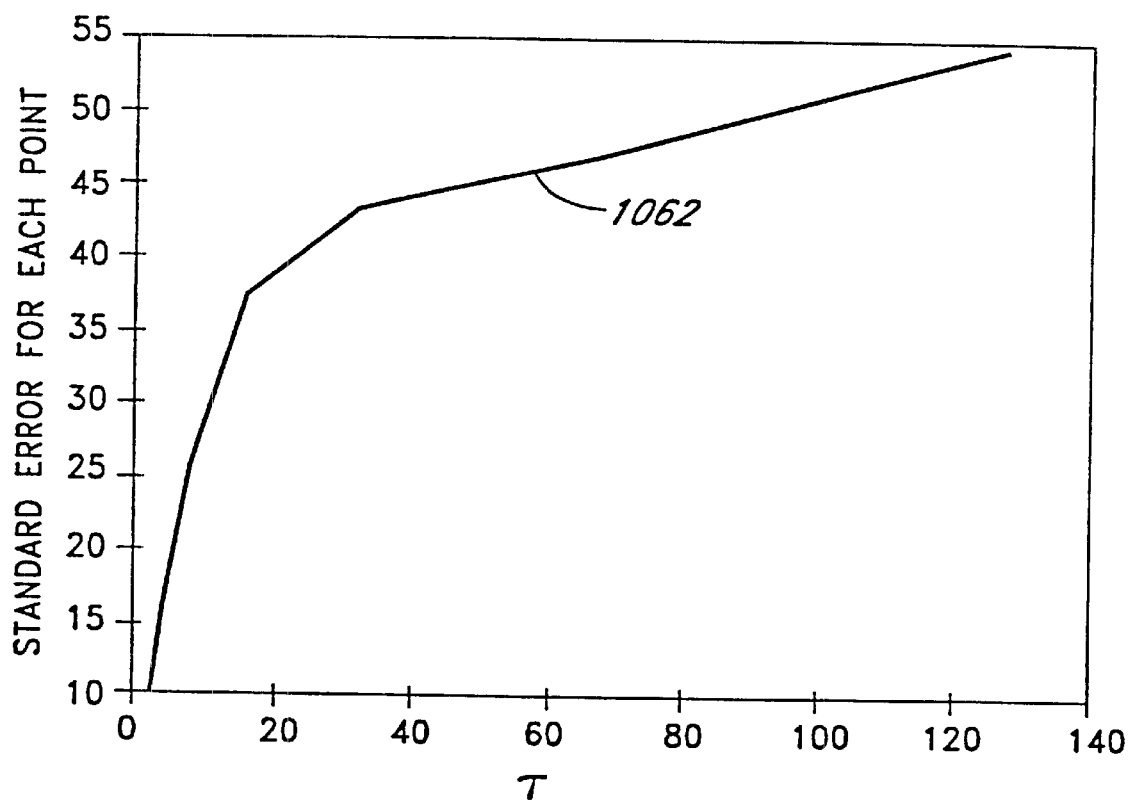

Another test example comes from one line of realistic still image data. FIGS. 48a and 48b show the reconstructed signal waveform 1060 for $\tau=2$ and $\tau=4$, respectively, superimposed on the original image data 1058. FIG. 48a shows a good quality of reconstruction for $\tau=2$. For $\tau=4$, in FIG. 48b, some of the high frequency components are lost due to the combined decimation/interpolation procedure. FIG. 48c presents the error plot 1062 for this particular test example. It will be appreciated that the non-linear error accumulation versus decimation parameter $\tau$ may be exploited to minimize the combination of optimized weights and image residue.

B. Two-Dimensional Case

Figure 49A:
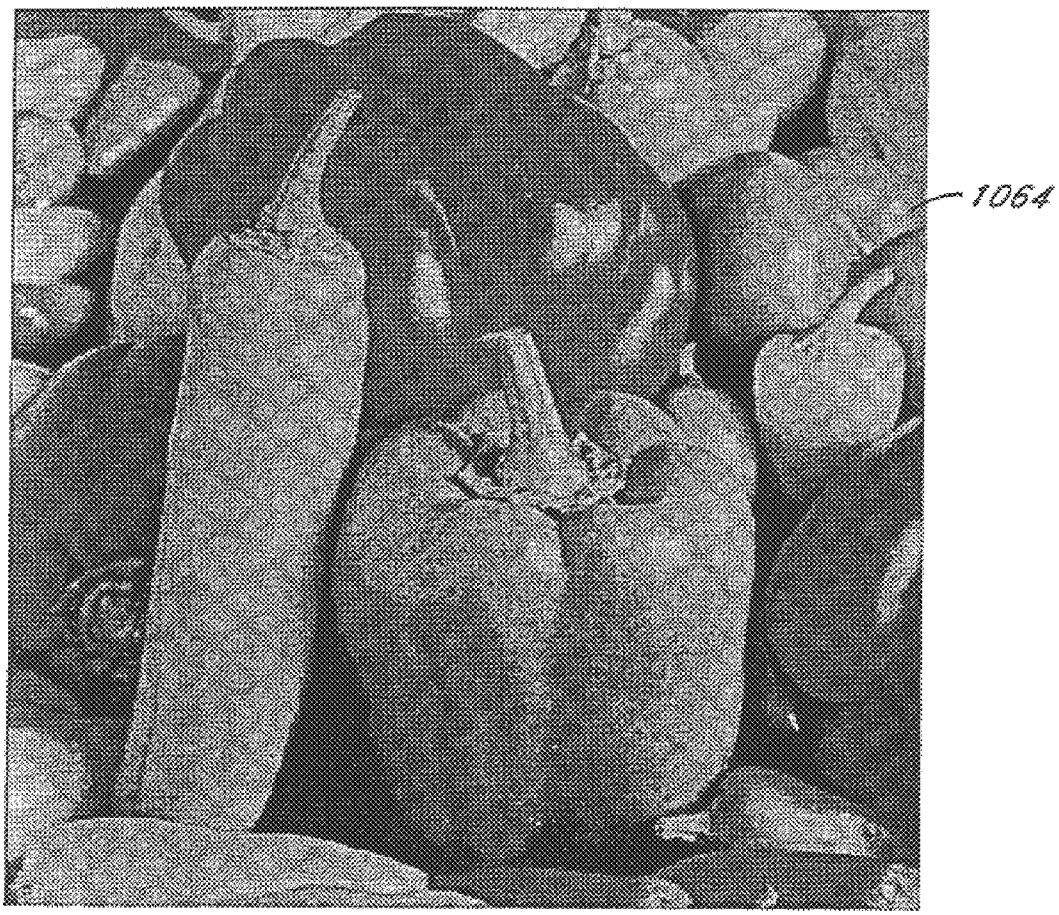
FIG. 49 is a first two-dimensional image reconstruction for different compression factors.
Figure 49B:
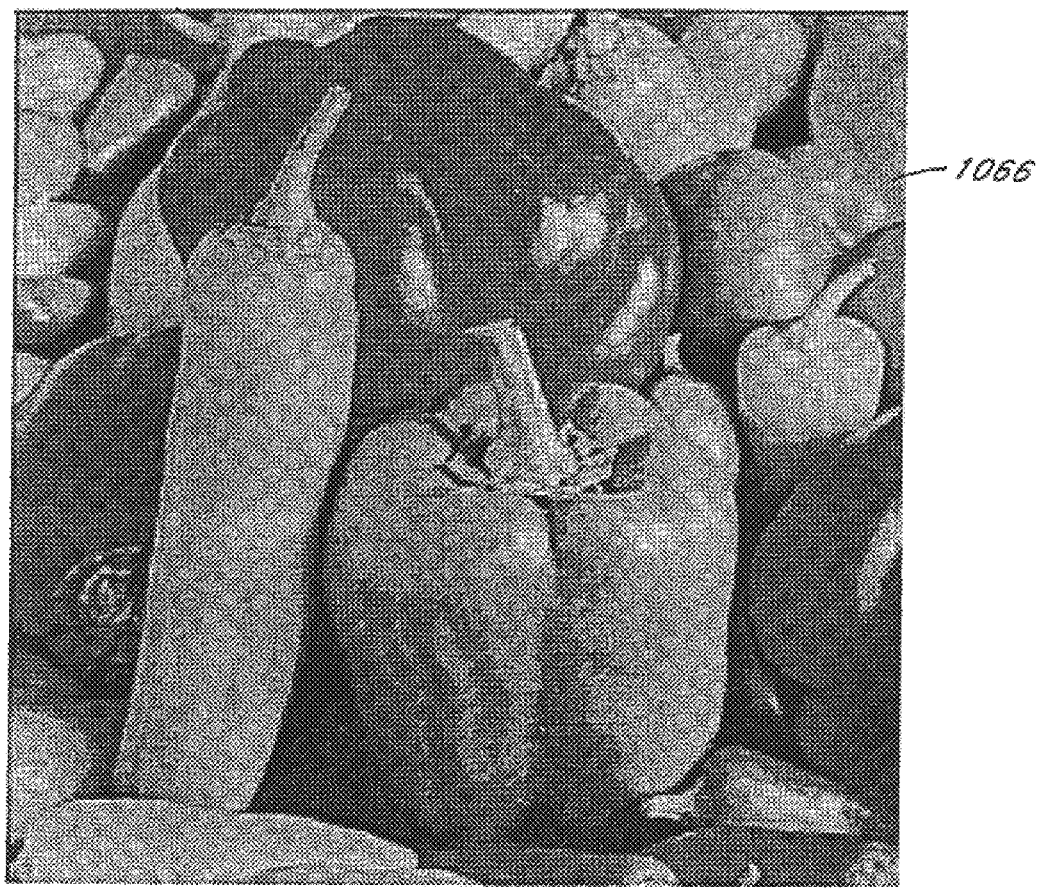
Figure 49C:
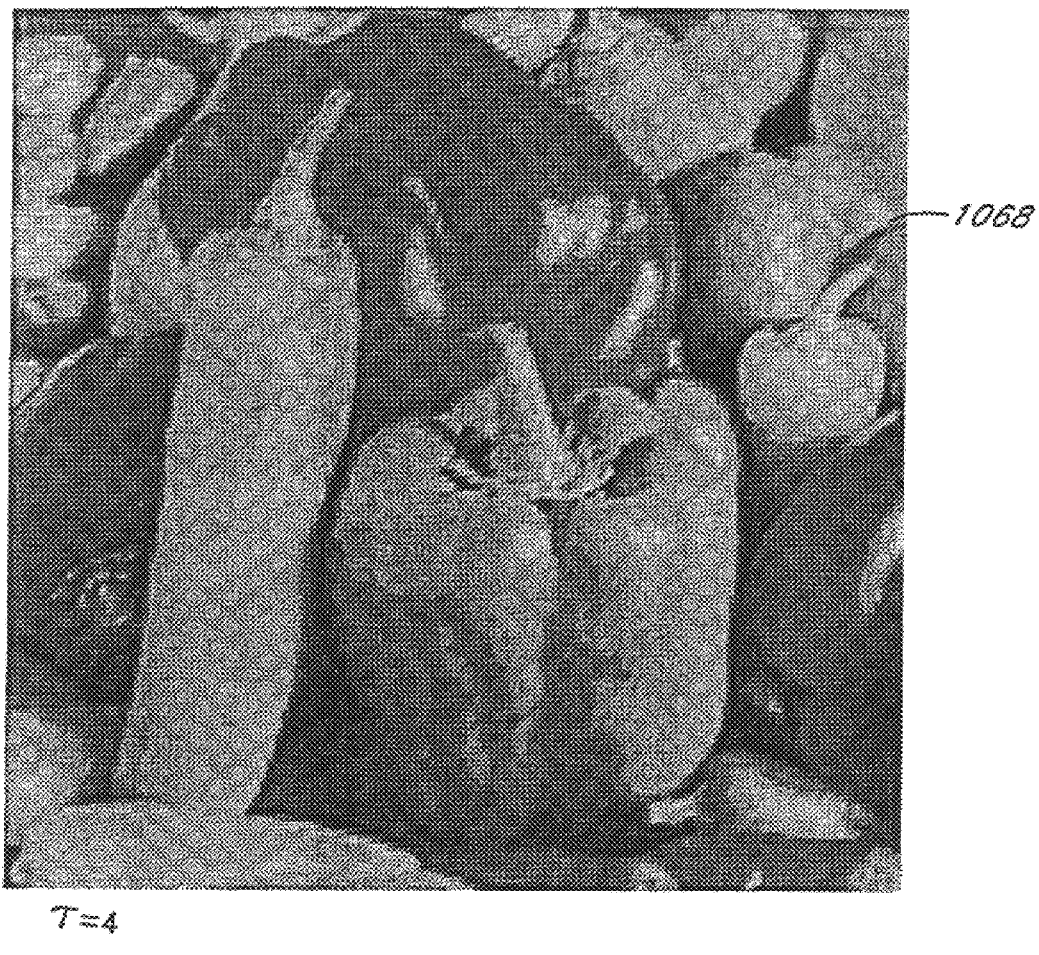
Figure 50A:
FIG. 50 is a second two-dimensional image reconstruction for different compression factors.
Figure 50B:
Figure 50C:
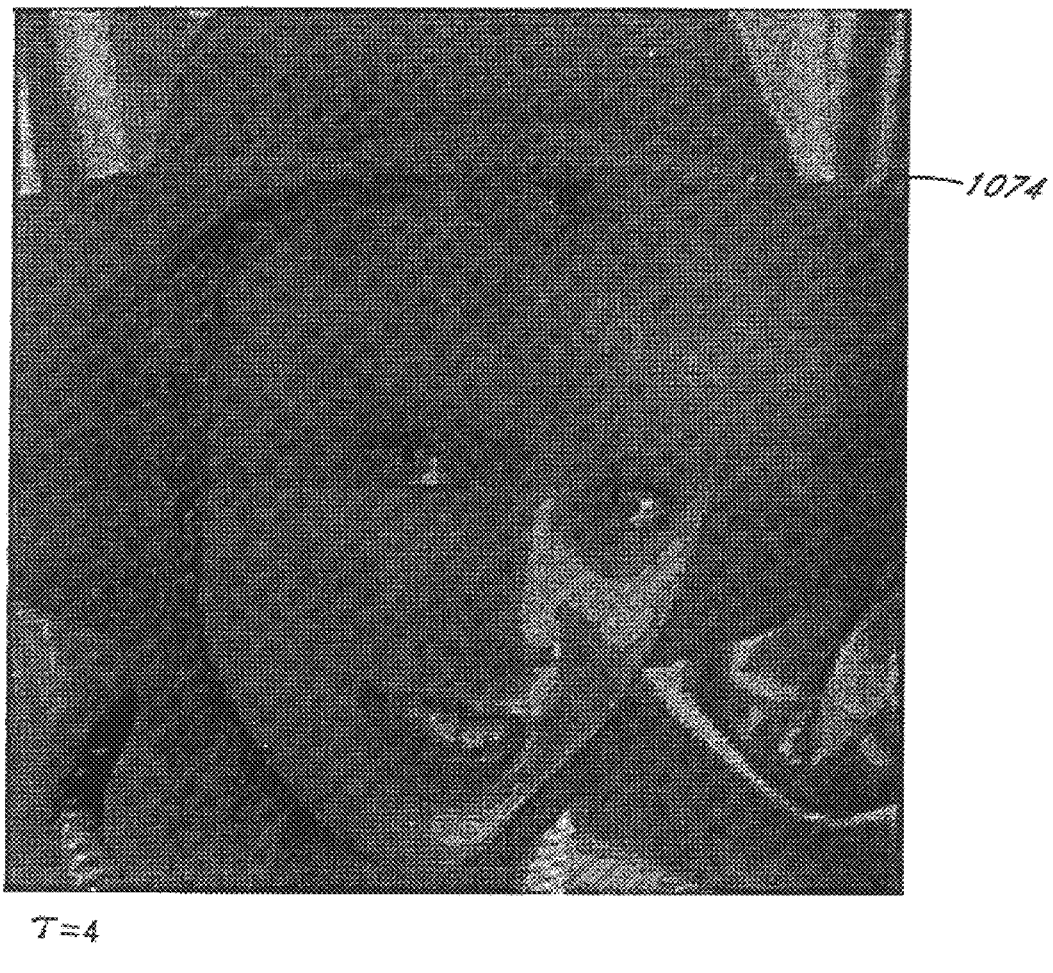
Figure 51:
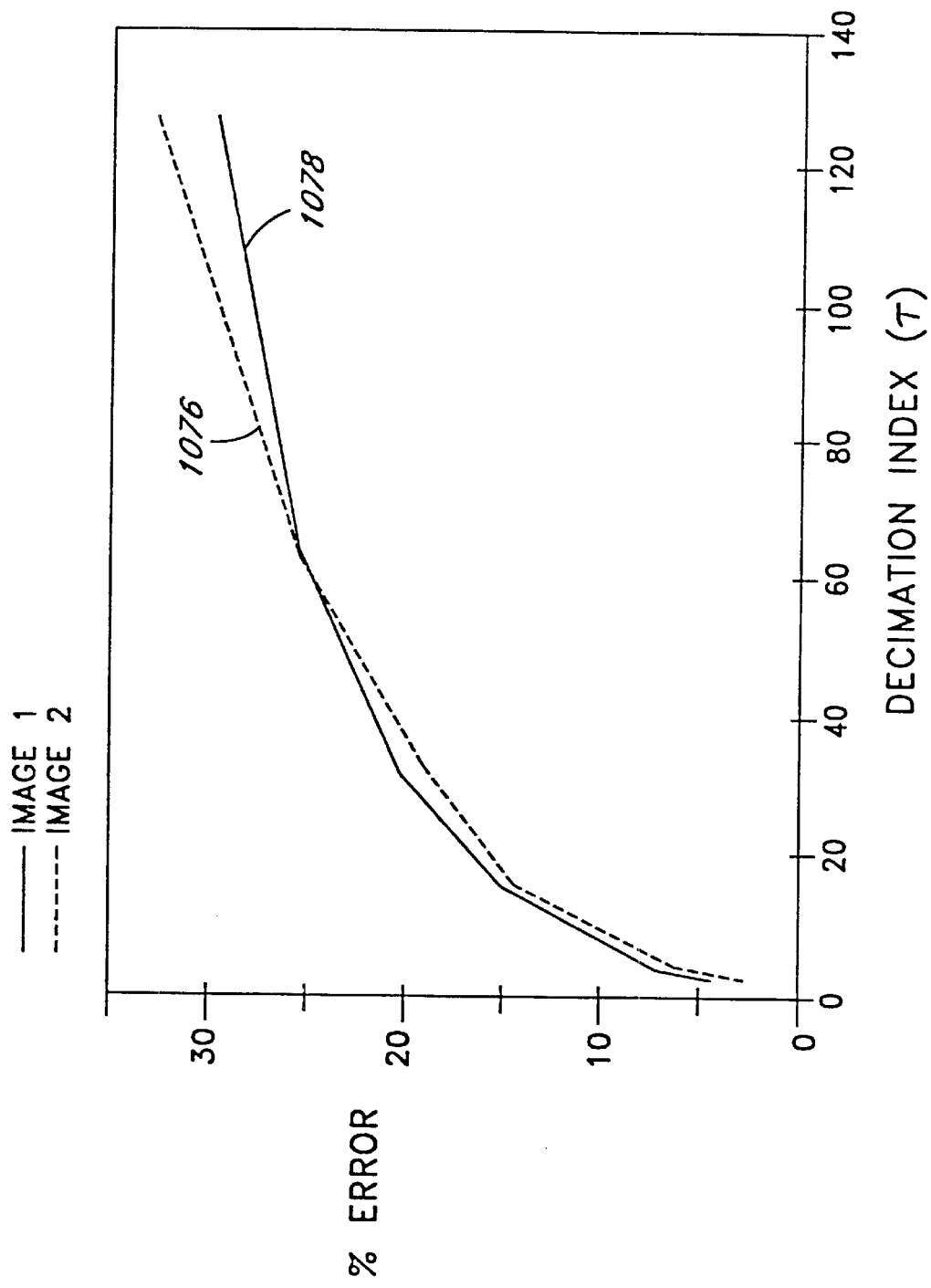
FIG. 51 is plots of standard error for representative images 1 and 2.

For the two-dimensional case, realistic still image data are used as the test. FIGS. 49 and 50 show the original and reconstructed images for $\tau=2$ and $\tau=4$. For $\tau=2$, the reconstructed image 1066, 1072 is substantially similar to the original. However, for $\tau=4$, there are zig-zag patterns along specific edges in images. This is due to the fact that the interpolation less accurately tracks the high frequency components. As described earlier, substantially complete reconstruction is achieved by retaining the minimized residue $\Delta X$ and adding it back to the approximated image. In the next section, several methods are proposed for implementing this process. FIG. 51 shows the error plots as functions of $\tau$ for both images.

Figure 52A:
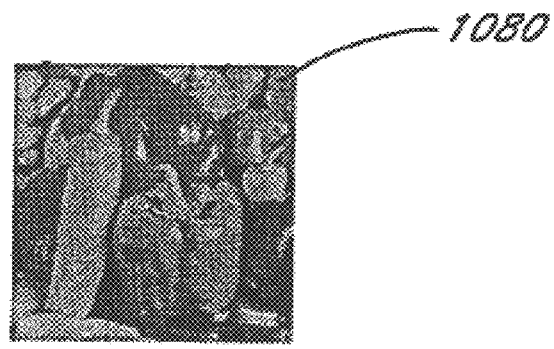
FIG. 52 is a compressed two- miniature using the optimized decomposition weights.
Figure 52B:
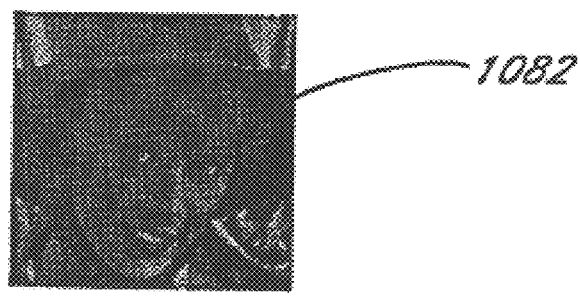

An additional aspect of interest is to look at the optimized weights directly. When these optimal weights are viewed in picture form, high-quality miniatures 1080, 1082 of the original image are obtained, as shown in FIG. 52. Hence, the present embodiment is a very powerful and accurate method for creating a "thumbnail" reproduction of the original image.

V. ALTERNATIVE EMBODIMENTS

Video compression is a major component of high-definition television (HDTV). According to the present invention, video compression is formulated as an equivalent three-dimensional approximation problem, and is amenable to the technique of optimum linear or more generally by hyperplanar spline interpolation. The main advantages of this approach are seen in its fast speed in coding/reconstruction, its suitability in a VLSI hardware implementation, and a variable compression ratio. A principal advantage of the present invention is the versatility with which it is incorporated into other compression systems. The invention can serve as a "front-end" compression platform from which other signal processes are applied. Moreover, the invention can be applied iteratively, in multiple dimensions and in either the image or image conjugate domain. The optimizing method can for example apply to a compressed image and further applied to a corresponding compressed residual image. Due to the inherent low-pass filtering nature of the interpolation process, some edges and other high-frequency features may not be preserved in the reconstructed images, but which are retained through the residue. To address this problem, the following procedures are set forth:

Procedure (a)

Since the theoretical formulation, derivation, and implementation of the disclosed compression method do not depend strongly on the choice of the interpolation kernel function, other kernel functions can be applied and their s performances compared. So far, due to its simplicity and excellent performance, only the linear spline function has been applied. Higher-order splines, such as the quadratic spline, cubic spline could also be employed. Aside from the polynomial spline functions, other more complicated function forms can be used.

Procedure (b)

Figure 53:
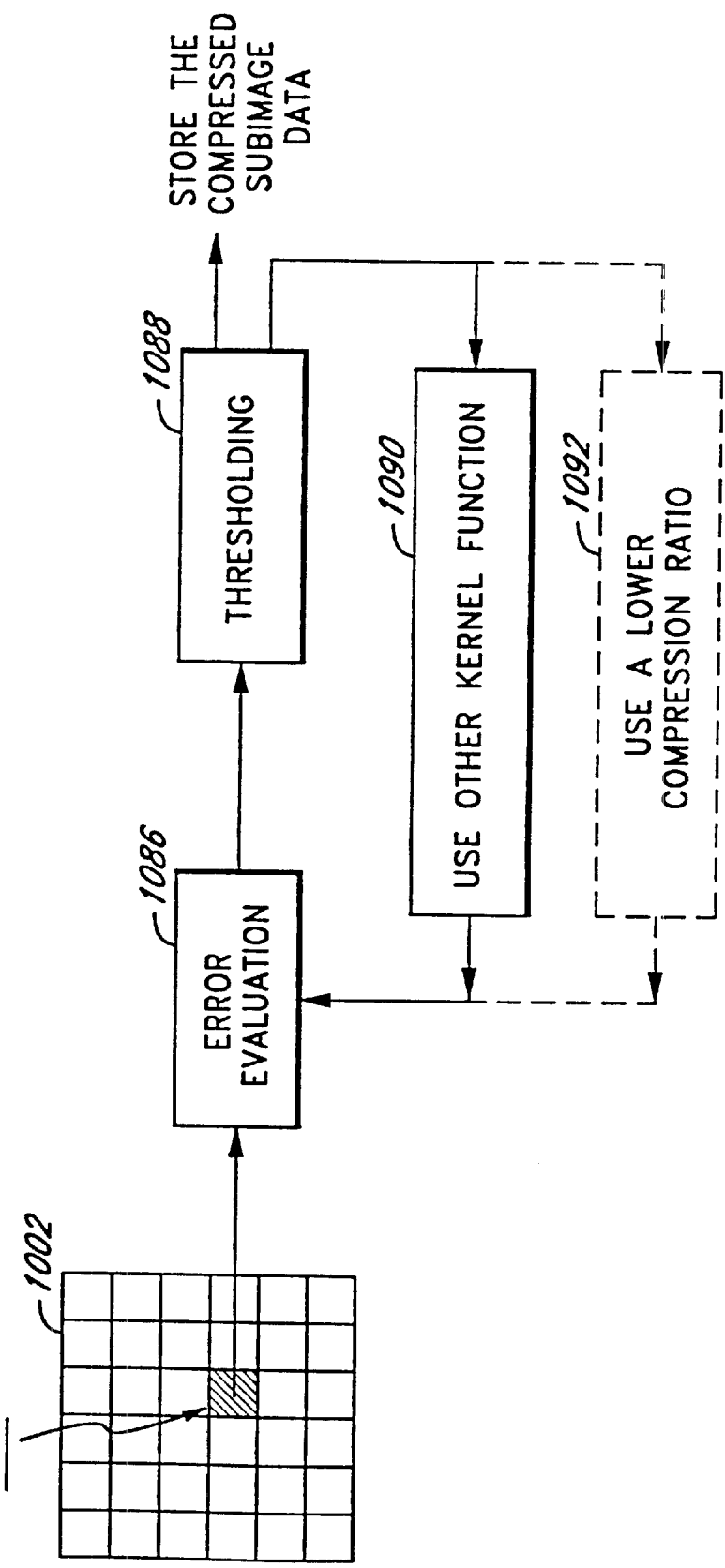
FIG. 53 is a block diagram of a preferred adaptive compression scheme in which the method of the present invention is particularly suited.

Another way to improve the compression method is to apply certain adaptive techniques. FIG. 53 illustrates such an adaptive scheme. For a 2-D image 1002, the whole image can be divided into subimages of smaller size 1084. Since different subimages have different local features and statistics, different compression schemes can be applied to these different subimages. An error criterion is evaluated in a process step 1086. If the error is below a certain threshold determined in a process step 1088, a higher compression ratio is chosen for that subimage. If the error goes above this threshold, then a lower compression ratio is chosen in a step 1092 for that subimage. Both multi-kernel functions 1090 and multi-local-compression ratios provide good adaptive modification.

Procedure (c)

Figure 54:
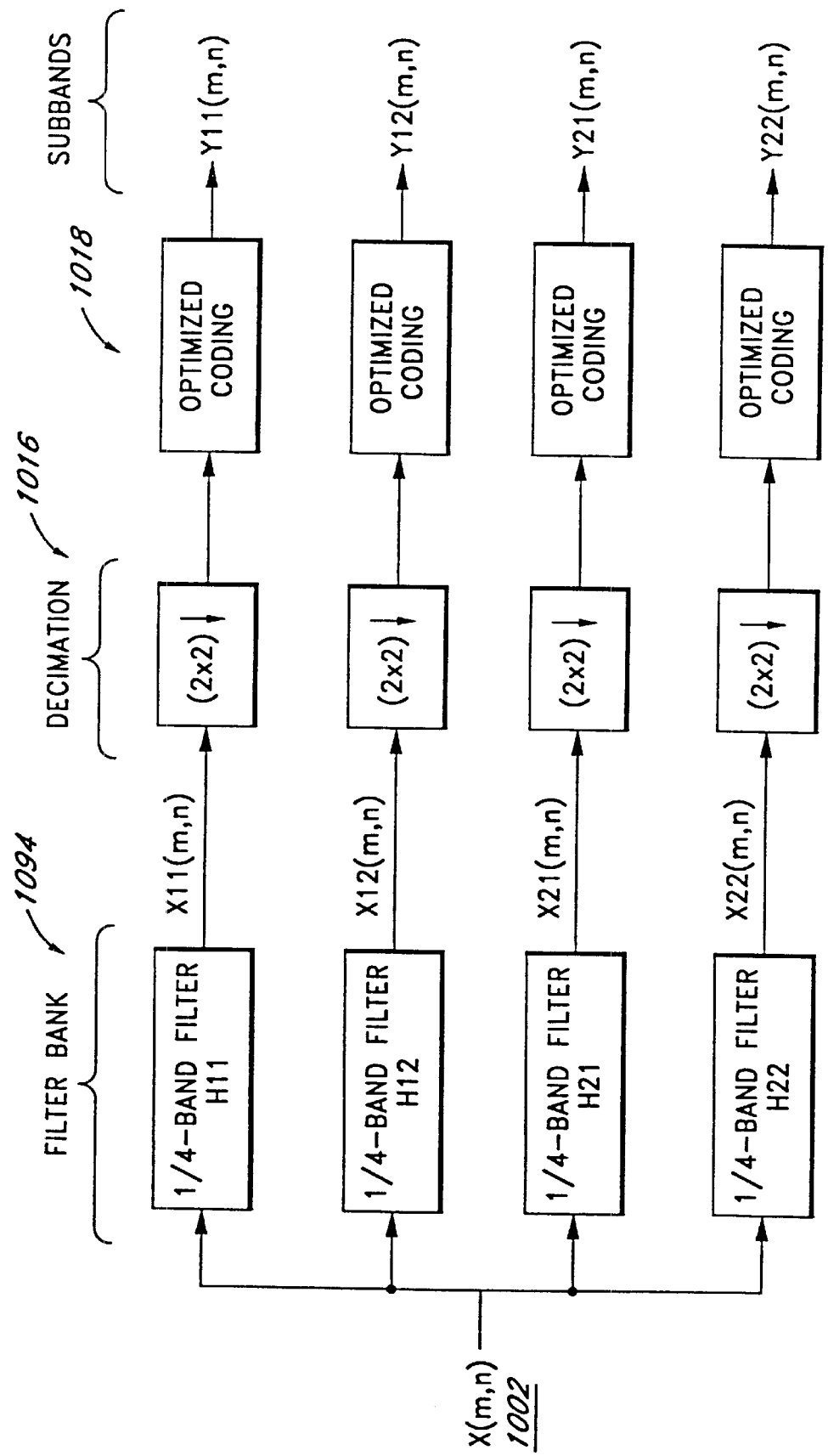
FIG. 54 is a block diagram showing a combined sublevel and optimal-spline compression arrangement.
Figure 55:
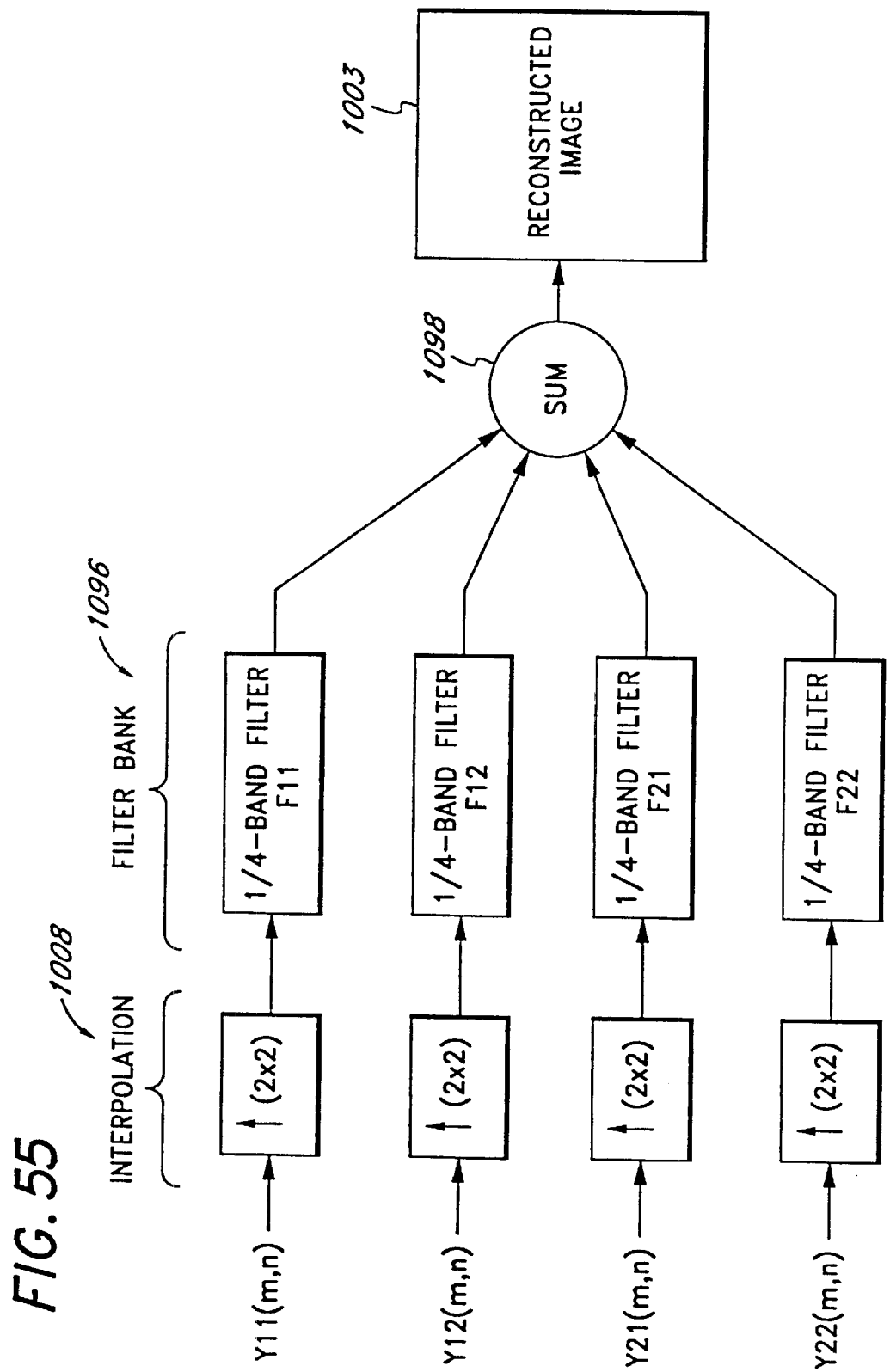
FIG. 55 is a block diagram showing a combined sublevel and optimal-spline reconstruction arrangement.
Figure 56:
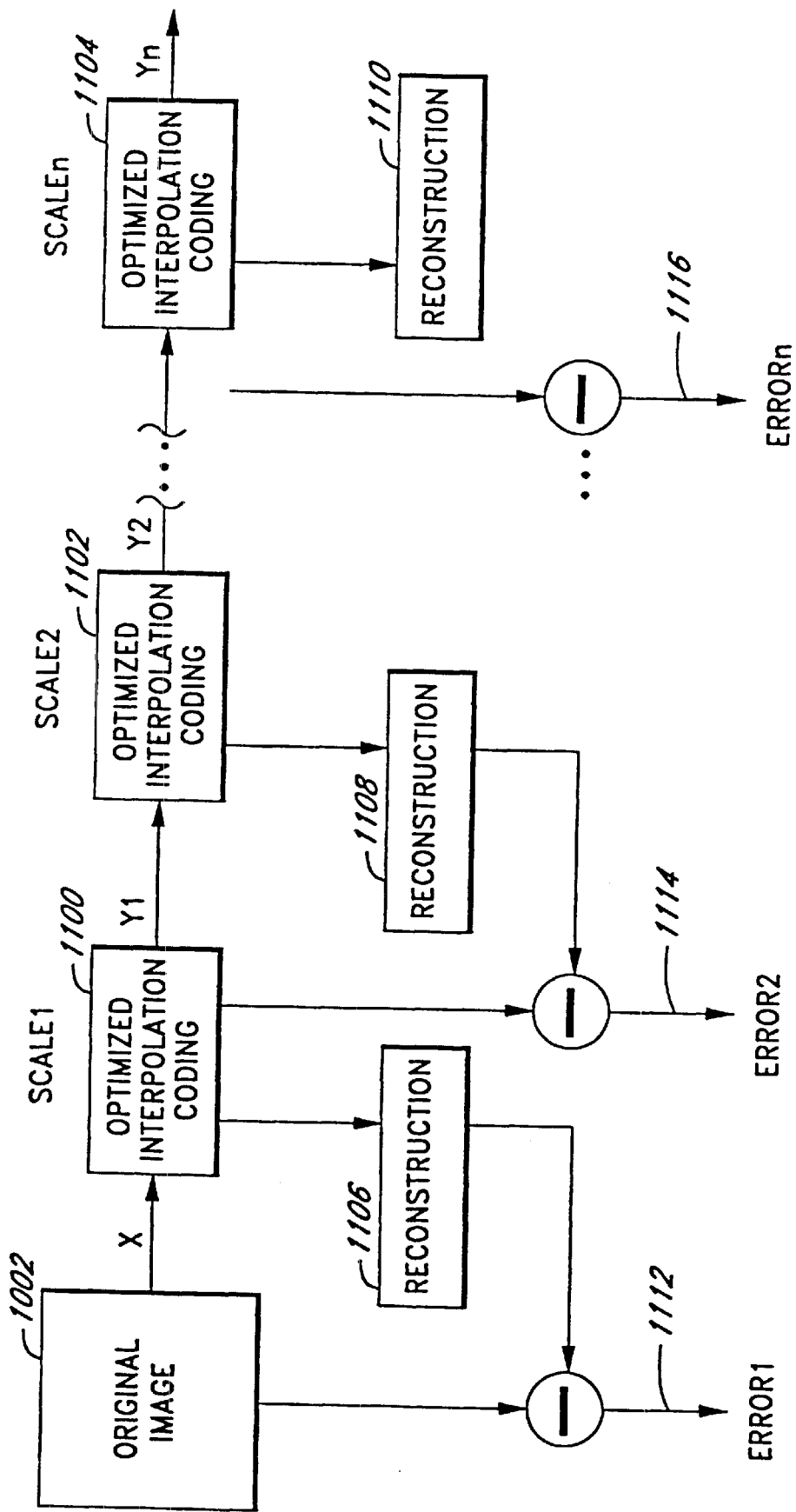
FIG. 56 is a block diagram showing a multi-resolution optimized interpolation arrangement.

Subband coding techniques have been widely used in digital speech coding. Recently, subband coding is also applied to digital image data compression. The basic approach of subband coding is to split the signal into a set of frequency bands, and then to compress each subband with an efficient compression algorithm which matches the statistics of that band. The subband coding techniques divide the whole frequency band into smaller frequency subbands. Then, when these subbands are demodulated into the baseband, the resulting equivalent bandwidths are greatly reduced. Since the subbands have only low frequency components, one can use the above described, linear or p, Lanar spline, data compression technique for coding these data. A 16-band filter compression system is shown in FIG. 54, and the corresponding reconstruction system in FIG. 55. There are, of course, many ways to implement this filter bank, as will be appreciated by those skilled in the art. For example, a common method is to exploit the Quadrature Mirror Filter structure.

V. IMAGE DOMAIN IMPLEMENTATION

The embodiments described earlier utilize a spline filter optimization process in the image conjugate domain using an FFT processor or equivalent thereof. The present invention also provides an equivalent image domain implementation of a spline filter optimization process which presents distinct advantages with regard to speed, memory and process application.

Referring back to Equation 45, it will be appreciated that the transform processes DFT and $DFT^{-1}$ may be subsummed into an equivalent conjugate domain convolution, shown here briefly:

$$X_j = DFT\left[\frac{1}{\lambda_m} DFT^{-1}(Y_k)\right] \quad (54)$$

$$= DFT\left[DFT^{-1}\left[DFT\left(\frac{1}{\lambda_m}\right)\right] DFT^{-1}(Y_k)\right]$$

If $\Omega = DFT(1/\lambda_m)$, then:

$$X_j = DFT[DFT^{-1}(\Omega) DFT^{-1}(Y_k)]$$

$$= \Omega * Y_k.$$

Figure 57:
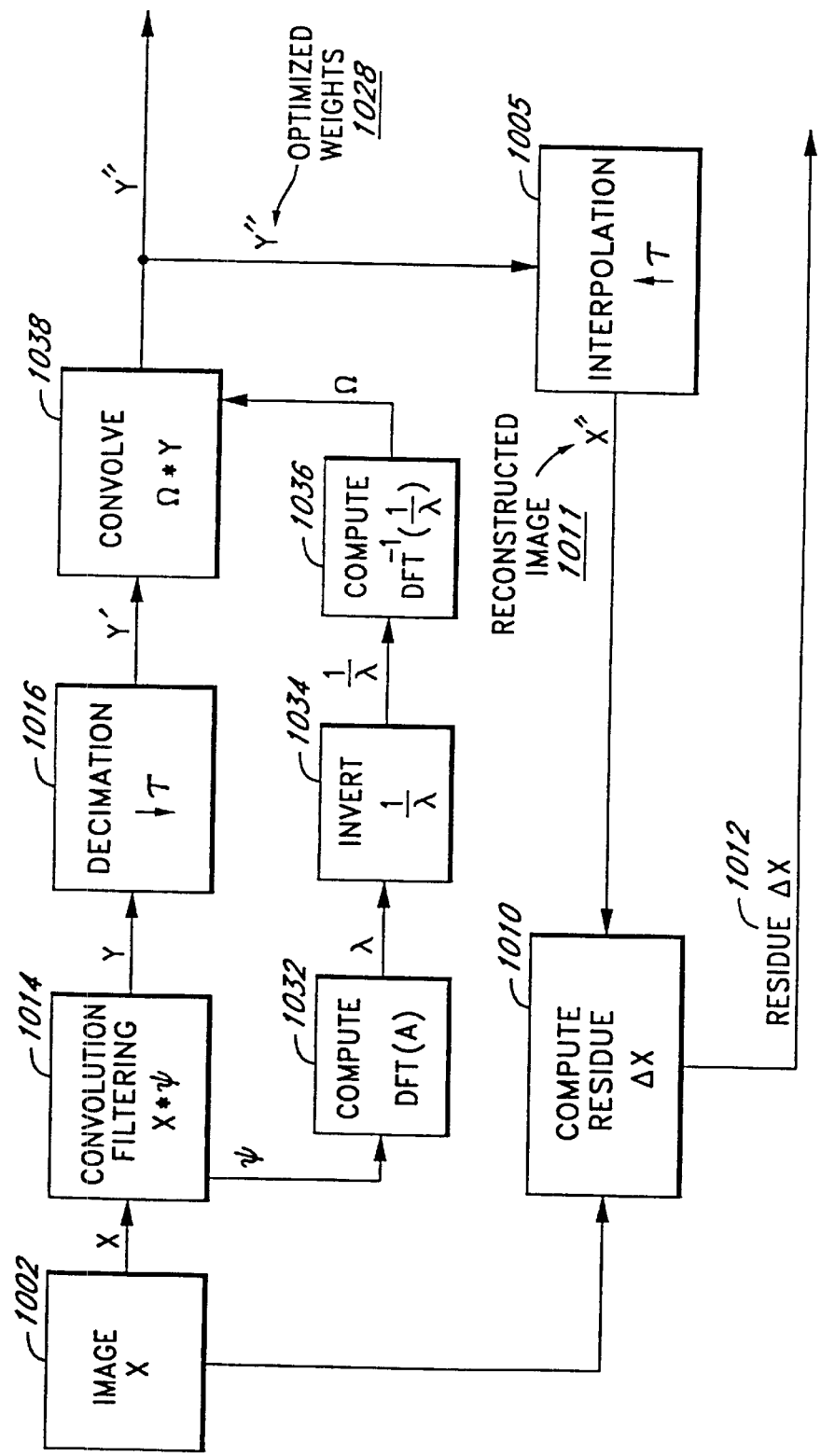
FIG. 57 is a block diagram showing an embodiment of the optimizing process in the image domain.

Furthermore, with $\lambda_m = DFT(a_j)$, the optimization process may be completely carried over to an image domain implementation knowing only the form of the input spline filter function. The transform processes can be performed in advance to generate the image domain equivalent of the inverse eigenfilter. As shown in FIG. 57, the image domain spline optimizer $\Omega$ operates on compressed image data Y' generated by a first convolution process 1014 followed by a decimation process 1016, as previously described. Off-line or perhaps adaptively, the tensor transformation A (as shown for example in Equation 25 above) is supplied to an FFT type processor 1032, which computes the transformation eigenvalues $\lambda$. The tensor of eigenvalues is then inverted at process block 1034, followed by $FFT^{-1}$ process block 1036, generating the image domain tensor $\Omega$. The tensor $\Omega$ is supplied to a second convolution process 1038, whereupon $\Omega$ is convolved with the non-optimized compressed image data Y' to yield optimized compressed image data Y".

In practice, there is a compromise between accuracy and economy with regard to the specific form of $\Omega$. The optimizer tensor $\Omega$ should be of sufficient size for adequate approximation of:

$$DFT^{-1}\left(\frac{1}{DFT(A)}\right).$$

On the other hand, the term $\Omega$ should be small enough to be computationally tractable for the online convolution process 1038. It has been found that two-dimensional image compression using the preferred hexagonal tent spline is adequately optimized by a 5×5 matrix, and preferably a 7×7 matrix, for example, with the following form:

$$\Omega = \begin{Bmatrix} 0 & h & -g & g & e & e & g \\ h & f & e & d & c & d & e \\ -g & e & c & b & b & c & e \\ g & d & b & a & b & d & g \\ e & c & b & b & c & e & -g \\ e & d & c & d & e & f & h \\ g & e & e & g & -g & h & 0 \end{Bmatrix}.$$

Additionally, to reduce computational overhead, the smallest elements (i.e., the elements near the perimeter) such as f, g, and h may be set to zero with little noticeable effect in the reconstruction.

Figure 38:
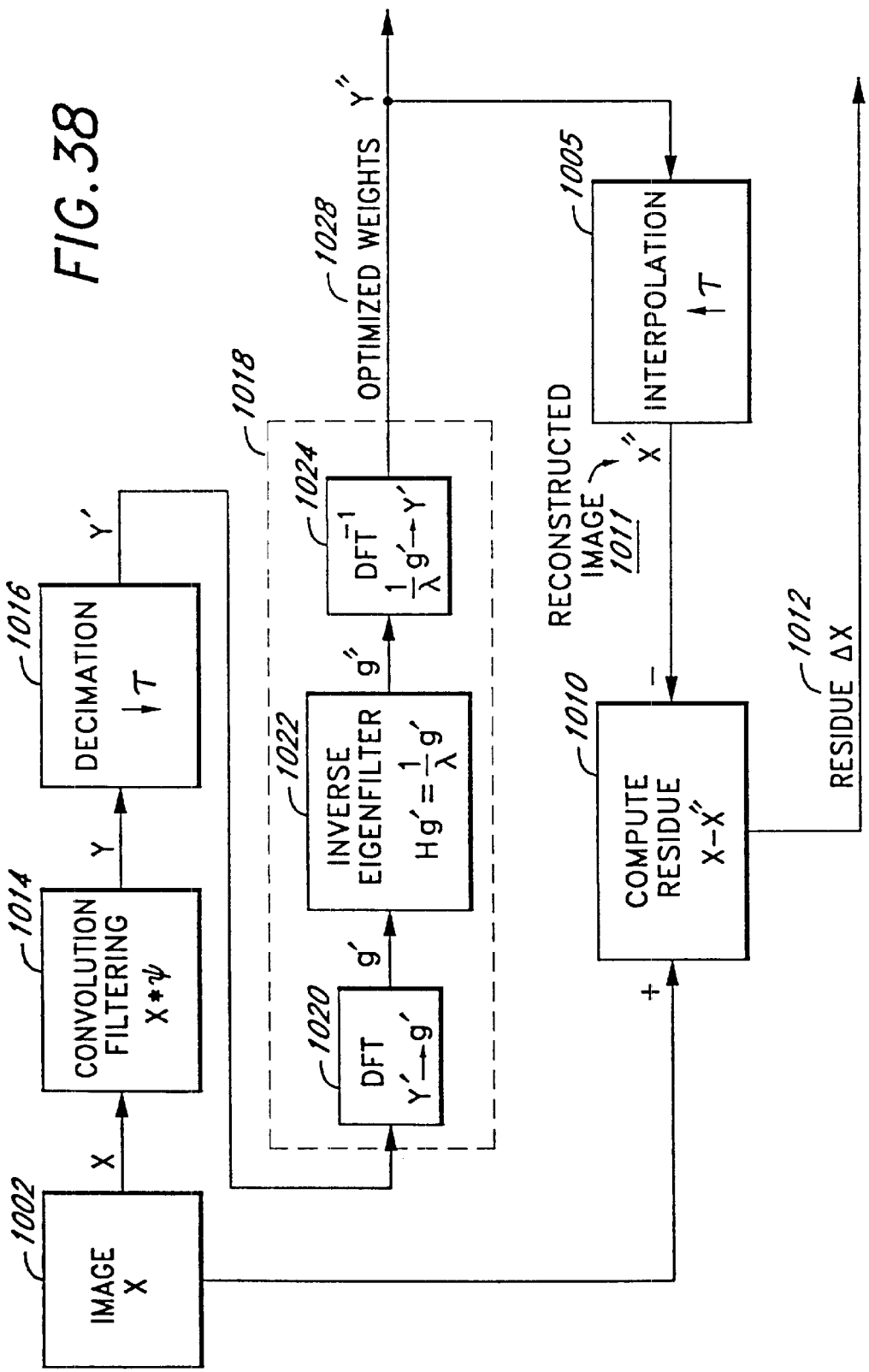
FIG. 38 is a block diagram showing a basic optimization block of the present invention.

The principal advantages of the present preferred embodiment are in computational saving above and beyond that of the previously described conjugate domain inverse eigenfilter process (FIG. 38, 1018). For example, a two-dimensional FFT process may typically require about $N^2 \log_2 N$ complex operations or equivalently $6N^2 \log_2 N$ multiplications. The total number of image conjugate filter operations is of order $10N^2 \log_2 N$. On the other hand, the presently described (7×7) kernel with 5 distinct operations per image element will require only $5N^2$ operations, lower by an important factor of $\log_2 N$. Hence, even for reasonably small images, there is significant improvement in computation time.

Additionally, there is substantial reduction in buffer demands because the image domain process 1038 requires only a 7×7 image block at a given time, in contrast to the conjugate process which requires a full-frame buffer before processing. In addition to the lower demands on computation with the image domain process 1038, there is virtually no latency in transmission as the process is done in pipeline. Finally, "power of 2" constraints desirable for efficient FFT processing is eliminated, allowing convenient application to a wider range of image dimensions.

The above detailed description is intended to be exemplary and not limiting. From this detailed description, taken in conjunction with the appended drawings, the advantages of the present invention will be readily understood by one who is skilled in the relevant technology. The present apparatus and method provides a unique encoder, compressed file format and decoder which compresses images and decodes compressed images. The unique compression system increases the compression ratios for comparable image quality while achieving relatively quick encoding and decoding times, optimizes the encoding process to accommodate different image types, selectively applies particular encoding methods for a particular image type, layers the image quality components in the compressed image, and generates a file format that allows the addition of other compressed data information.

While the above detailed description has shown, described and pointed out the fundamental novel features of the invention as applied to various embodiments, it will be understood that various omissions and substitutions and changes in the form and details of the illustrated device may be made by those skilled in the art, without departing from the spirit of the invention.

What is claimed is:

1. A method of transferring a progressively-rendered, compressed image, over a finite bandwidth channel, comprising:

producing a coarse quality compressed image at a source and transmitting said coarse quality compressed image over a channel as a first part of a transmission to a destination end;

receiving the coarse quality compressed image at a receiver at the destination end at a first time and displaying an image based on said coarse quality compressed image on a display system of the receiver when received at said first time;

creating additional information about the image, at the source, from which a standard quality image can be displayed, said standard quality image being of a higher quality than said course quality image, and sending compressed information over said channel indicative of information for said standard quality image, said sending said standard quality image information occurring subsequent in time to said sending of all of said information for said coarse quality image;

receiving said standard quality information at the receiver at a second time, subsequent to the first time, and decompressing said standard quality image information, to improve the quality of the image displayed on said display system, and to display said standard quality image;

obtaining further information about the image beyond the information in said standard quality image, to provide an enhanced quality image, and compressing said information for said enhanced quality image, said enhanced quality image having more image details than said standard quality image;

transmitting said information for said enhanced quality image, at a time subsequent to transmitting said information for said coarse quality image and said standard quality image; and receiving said enhanced quality image information at said receiver, at a third time subsequent to said first and second times, and updating a display on said display system to display the additional enhanced quality image.

2. A method as in claim 1, wherein said producing the coarse quality image uses a different compression technique than said creating additional information indicative of the standard quality image.

3. A method as in claim 1, wherein said coarse quality image includes information indicative of a miniature version of an original image, and said displaying the coarse quality image comprises interpolating said miniature to a size of the original image and displaying said image.

4. A method as in claim 2, wherein said creating additional information comprises determining a characteristic of the image, determining which of a plurality of different compression techniques will best compress the characteristic determined; and compressing said image using the determined technique.

5. A method as in claim 4, further comprising determining a plurality of areas in said image, and determining, for each area, which of the plurality of different compression techniques will optimize the compression ratio.

6. A method as in claim 5, further comprising interleaving and channel encoding different portions of the compressed image.

7. A method as in claim 5, wherein said compression techniques include vector quantization and discrete cosine transform.

8. A method as in claim 3, wherein said obtaining a miniature comprises decimating along vertical and horizontal axes.

9. A method of transmitting and displaying a compressed image comprising:

obtaining and sending a first layer of information indicative of a compressed component of a source image at a first time;

receiving said first layer and decompressing the component to generate an image indicative thereof;

obtaining and sending a second layer of information indicative of an improved resolution layer having more details than said first layer of information and capable of supplementing the existing component at a second time subsequent to said first time; and receiving and decompressing said second layer to provide an updated display which supplements the existing component and thus improves the resolution of said image with respect to the component.

10. A method as in claim 9, wherein said first obtaining comprises:

transmitting information indicative of a compressed miniature of the image.

11. The method of claim 10, wherein said receiving the first layer comprises:

receiving the compressed miniature of the image;

interpolating the compressed miniature of the image into a full sized image; and displaying the full sized image.

12. A method as in claim 9, wherein the obtaining of the first layer includes obtaining and sending a layer of information that is created according to a first compression technique and the obtaining of the second layer includes obtaining and sending a layer of information that is created according to a second compression technique which is different from the first compression technique.

13. A method as in claim 9, wherein said obtaining the first layer comprises decimating data on the image to form a reduced quality image, fitting the decimated data to a first model which partially restores source image detail lost by decimation, and calculating reconstruction values from the fitting.

14. A method as in claim 13, further comprising using said reconstruction values to interpolate the decimated data into a full sized image while minimizing a mean squared error between original image components and interpolated image components.

15. A method as in claim 9, wherein said obtaining the first layer comprises obtaining selected information regarding at least one component.

16. A method as in claim 15, wherein said obtaining the second layer comprises obtaining additional information regarding said at least one component.

17. A method as in claim 9, wherein said obtaining the first layer includes obtaining selected information regarding a luminance component of the image, and wherein said obtaining the second layer includes obtaining additional information regarding the luminance component to enable enhancement of the image displayed based on the first component.

18. A method as in claim 9, wherein said obtaining the first layer includes obtaining selected information regarding a chrominance component of the image, and wherein said obtaining the second layer includes obtaining additional information regarding the chrominance component to enable enhancement of the image displayed based on the first component.

19. A method as in claim 9, wherein said obtaining the first layer includes obtaining selected information regarding luminance and chrominance components of the image, and wherein said obtaining the second layer includes obtaining additional information regarding the luminance and chrominance components to enable enhancement of the image displayed based on the first components.

20. A method as in claim 9, wherein the receiving and decompressing said second layer comprises improving the resolution of said image without removing the component.

21. A method of creating a compressed image, comprising:

producing a coarse quality compressed image segment at a source;

transmitting said course quality compressed image segment to a destination end at a first time;

creating additional information about the coarse quality compressed image segment, at the source, from which an improved quality image can be displayed, said improved quality image being displayed with higher quality than said course quality compressed image segment;

transmitting compressed information representative of information for said improved quality image to said destination end at a second time that is subsequent to said first time; and obtaining further information about the coarse quality compressed image segment, beyond the information in said improved quality image, to provide an enhanced quality image, and compressing said information for said enhanced quality image, said enhanced quality image having more image details than said improved quality image.

22. The method of claim 21, further comprising:

transmitting said information for said enhanced quality image to said destination end.

23. The method of claim 22, wherein:

transmitting said information for said enhanced quality image to said destination end includes transmitting said information for said enhanced quality image to said destination end at a third time that is subsequent to said second time.

24. The method of claim 21, wherein:

producing said coarse quality compressed image segment includes producing said coarse quality compressed image segment at the source at a first time; and creating said additional information about said coarse quality compressed image segment includes creating said additional information about said coarse quality compressed image segment, at the source at a second time that is subsequent to said first time, from which said improved quality image can be displayed, said improved quality image being displayed with higher quality than said course quality compressed image segment.

25. The method of claim 24, wherein:

obtaining said timer information about said coarse quality compressed image segment includes obtaining said further information about said coarse quality compressed image segment at a third time that is subsequent to said second time, beyond the information in said improved quality image, to provide said enhanced quality image, and compressing said information for said enhanced quality image, said enhanced quality image having more image details than said improved quality image.

26. A method of displaying an image based on compressed image data, comprising:

receiving a course quality compressed image segment and displaying an image based on said course quality compressed image segment on a display at a first time;

receiving an improved quality information created based on additional information about the coarse quality compressed image segment, decompressing said improved quality information, and improving a quality of the image displayed on said display based on said improved quality information at a second time that is subsequent to said first time; and receiving an enhanced quality image information created based on further information about the coarse quality compressed image segment, decompressing said enhanced quality information, and updating said display to display the enhanced quality image at a third time that is subsequent to said second time.

* * * * *